[19] US 011327358B2

(12) United States Patent
Robinson et al.

(10) Patent No.: US 11,327,358 B2
(45) Date of Patent: May 10, 2022

(54) OPTICAL STACK FOR DIRECTIONAL DISPLAY

(71) Applicant: RealD Spark, LLC, Beverly Hills, CA (US)

(72) Inventors: Michael G. Robinson, Boulder, CO (US); Graham J. Woodgate, Henley-on-Thames (GB); Robert A. Ramsey, Boulder, CO (US); Jonathan Harrold, Leamington Spa (GB)

(73) Assignee: RealD Spark, LLC, Beverly Hills, CA (US)

( * ) Notice: Subject to any disclaimer, the term of this patent is extended or adjusted under 35 U.S.C. 154(b) by 0 days.

(21) Appl. No.: 15/971,969

(22) Filed: May 4, 2018

(65) Prior Publication Data

US 2018/0321553 A1    Nov. 8, 2018

Related U.S. Application Data

(60) Provisional application No. 62/646,550, filed on Mar. 22, 2018, provisional application No. 62/641,657, (Continued)

(51) Int. Cl.
*G02F 1/1335* (2006.01)
*G02F 1/13363* (2006.01)
(Continued)

(52) U.S. Cl.
CPC ........ *G02F 1/133536* (2013.01); *B60K 35/00* (2013.01); *G02B 6/005* (2013.01);
(Continued)

(58) Field of Classification Search
CPC . G02F 2413/04; G02F 2413/07; G02B 6/003; G02B 6/0048
See application file for complete search history.

(56) References Cited

U.S. PATENT DOCUMENTS 3,914,022 A  10/1975 Kashnow
4,059,916 A  11/1977 Tachihara et al.
(Continued)

FOREIGN PATENT DOCUMENTS

CA    2222313 A1   6/1998
CN    1125943 C    10/2003
(Continued)

OTHER PUBLICATIONS

Au-2011329639 Australia Patent Examination Report No. 1 dated Mar. 6, 2014.

(Continued)

*Primary Examiner* — Alexander P Gross
(74) *Attorney, Agent, or Firm* — Penny L. Lowry

(57) ABSTRACT

A privacy display comprises a spatial light modulator and a passive retarder arranged between first and second polarisers arranged in series with the spatial light modulator. On-axis light from the spatial light modulator is directed without loss, and off-axis light has reduced luminance. The visibility of the display to off-axis snoopers is reduced by means of luminance reduction over a wide polar field of view. Off-axis visibility of the display in an automotive vehicle can be reduced.

30 Claims, 39 Drawing Sheets

Related U.S. Application Data filed on Mar. 12, 2018, provisional application No. 62/634,168, filed on Feb. 22, 2018, provisional application No. 62/622,001, filed on Jan. 25, 2018, provisional application No. 62/592,085, filed on Nov. 29, 2017, provisional application No. 62/582,030, filed on Nov. 6, 2017, provisional application No. 62/582,052, filed on Nov. 6, 2017, provisional application No. 62/565,836, filed on Sep. 29, 2017, provisional application No. 62/559,187, filed on Sep. 15, 2017, provisional application No. 62/554,189, filed on Aug. 11, 2017, provisional application No. 62/502,939, filed on May 8, 2017.

(51) Int. Cl.
 *F21V 8/00* (2006.01)
 *B60K 35/00* (2006.01)

(52) U.S. Cl.
 CPC ......... *G02B 6/0055* (2013.01); *G02B 6/0056* (2013.01); *G02B 6/0068* (2013.01); *G02B 6/0076* (2013.01); *G02F 1/13363* (2013.01); *G02F 1/133528* (2013.01); *G02F 1/133634* (2013.01); *B60K 2370/34* (2019.05); *G02B 6/0036* (2013.01); *G02F 1/133531* (2021.01); *G02F 2413/02* (2013.01); *G02F 2413/04* (2013.01); *G02F 2413/07* (2013.01); *G02F 2413/08* (2013.01); *G02F 2413/10* (2013.01)

(56) References Cited

U.S. PATENT DOCUMENTS

| | | |
|---|---|---|
| 4,621,898 A | 11/1986 | Cohen |
| 4,914,553 A | 4/1990 | Hamada et al. |
| 4,974,941 A | 12/1990 | Gibbons et al. |
| 5,005,108 A | 4/1991 | Pristash et al. |
| 5,035,491 A | 7/1991 | Kawagishi et al. |
| 5,126,882 A | 6/1992 | Oe et al. |
| 5,528,720 A | 6/1996 | Winston et al. |
| 5,608,550 A | 3/1997 | Epstein et al. |
| 5,658,490 A | 8/1997 | Sharp et al. |
| 5,671,994 A | 9/1997 | Tai et al. |
| 5,715,028 A | 2/1998 | Abileah et al. |
| 5,727,107 A | 3/1998 | Umemoto et al. |
| 5,779,337 A | 7/1998 | Saito et al. |
| 5,791,757 A | 8/1998 | O'Neil et al. |
| 5,808,784 A | 9/1998 | Ando et al. |
| 5,835,166 A | 11/1998 | Hall et al. |
| 5,854,872 A | 12/1998 | Tai |
| 5,894,361 A | 4/1999 | Yamazaki et al. |
| 5,914,760 A | 6/1999 | Daiku |
| 5,959,664 A | 9/1999 | Woodgate |
| 5,971,559 A | 10/1999 | Ishikawa et al. |
| 5,997,148 A | 12/1999 | Ohkawa |
| 6,014,164 A | 1/2000 | Woodgate et al. |
| 6,055,103 A | 4/2000 | Woodgate et al. |
| 6,061,489 A | 5/2000 | Ezra et al. |
| 6,075,557 A | 6/2000 | Holliman et al. |
| 6,099,758 A | 8/2000 | Verrall et al. |
| 6,108,059 A | 8/2000 | Yang |
| 6,144,433 A | 11/2000 | Tillin et al. |
| 6,169,589 B1 | 1/2001 | Kaneko |
| 6,199,995 B1 | 3/2001 | Umemoto et al. |
| 6,204,904 B1 | 3/2001 | Tillin et al. |
| 6,222,672 B1 | 4/2001 | Towler et al. |
| 6,232,592 B1 | 5/2001 | Sugiyama |
| 6,280,043 B1 | 8/2001 | Ohkawa |
| 6,305,813 B1 | 10/2001 | Lekson et al. |
| 6,335,999 B1 | 1/2002 | Winston et al. |
| 6,364,497 B1 | 4/2002 | Park et al. |
| 6,379,016 B1 | 4/2002 | Boyd et al. |
| 6,392,727 B1 | 5/2002 | Larson et al. |
| 6,422,713 B1 | 7/2002 | Fohl et al. |
| 6,437,915 B2 | 8/2002 | Moseley et al. |
| 6,464,365 B1 | 10/2002 | Gunn et al. |
| 6,663,254 B2 | 12/2003 | Ohsumi |
| 6,731,355 B2 | 5/2004 | Miyashita |
| 6,847,488 B2 | 1/2005 | Travis |
| 6,870,671 B2 | 3/2005 | Travis |
| 6,883,919 B2 | 4/2005 | Travis |
| 7,052,168 B2 | 5/2006 | Epstein et al. |
| 7,058,252 B2 | 6/2006 | Woodgate et al. |
| 7,067,985 B2 | 6/2006 | Adachi |
| 7,072,096 B2 | 7/2006 | Holman et al. |
| 7,073,933 B2 | 7/2006 | Gotoh et al. |
| 7,101,048 B2 | 9/2006 | Travis |
| 7,163,319 B2 | 1/2007 | Kuo et al. |
| 7,215,415 B2 | 5/2007 | Maehara et al. |
| 7,227,602 B2 | 6/2007 | Jeon et al. |
| 7,366,392 B2 | 4/2008 | Honma et al. |
| 7,410,286 B2 | 8/2008 | Travis |
| 7,430,358 B2 | 9/2008 | Qi et al. |
| 7,524,542 B2 | 4/2009 | Kim et al. |
| 7,528,893 B2 | 5/2009 | Schultz et al. |
| 7,528,913 B2 | 5/2009 | Kobayashi |
| 7,545,429 B2 | 6/2009 | Travis |
| 7,587,117 B2 | 9/2009 | Winston et al. |
| 7,614,777 B2 | 11/2009 | Koganezawa et al. |
| 7,633,586 B2 | 12/2009 | Winlow et al. |
| 7,660,047 B1 | 2/2010 | Travis et al. |
| 7,750,981 B2 | 7/2010 | Shestak et al. |
| 7,750,982 B2 | 7/2010 | Nelson et al. |
| 7,766,534 B2 | 8/2010 | Iwasaki |
| 7,834,834 B2 | 11/2010 | Takatani et al. |
| 7,944,428 B2 | 5/2011 | Travis |
| 7,970,246 B2 | 6/2011 | Travis et al. |
| 7,976,208 B2 | 7/2011 | Travis |
| 7,991,257 B1 | 8/2011 | Coleman |
| 8,016,475 B2 | 9/2011 | Travis |
| 8,070,346 B2 | 12/2011 | Maeda et al. |
| 8,098,350 B2 | 1/2012 | Sakai et al. |
| 8,154,686 B2 | 4/2012 | Mather et al. |
| 8,216,405 B2 | 7/2012 | Emerton et al. |
| 8,237,876 B2 | 8/2012 | Tan et al. |
| 8,249,408 B2 | 8/2012 | Coleman |
| 8,262,271 B2 | 9/2012 | Tillin et al. |
| 8,325,295 B2 | 12/2012 | Sugita et al. |
| 8,354,806 B2 | 1/2013 | Travis et al. |
| 8,469,575 B2 | 6/2013 | Weber et al. |
| 8,477,261 B2 | 7/2013 | Travis et al. |
| 8,534,901 B2 | 9/2013 | Panagotacos et al. |
| 8,646,931 B2 | 2/2014 | Choi et al. |
| 8,714,804 B2 | 5/2014 | Kim et al. |
| 8,801,260 B2 | 8/2014 | Urano et al. |
| 8,848,132 B2 | 9/2014 | O'Neill et al. |
| 8,939,595 B2 | 1/2015 | Choi et al. |
| 8,973,149 B2 | 3/2015 | Buck |
| 9,195,087 B2 | 11/2015 | Terashima |
| 9,274,260 B2 | 3/2016 | Urano et al. |
| 9,304,241 B2 | 4/2016 | Wang et al. |
| 9,324,234 B2 | 4/2016 | Ricci et al. |
| 9,448,355 B2 | 9/2016 | Urano et al. |
| 9,501,036 B2 | 11/2016 | Kang et al. |
| 9,519,153 B2 | 12/2016 | Robinson et al. |
| 9,541,698 B2 | 1/2017 | Wheatley et al. |
| 10,054,732 B2 | 8/2018 | Robinson et al. |
| 10,126,575 B1 | 11/2018 | Robinson et al. |
| 10,303,030 B2 | 5/2019 | Robinson et al. |
| 10,401,638 B2 | 9/2019 | Robinson et al. |
| 10,488,705 B2 | 11/2019 | Xu et al. |
| 10,527,775 B2 | 1/2020 | Yang et al. |
| 10,649,248 B1 | 5/2020 | Jiang et al. |
| 10,649,259 B2 | 5/2020 | Lee et al. |
| 10,935,714 B2 | 3/2021 | Woodgate et al. |
| 11,016,341 B2 | 5/2021 | Robinson et al. |
| 11,070,791 B2 | 7/2021 | Woodgate et al. |
| 2001/0024561 A1 | 9/2001 | Cornelissen et al. |
| 2002/0015300 A1 | 2/2002 | Katsu et al. |
| 2002/0024529 A1 | 2/2002 | Miller et al. |
| 2002/0171793 A1 | 11/2002 | Sharp et al. |
| 2003/0058381 A1 | 3/2003 | Shinohara et al. |

(56) References Cited

U.S. PATENT DOCUMENTS

| | | |
|---|---|---|
| 2003/0089956 A1 | 5/2003 | Mien et al. |
| 2003/0107686 A1 | 6/2003 | Sato et al. |
| 2003/0117792 A1 | 6/2003 | Kunimochi et al. |
| 2003/0137738 A1 | 7/2003 | Ozawa et al. |
| 2003/0214615 A1 | 11/2003 | Colgan et al. |
| 2004/0015729 A1 | 1/2004 | Elms et al. |
| 2004/0042233 A1 | 3/2004 | Suzuki et al. |
| 2004/0100598 A1 | 5/2004 | Adachi et al. |
| 2004/0109303 A1 | 6/2004 | Olczak |
| 2004/0125430 A1 | 7/2004 | Kasajima et al. |
| 2004/0141107 A1 | 7/2004 | Jones |
| 2004/0145703 A1 | 7/2004 | O'Connor et al. |
| 2004/0170011 A1 | 9/2004 | Kim et al. |
| 2004/0240777 A1 | 12/2004 | Woodgate et al. |
| 2004/0264910 A1 | 12/2004 | Suzuki et al. |
| 2005/0002174 A1 | 1/2005 | Min et al. |
| 2005/0111100 A1 | 5/2005 | Mather et al. |
| 2005/0117186 A1 | 6/2005 | Li et al. |
| 2005/0135116 A1 | 6/2005 | Epstein et al. |
| 2005/0157225 A1 | 7/2005 | Toyooka et al. |
| 2005/0180167 A1 | 8/2005 | Hoelen et al. |
| 2005/0190326 A1 | 9/2005 | Jeon et al. |
| 2005/0190329 A1 | 9/2005 | Okumura |
| 2005/0190345 A1 | 9/2005 | Dubin et al. |
| 2005/0213348 A1 | 9/2005 | Parikka et al. |
| 2005/0219693 A1 | 10/2005 | Hartkop et al. |
| 2005/0237488 A1 | 10/2005 | Yamasaki et al. |
| 2005/0264717 A1 | 12/2005 | Chien et al. |
| 2005/0270798 A1 | 12/2005 | Lee et al. |
| 2005/0276071 A1 | 12/2005 | Sasagawa et al. |
| 2006/0066785 A1 | 3/2006 | Moriya |
| 2006/0082702 A1 | 4/2006 | Jacobs et al. |
| 2006/0098296 A1 | 5/2006 | Woodgate et al. |
| 2006/0139447 A1 | 6/2006 | Unkrich |
| 2006/0146405 A1* | 7/2006 | Macmaster ............ H04N 5/72 348/E5.136 |
| 2006/0203162 A1 | 9/2006 | Ito et al. |
| 2006/0215244 A1 | 9/2006 | Yosha et al. |
| 2006/0221642 A1 | 10/2006 | Daiku |
| 2006/0244884 A1 | 11/2006 | Jeon et al. |
| 2006/0262258 A1 | 11/2006 | Wang et al. |
| 2006/0262558 A1 | 11/2006 | Cornelissen |
| 2006/0268207 A1 | 11/2006 | Tan et al. |
| 2006/0269213 A1 | 11/2006 | Hwang et al. |
| 2006/0285040 A1 | 12/2006 | Kobayashi |
| 2006/0291053 A1 | 12/2006 | Robinson et al. |
| 2006/0291243 A1 | 12/2006 | Niioka et al. |
| 2007/0025680 A1 | 2/2007 | Winston et al. |
| 2007/0035964 A1 | 2/2007 | Olczak |
| 2007/0047254 A1 | 3/2007 | Schardt et al. |
| 2007/0064163 A1 | 3/2007 | Tan et al. |
| 2007/0115551 A1 | 5/2007 | Spilman et al. |
| 2007/0115552 A1 | 5/2007 | Robinson et al. |
| 2007/0139772 A1 | 6/2007 | Wang |
| 2007/0188667 A1 | 8/2007 | Schwerdtner |
| 2007/0223251 A1 | 9/2007 | Liao |
| 2007/0223252 A1 | 9/2007 | Lee et al. |
| 2007/0285775 A1 | 12/2007 | Lesage et al. |
| 2008/0008434 A1 | 1/2008 | Lee et al. |
| 2008/0068329 A1 | 3/2008 | Shestak et al. |
| 2008/0068862 A1 | 3/2008 | Shimura |
| 2008/0084519 A1 | 4/2008 | Brigham et al. |
| 2008/0086289 A1 | 4/2008 | Brott |
| 2008/0129899 A1 | 6/2008 | Sharp |
| 2008/0158491 A1 | 7/2008 | Zhu et al. |
| 2008/0158912 A1 | 7/2008 | Chang et al. |
| 2008/0205066 A1 | 8/2008 | Ohta et al. |
| 2008/0225205 A1 | 9/2008 | Travis |
| 2008/0285310 A1 | 11/2008 | Aylward et al. |
| 2008/0297459 A1 | 12/2008 | Sugimoto et al. |
| 2008/0304282 A1 | 12/2008 | Mi et al. |
| 2008/0316198 A1 | 12/2008 | Fukushima et al. |
| 2008/0316768 A1 | 12/2008 | Travis |
| 2009/0016057 A1 | 1/2009 | Rinko |
| 2009/0040426 A1 | 2/2009 | Mather et al. |
| 2009/0067156 A1 | 3/2009 | Bonnett et al. |
| 2009/0085894 A1 | 4/2009 | Gandhi et al. |
| 2009/0086509 A1 | 4/2009 | Omori et al. |
| 2009/0109703 A1 | 4/2009 | Chen et al. |
| 2009/0128735 A1 | 5/2009 | Larson et al. |
| 2009/0128746 A1 | 5/2009 | Kean et al. |
| 2009/0135623 A1 | 5/2009 | Kunimochi |
| 2009/0140656 A1 | 6/2009 | Kohashikawa et al. |
| 2009/0160757 A1 | 6/2009 | Robinson |
| 2009/0174843 A1 | 7/2009 | Sakai et al. |
| 2009/0213298 A1 | 8/2009 | Mimura et al. |
| 2009/0213305 A1 | 8/2009 | Ohmuro et al. |
| 2009/0225380 A1 | 9/2009 | Schwerdtner et al. |
| 2009/0244415 A1 | 10/2009 | Ide |
| 2009/0278936 A1 | 11/2009 | Pastoor et al. |
| 2010/0002296 A1 | 1/2010 | Choi et al. |
| 2010/0053771 A1 | 3/2010 | Travis et al. |
| 2010/0091254 A1 | 4/2010 | Travis et al. |
| 2010/0128200 A1 | 5/2010 | Morishita et al. |
| 2010/0149459 A1* | 6/2010 | Yabuta ............ G02F 1/133528 349/74 |
| 2010/0177113 A1 | 7/2010 | Gay et al. |
| 2010/0177387 A1 | 7/2010 | Travis et al. |
| 2010/0188438 A1 | 7/2010 | Kang |
| 2010/0188602 A1 | 7/2010 | Feng |
| 2010/0205667 A1 | 8/2010 | Anderson et al. |
| 2010/0214135 A1 | 8/2010 | Bathiche et al. |
| 2010/0220260 A1 | 9/2010 | Sugita et al. |
| 2010/0231498 A1 | 9/2010 | Large et al. |
| 2010/0238376 A1* | 9/2010 | Sakai ................ G02F 1/13363 349/62 |
| 2010/0277575 A1 | 11/2010 | Ismael et al. |
| 2010/0278480 A1 | 11/2010 | Vasylyev |
| 2010/0283930 A1 | 11/2010 | Park et al. |
| 2010/0289989 A1* | 11/2010 | Adachi ................ G02F 1/1323 349/99 |
| 2010/0295755 A1 | 11/2010 | Broughton et al. |
| 2010/0300608 A1 | 12/2010 | Emerton et al. |
| 2010/0328438 A1 | 12/2010 | Ohyama et al. |
| 2011/0018860 A1 | 1/2011 | Parry-Jones et al. |
| 2011/0032483 A1 | 2/2011 | Hruska et al. |
| 2011/0043142 A1 | 2/2011 | Travis et al. |
| 2011/0044056 A1 | 2/2011 | Travis et al. |
| 2011/0176089 A1 | 7/2011 | Ishikawa et al. |
| 2011/0187293 A1 | 8/2011 | Travis |
| 2011/0188120 A1 | 8/2011 | Tabirian et al. |
| 2011/0216266 A1 | 9/2011 | Travis |
| 2011/0241983 A1 | 10/2011 | Chang |
| 2011/0242298 A1 | 10/2011 | Bathiche et al. |
| 2011/0255303 A1 | 10/2011 | Nichol et al. |
| 2011/0255304 A1 | 10/2011 | Kinoshita |
| 2011/0285927 A1 | 11/2011 | Schultz et al. |
| 2011/0286222 A1 | 11/2011 | Coleman |
| 2011/0310232 A1 | 12/2011 | Wilson et al. |
| 2011/0321143 A1 | 12/2011 | Angaluri et al. |
| 2012/0002121 A1 | 1/2012 | Pirs et al. |
| 2012/0002295 A1 | 1/2012 | Dobschal et al. |
| 2012/0086875 A1 | 4/2012 | Yokota |
| 2012/0127573 A1 | 5/2012 | Robinson et al. |
| 2012/0147280 A1 | 6/2012 | Osterman et al. |
| 2012/0188792 A1 | 7/2012 | Matsumoto et al. |
| 2012/0212414 A1 | 8/2012 | Osterhout et al. |
| 2012/0235891 A1 | 9/2012 | Nishitani et al. |
| 2012/0243204 A1 | 9/2012 | Robinson |
| 2012/0294037 A1 | 11/2012 | Holman et al. |
| 2012/0299913 A1 | 11/2012 | Robinson et al. |
| 2012/0314145 A1 | 12/2012 | Robinson |
| 2012/0320311 A1 | 12/2012 | Gotou et al. |
| 2012/0327101 A1 | 12/2012 | Blixt et al. |
| 2013/0039062 A1 | 2/2013 | Vinther et al. |
| 2013/0057807 A1 | 3/2013 | Goto et al. |
| 2013/0100097 A1 | 4/2013 | Martin |
| 2013/0107174 A1 | 5/2013 | Yun et al. |
| 2013/0128165 A1 | 5/2013 | Lee et al. |
| 2013/0242231 A1 | 9/2013 | Kurata et al. |
| 2013/0242612 A1 | 9/2013 | Lee et al. |
| 2013/0278544 A1 | 10/2013 | Cok |
| 2013/0293793 A1 | 11/2013 | Lu |
| 2013/0300985 A1 | 11/2013 | Bulda |

(56) References Cited

U.S. PATENT DOCUMENTS

| | | |
|---|---|---|
| 2013/0307831 A1 | 11/2013 | Robinson et al. |
| 2013/0308339 A1 | 11/2013 | Woodgate et al. |
| 2013/0321340 A1 | 12/2013 | Seo et al. |
| 2013/0328866 A1 | 12/2013 | Woodgate et al. |
| 2014/0009508 A1 | 1/2014 | Woodgate et al. |
| 2014/0022619 A1 | 1/2014 | Woodgate et al. |
| 2014/0071382 A1 | 3/2014 | Scardato |
| 2014/0098418 A1 | 4/2014 | Lin |
| 2014/0098558 A1 | 4/2014 | Vasylyev |
| 2014/0111760 A1 | 4/2014 | Guo et al. |
| 2014/0132887 A1* | 5/2014 | Kurata ............... G02B 6/0018 349/65 |
| 2014/0133181 A1 | 5/2014 | Ishida et al. |
| 2014/0140091 A1 | 5/2014 | Vasylyev |
| 2014/0140095 A1 | 5/2014 | Yuki et al. |
| 2014/0176873 A1 | 6/2014 | Shinohara et al. |
| 2014/0201844 A1 | 7/2014 | Buck |
| 2014/0211125 A1 | 7/2014 | Kurata |
| 2014/0232960 A1 | 8/2014 | Schwartz et al. |
| 2014/0240344 A1 | 8/2014 | Tomono et al. |
| 2014/0240828 A1* | 8/2014 | Robinson ............... G02B 30/25 359/465 |
| 2014/0240839 A1 | 8/2014 | Yang et al. |
| 2014/0268358 A1 | 9/2014 | Kusaka et al. |
| 2014/0286043 A1 | 9/2014 | Sykora et al. |
| 2014/0286044 A1 | 9/2014 | Johnson et al. |
| 2014/0289835 A1 | 9/2014 | Varshavsky et al. |
| 2014/0340728 A1 | 11/2014 | Taheri |
| 2014/0361990 A1 | 12/2014 | Leister |
| 2014/0367873 A1 | 12/2014 | Yang et al. |
| 2015/0055366 A1 | 2/2015 | Chang et al. |
| 2015/0116212 A1 | 4/2015 | Freed et al. |
| 2015/0177447 A1 | 6/2015 | Woodgate et al. |
| 2015/0177563 A1 | 6/2015 | Cho et al. |
| 2015/0185398 A1 | 7/2015 | Chang et al. |
| 2015/0205157 A1* | 7/2015 | Sakai ............... G02F 1/13363 349/62 |
| 2015/0268479 A1 | 9/2015 | Woodgate et al. |
| 2015/0286061 A1 | 10/2015 | Seo et al. |
| 2015/0286817 A1 | 10/2015 | Haddad et al. |
| 2015/0293289 A1 | 10/2015 | Shinohara et al. |
| 2015/0301400 A1 | 10/2015 | Kimura et al. |
| 2015/0338564 A1 | 11/2015 | Zhang et al. |
| 2015/0346417 A1 | 12/2015 | Powell |
| 2015/0346532 A1 | 12/2015 | Wook Do et al. |
| 2015/0355490 A1 | 12/2015 | Kao et al. |
| 2015/0378085 A1 | 12/2015 | Robinson et al. |
| 2016/0054508 A1 | 2/2016 | Hirayama et al. |
| 2016/0103264 A1 | 4/2016 | Lee et al. |
| 2016/0132721 A1 | 5/2016 | Bostick et al. |
| 2016/0147074 A1 | 5/2016 | Kobayashi et al. |
| 2016/0154259 A1 | 6/2016 | Kim et al. |
| 2016/0216420 A1 | 7/2016 | Gaides et al. |
| 2016/0216540 A1 | 7/2016 | Cho et al. |
| 2016/0224106 A1 | 8/2016 | Liu |
| 2016/0238869 A1 | 8/2016 | Osterman et al. |
| 2016/0259115 A1 | 9/2016 | Kitano et al. |
| 2016/0334898 A1 | 11/2016 | Kwak et al. |
| 2016/0349444 A1 | 12/2016 | Robinson et al. |
| 2016/0356943 A1 | 12/2016 | Choi et al. |
| 2016/0357046 A1 | 12/2016 | Choi et al. |
| 2017/0003436 A1 | 1/2017 | Inoue et al. |
| 2017/0031206 A1 | 2/2017 | Smith et al. |
| 2017/0090103 A1 | 3/2017 | Holman |
| 2017/0092187 A1 | 3/2017 | Bergquist |
| 2017/0092229 A1 | 3/2017 | Greeneboum et al. |
| 2017/0115485 A1 | 4/2017 | Saito et al. |
| 2017/0123241 A1 | 5/2017 | Su et al. |
| 2017/0139110 A1 | 5/2017 | Woodgate et al. |
| 2017/0168633 A1 | 6/2017 | Kwak et al. |
| 2017/0205558 A1 | 7/2017 | Hirayama et al. |
| 2017/0236494 A1 | 8/2017 | Sommerlade et al. |
| 2017/0269283 A1 | 9/2017 | Wang et al. |
| 2017/0269285 A1 | 9/2017 | Hirayama et al. |
| 2017/0276960 A1* | 9/2017 | Osterman ............... G02F 1/1393 |
| 2017/0315423 A1 | 11/2017 | Serati et al. |
| 2017/0329399 A1 | 11/2017 | Azam et al. |
| 2017/0336661 A1 | 11/2017 | Harrold et al. |
| 2017/0339398 A1 | 11/2017 | Woodgate et al. |
| 2017/0343715 A1 | 11/2017 | Fang et al. |
| 2017/0363798 A1 | 12/2017 | Hirayama et al. |
| 2018/0014007 A1 | 1/2018 | Brown |
| 2018/0052346 A1 | 2/2018 | Sakai et al. |
| 2018/0082068 A1 | 3/2018 | Lancioni et al. |
| 2018/0095581 A1 | 4/2018 | Hwang et al. |
| 2018/0113334 A1 | 4/2018 | Fang et al. |
| 2018/0188576 A1 | 7/2018 | Xu et al. |
| 2018/0188603 A1 | 7/2018 | Fang et al. |
| 2018/0196275 A1 | 7/2018 | Robinson et al. |
| 2018/0210243 A1 | 7/2018 | Fang et al. |
| 2018/0231811 A1 | 8/2018 | Wu |
| 2018/0252949 A1* | 9/2018 | Klippstein ............... B32B 3/085 |
| 2018/0259799 A1 | 9/2018 | Kroon |
| 2018/0259812 A1 | 9/2018 | Goda et al. |
| 2018/0284341 A1 | 10/2018 | Woodgate et al. |
| 2018/0321523 A1 | 11/2018 | Robinson et al. |
| 2018/0321553 A1 | 11/2018 | Robinson et al. |
| 2018/0329245 A1 | 11/2018 | Robinson et al. |
| 2018/0364526 A1 | 12/2018 | Finnemeyer et al. |
| 2019/0086706 A1 | 3/2019 | Robinson et al. |
| 2019/0121173 A1 | 4/2019 | Robinson et al. |
| 2019/0154896 A1 | 5/2019 | Yanai |
| 2019/0196235 A1 | 6/2019 | Robinson et al. |
| 2019/0196236 A1 | 6/2019 | Chen et al. |
| 2019/0197928 A1 | 6/2019 | Schubert et al. |
| 2019/0215509 A1 | 7/2019 | Woodgate et al. |
| 2019/0227366 A1 | 7/2019 | Harrold et al. |
| 2019/0235304 A1 | 8/2019 | Tamada et al. |
| 2019/0250458 A1 | 8/2019 | Robinson et al. |
| 2019/0278010 A1 | 9/2019 | Sakai et al. |
| 2019/0293858 A1 | 9/2019 | Woodgate et al. |
| 2019/0293983 A1 | 9/2019 | Robinson et al. |
| 2019/0353944 A1 | 11/2019 | Acreman et al. |
| 2019/0361165 A1 | 11/2019 | Chang et al. |
| 2020/0026125 A1 | 1/2020 | Robinson et al. |
| 2020/0159055 A1 | 5/2020 | Robinson et al. |
| 2020/0218101 A1 | 7/2020 | Ihas et al. |
| 2020/0225402 A1 | 7/2020 | Ihas et al. |
| 2020/0233142 A1 | 7/2020 | Liao et al. |
| 2021/0149233 A1 | 5/2021 | Robinson et al. |

FOREIGN PATENT DOCUMENTS

| | | |
|---|---|---|
| CN | 1776484 A | 5/2006 |
| CN | 1910399 A | 2/2007 |
| CN | 2872404 | 2/2007 |
| CN | 101256251 A | 9/2008 |
| CN | 101364004 A | 2/2009 |
| CN | 101518095 A | 8/2009 |
| CN | 101681061 A | 3/2010 |
| CN | 103473494 A | 12/2013 |
| CN | 104133292 A | 11/2014 |
| CN | 104303085 A | 1/2015 |
| CN | 104321686 A | 1/2015 |
| CN | 104380177 A | 2/2015 |
| CN | 204740413 U | 11/2015 |
| CN | 106104372 A | 11/2016 |
| CN | 106415342 A | 2/2017 |
| CN | 209171779 U | 7/2019 |
| EP | 0830984 A2 | 3/1998 |
| EP | 0860729 A2 | 8/1998 |
| EP | 0939273 A1 | 9/1999 |
| EP | 2003394 A2 | 12/2008 |
| GB | 2418518 A | 3/2006 |
| GB | 2428100 A | 1/2007 |
| GB | 2428345 A | 1/2007 |
| GB | 2482065 A | 1/2012 |
| GB | 2486935 B | 9/2013 |
| JP | H01130783 U | 9/1989 |
| JP | H08211334 | 8/1996 |
| JP | H08254617 | 10/1996 |
| JP | H08340556 | 12/1996 |
| JP | H11174489 A | 7/1999 |
| JP | 2000200049 A | 7/2000 |

(56) References Cited

FOREIGN PATENT DOCUMENTS

| JP | 2001093321 A | 4/2001 |
|---|---|---|
| JP | 2002049004 A | 2/2002 |
| JP | 2003215349 A | 7/2003 |
| JP | 2003215705 A | 7/2003 |
| JP | 2004319364 A | 11/2004 |
| JP | 2005135844 A | 5/2005 |
| JP | 2005183030 A | 7/2005 |
| JP | 2005259361 A | 9/2005 |
| JP | 2006004877 A | 1/2006 |
| JP | 2006031941 A | 2/2006 |
| JP | 2007148279 A | 6/2007 |
| JP | 3968742 B2 | 8/2007 |
| JP | 2007273288 A | 10/2007 |
| JP | 2008204874 A | 9/2008 |
| JP | 2013540083 | 10/2013 |
| KR | 20030064258 | 7/2003 |
| KR | 20090932304 | 12/2009 |
| KR | 20110006773 A | 1/2011 |
| KR | 20110017918 A | 2/2011 |
| KR | 20110067534 A | 6/2011 |
| KR | 20120011228 A | 2/2012 |
| KR | 20120048301 A | 5/2012 |
| KR | 101990286 B1 | 6/2019 |
| TW | M537663 U | 3/2017 |
| TW | I612360 B | 1/2018 |
| WO | 1999011074 A1 | 3/1999 |
| WO | 2001061241 A1 | 8/2001 |
| WO | 2005071449 A2 | 8/2005 |
| WO | 2010021926 A2 | 2/2010 |
| WO | 2011022342 A2 | 2/2011 |
| WO | 2014011328 A1 | 1/2014 |
| WO | 2014130860 A1 | 8/2014 |
| WO | 2015040776 A1 | 3/2015 |
| WO | 2015057625 A1 | 4/2015 |
| WO | 2015143227 A1 | 9/2015 |
| WO | 2015157184 A1 | 10/2015 |
| WO | 2015190311 A1 | 12/2015 |
| WO | 2015200814 A1 | 12/2015 |
| WO | 2016195786 A1 | 12/2016 |
| WO | 2017050631 A1 | 3/2017 |
| WO | 2018035492 A1 | 2/2018 |
| WO | 2018208618 A1 | 11/2018 |
| WO | 2019055755 A1 | 3/2019 |
| WO | 2019067846 A1 | 4/2019 |
| WO | 2019147762 A1 | 8/2019 |

OTHER PUBLICATIONS

AU-2015258258 Australian Office Action of Australian Patent Office dated Jun. 9, 2016.
CA-2817044 Canadian office action dated Jul. 14, 2016.
CN-201180065590.0 Office first action dated Dec. 31, 2014.
CN-201180065590.0 Office fourth action dated Jan. 4, 2017.
CN-201180065590.0 Office second action dated Oct. 21, 2015.
CN-201180065590.0 Office Third action dated Jun. 6, 2016.
CN-201480023023.2 Office first action dated Aug. 12, 2016.
EP-11842021.5 Office Action dated Dec. 17, 2014.
EP-11842021.5 Office Action dated Oct. 2, 2015.
EP-11842021.5 Office Action dated Sep. 2, 2016.
JP-2013540083 Notice of reasons for rejection dated Jun. 30, 2015.
JP-2013540083 Notice of reasons for rejection with translation dated Jun. 21, 2016.
PCT/US2011/061511 International Preliminary Report on Patentability dated May 21, 2013.
PCT/US2011/061511 International search report and written opinion of international searching authority dated Jun. 29, 2012.
PCT/US2012/037677 International search report and written opinion of international searching authority dated Jun. 29, 2012.
PCT/US2012/042279 International search report and written opinion of international searching authority dated Feb. 26, 2013.
PCT/US2012/052189 International search report and written opinion of the international searching authority dated Jan. 29, 2013.
PCT/US2013/041192 International search report and written opinion of international searching authority dated Aug. 28, 2013.
PCT/US2013/041228 International search report and written opinion of international searching authority dated Aug. 23, 2013.
PCT/US2013/041235 International search report and written opinion of international searching authority dated Aug. 23, 2013.
PCT/US2013/041548 International search report and written opinion of international searching authority dated Aug. 27, 2013.
PCT/US2013/041619 International search report and written opinion of international searching authority dated Aug. 27, 2013.
PCT/US2013/041655 International search report and written opinion of international searching authority dated Aug. 27, 2013.
PCT/US2013/041683 International search report and written opinion of international searching authority dated Aug. 27, 2013.
PCT/US2013/041697 International search report and written opinion of international searching authority dated Aug. 23, 2013.
PCT/US2013/041703 International search report and written opinion of international searching authority dated Aug. 27, 2013.
PCT/US2013/063125 International search report and written opinion of international searching authority dated Jan. 20, 2014.
PCT/US2013/063133 International search report and written opinion of international searching authority dated Jan. 20, 2014.
PCT/US2013/077288 International search report and written opinion of international searching authority dated Apr. 18, 2014.
PCT/US2014/017779 International search report and written opinion of international searching authority dated May 28, 2014.
RU-2013122560 First office action dated Jan. 22, 2014.
RU-2013122560 Second office action dated Apr. 10, 2015.
Tabiryan et al., "The Promise of Diffractive Waveplates," Optics and Photonics News, vol. 21, Issue 3, pp. 40-45 (Mar. 2010).
Travis, et al. "Backlight for view-sequential autostereo 3D", Microsoft E&DD Applied Sciences, (date unknown), 25 pages.
Weindorf et al., "Active Circular Polarizer OLED E-Mirror", Proceedings of the Society for Information Display 25th Annual Symposium on Vehicle Displays, Livonia, MI, pp. 225-237, Sep. 25-26, 2018.
Adachi, et al. "P- 228L: Late-News Poster: Controllable Viewing-Angle Displays using a Hybrid Aligned Nematic Liquid Crystal Cell", ISSN, SID 2006 Digest, pp. 705-708.
Brudy et al., "Is Anyone Looking? Mitigating Shoulder Surfing on Public Displays through Awareness and Protection", Proceedings of the International Symposium on Persuasive Displays (Jun. 3, 2014), pp. 1-6.
CN201780030715.3 Notification of the First Office Action dated Jan. 21, 2020.
EP-16860628.3 Extended European Search Report of European Patent Office dated Apr. 26, 2019.
EP-17799963.8 Extended European Search Report of European Patent Office dated Oct. 9, 2019.
Gass, et al. "Privacy LCD Technology for Cellular Phones", Sharp Laboratories of Europe Ltd, Mobile LCD Group, Feb. 2007, pp. 45-49.
Ishikawa, T., "New Design for a Highly Collimating Turning Film", SID 06 Digest, pp. 514-517.
Kalantar, et al. "Backlight Unit With Double Surface Light Emission", J. Soc. Inf. Display, vol. 12, Issue 4, pp. 379-387 (Dec. 2004).
PCT/US2016/058695 International search report and written opinion of the international searching authority dated Feb. 28, 2017.
PCT/US2017/032734 International search report and written opinion of the international searching authority dated Jul. 27, 2017.
PCT/US2018/031206 International search report and written opinion of the international searching authority dated Jul. 20, 2018.
PCT/US2018/031218 International Preliminary Report on Patentability dated Nov. 21, 2019.
PCT/US2018/031218 International search report and written opinion of the international searching authority dated Jul. 19, 2018.
PCT/US2018/051021 International search report and written opinion of the international searching authority dated Nov. 21, 2018.
PCT/US2018/051027 International search report and written opinion of the international searching authority dated Nov. 30, 2018.
PCT/US2018/053328 International search report and written opinion of the international searching authority dated Nov. 30, 2018.

(56) References Cited

OTHER PUBLICATIONS

PCT/US2018/059249 International search report and written opinion of the international searching authority dated Jan. 3, 2019.
PCT/US2018/059256 International search report and written opinion of the international searching authority dated Jan. 3, 2019.
PCT/US2019/014889 International search report and written opinion of the international searching authority dated May 24, 2019.
PCT/US2019/014902 International search report and written opinion of the international searching authority dated Jun. 25, 2019.
PCT/US2019/023659 International search report and written opinion of the international searching authority dated Jun. 10, 2019.
PCT/US2019/038409 International search report and written opinion of the international searching authority dated Sep. 19, 2019.
PCT/US2019/038466 International search report and written opinion of the international searching authority dated Nov. 5, 2019.
PCT/US2019/042027 International search report and written opinion of the international searching authority dated Oct. 15, 2019.
PCT/US2019/054291 International search report and written opinion of the international searching authority mailed Jan. 6, 2020.
PCT/US2019/059990 International search report and written opinion of the international searching authority dated Feb. 28, 2020.
PCT/US2019/066208 International search report and written opinion of the international searching authority dated Feb. 27, 2020.
PCT/US2020/017537 International search report and written opinion of the international searching authority dated Apr. 29, 2020.
Weindorf et al., "Active Circular Polarizer OLED E-Mirror", Proceedings of the Society for Information Display 25th Annual Symposium of Vehicle Displays, Livonia, MI, pp. 225-237, Sep. 25-26, 2018.
PCT/US2020/040686 International search report and written opinion of the international searching authority dated Nov. 20, 2020.
PCT/US2020/044574 International search report and written opinion of the international searching authority dated Oct. 21, 2020.
Cheng, et al., "Fast-Response Liquid Crystal Variable Optical Retarder and Multilevel Attenuator," Optical Engineering 52 (10), 107105 (Oct. 16, 2013). (Year: 2013).
PCT/US2021/029937 International search report and written opinion of the international searching authority dated Aug. 6, 2021.
PCT/US2021/029944 International search report and written opinion of the international searching authority dated Aug. 3, 2021.
PCT/US2021/029947 International search report and written opinion of the international searching authority dated Aug. 10, 2021.
PCT/US2021/029954 International search report and written opinion of the international searching authority dated Aug. 10, 2021.
PCT/US2021/029958 International search report and written opinion of the international searching authority dated Aug. 10, 2021.
PCT/US2020/053863 International search report and written opinion of the international searching authority dated Mar. 12, 2021.
PCT/US2020/060155 International search report and written opinion of the international searching authority dated Feb. 5, 2021.
PCT/US2020/060191 International search report and written opinion of the international searching authority dated Feb. 8, 2021.
PCT/US2020/063638 International search report and written opinion of the international searching authority dated Mar. 2, 2021.
PCT/US2020/064633 International search report and written opinion of the international searching authority dated Mar. 15, 2021.
Robson, et al. "Spatial and temporal contrast-sensitivity functions of the visual system", J. Opt. Soc. Amer., vol. 56, pp. 1141-1142 (1966).
Simonyan et al., "Very Deep Convolutional Networks For Large-Scale Image Recognition", ICLR 2015.
CN201880042320.X Notification of the First Office Action dated May 25, 2021.
EP-18855604.7 Extended European Search Report of European Patent Office dated Jun. 1, 2021.
EP-18857077.4 Extended European Search Report of European Patent Office dated Jun. 16, 2021.
CN201680061632.6 Notification of the First Office Action dated Sep. 14, 2021.
EP-19743619.9 Extended European Search of European Patent Office dated Nov. 23, 2021.
EP-19743701.5 Extended European Search Report of European Patent Office dated Nov. 24, 2021.
EP19771688.9 Extended European Search Report of European Patent Office dated Dec. 2, 2021.
PCT/US2021/043435 International search report and written opinion of the international searching authority dated Nov. 1, 2021.
PCT/US2021/043444 International search report and written opinion of the international searching authority dated Nov. 1, 2021.
CN-201980020303.0—Notification of the First Office Action dated Dec. 16, 2021.

* cited by examiner

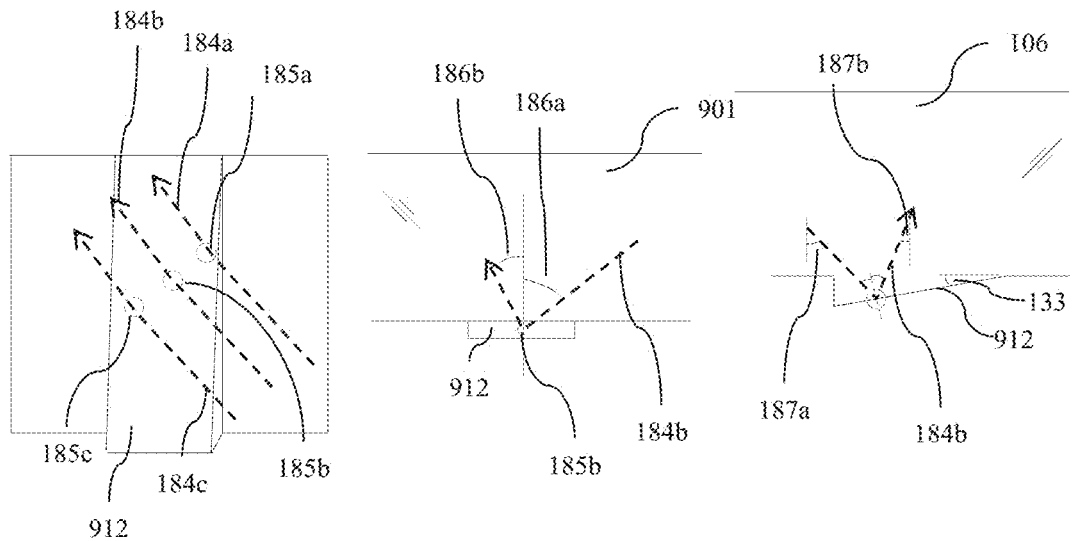
*FIG. 12D*  *FIG. 12E*  *FIG. 12F*
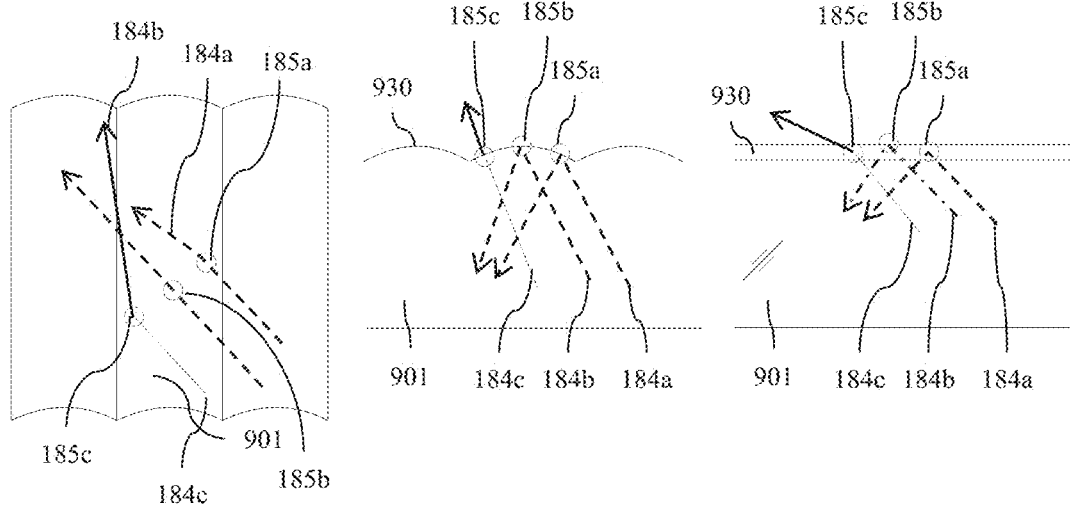
*FIG. 12G*  *FIG. 12H*  *FIG. 12I*

OPTICAL STACK FOR DIRECTIONAL DISPLAY

TECHNICAL FIELD

This disclosure generally relates to illumination from light modulation devices, and more specifically relates to optical stacks for use in display including privacy display, low stray light display and automotive display.

BACKGROUND

Privacy displays provide image visibility to a primary user that is typically in an on-axis position and reduced visibility of image content to a snooper, that is typically in an off-axis position. A privacy function may be provided by micro-louvre optical films that transmit some light from a display in an on-axis direction with low luminance in off-axis positions. However such films have high losses for head-on illumination and the micro-louvres may cause Moiré artefacts due to beating with the pixels of the spatial light modulator. The pitch of the micro-louvre may need selection for panel resolution, increasing inventory and cost.

Privacy may alternatively be provided by directional backlights for a liquid crystal display (LCD) spatial light modulator that achieve reduced off-axis luminance. Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in U.S. Pat. No. 9,519,153, which is herein incorporated by reference in its entirety.

Control of off-axis privacy may further be provided by means of contrast reduction, for example by adjusting the liquid crystal bias tilt in an In-Plane-Switching LCD.

Compensating films added inside the polarisers of LCDs such as twisted nematic LCD displays are known. The purpose of the films is often described as to "increase the viewing angle", but more accurately what the films do is to improve the contrast of the display at high oblique angles. The added films act to lower the unwanted light leakage of the liquid crystal at high angles for the black parts of the image, so that phenomenon of "contrast inversion" is avoided. Contrast inversion occurs when the image grayscale inverts, i.e. the black parts of the image become brighter than the white parts, inverting the contrast of the intended image. Thus adding the films increases the angular range before contrast inversion occurs. These films are inserted between the pixellated liquid crystal display layer and its polarisers.

BRIEF SUMMARY

According to a first aspect of the present disclosure there is provided a display device comprising: a spatial light modulator; at least one display polariser arranged on a side of the spatial light modulator; an additional polariser arranged on the same side of the spatial light modulator as the display polariser; and at least one passive retarder arranged between the additional polariser and the display polariser. The display polariser may have an electric vector transmission direction that is parallel to the electric vector transmission direction of the additional polariser. Advantageously, display luminance may be reduced for off-axis viewing positions. The visibility of a displayed image to off-axis snoopers may be reduced while on-axis luminance to a head-on user may be maintained. Stray light to off-axis users may be reduced, achieving reduced room illuminance for night time use.

The at least one passive retarder may comprise at least two passive retarders with at least two different orientations of slow axes. Advantageously the field of view over which a snooper may have low image visibility of a privacy display or the region over which stray light is provided is reduced.

The at least one passive retarder may comprise a pair of passive retarders which have slow axes in the plane of the passive retarders that are crossed. The pair of passive retarders may have slow axes that extend at 45° and at 135°, respectively, with respect to an electric vector transmission direction that is parallel to the electric vector transmission of the display polariser. Advantageously a luminance reduction in viewing quadrants may be reduced.

The display device may further comprise an additional pair of passive retarders disposed between the first mentioned pair of passive retarders and which have slow axes in the plane of the passive retarders that are crossed. The additional pair of passive retarders may have slow axes that each extend at 0° and at 90°, respectively, with respect to an electric vector transmission direction that is parallel to the electric vector transmission of the display polariser. The pair of retarders each comprise plural A-plates having respective slow axes aligned at different angles from each other. Advantageously display visibility may be reduced for viewing quadrants and in vertical and horizontal viewing directions. Privacy operation may be provided for landscape and portrait operation of a mobile display device.

The retardance for light of a wavelength of 550 nm of each passive retarder may be in a range from 600 nm to 850 nm, preferably in a range from 650 nm to 730 nm, and most preferably in a range from 670 nm to 710 nm. Advantageously image colouration changes for off-axis viewing locations may be reduced.

The at least one passive retarder may comprise a passive retarder having a slow axis perpendicular to the plane of the passive retarder. Advantageously the number of retarder layers may be reduced in comparison to arrangements with a pair of crossed retarders.

The at least one passive retarder may comprise two passive retarders having a slow axis perpendicular to the plane of the passive retarders, and a pair of passive retarders which have slow axes in the plane of the passive retarders that are crossed. The pair of passive retarders may have slow axes in the plane of the passive retarders that extend at 22.5° and 112.5°, respectively, with respect to an electric vector transmission direction that is parallel to the electric vector transmission of the display polariser. The passive retarders may have a slow axis perpendicular to the plane of the passive retarders alternate with the pair of passive retarders that have slow axes in the plane of the passive retarders. Advantageously the viewing area before luminance roll-off may be increased, improving display uniformity.

The at least one passive retarder may comprise a passive retarder which has a slow axis with a component in the plane of the passive retarder and a component perpendicular to the plane of the passive retarder. The component in the plane of the passive retarder may extend at 0°, with respect to an electric vector transmission direction that is parallel or perpendicular to the electric vector transmission of the display polariser. Advantageously luminance may be reduced for lateral viewing directions. A mobile display may be comfortably rotated about a horizontal axis.

The at least one passive retarder which has a slow axis with a component in the plane of the passive retarder and a component perpendicular to the plane of the passive retarder may further comprise a passive retarder having a slow axis perpendicular to the plane of the passive retarder or a pair of passive retarders which have slow axes in the plane of the passive retarders that are crossed. Advantageously increased luminance reduction may be provided for lateral off-axis directions.

The display device may further comprise at least one further passive retarder and a further additional polariser. The at least one further passive retarder may be arranged between the first mentioned additional polariser and the further additional polariser. Advantageously increased reduction of stray light and reduced visibility to an off-axis snooper may be achieved.

The spatial light modulator may be a transmissive spatial light modulator and the display device further comprises a backlight arranged to output light. The backlight may provide a luminance at polar angles to the normal to the spatial light modulator greater than 45 degrees that is at most 10% of the luminance along the normal to the spatial light modulator, preferably at most 5% of the luminance along the normal to the spatial light modulator, and more preferably at most 2.5% of the luminance along the normal to the spatial light modulator. The display device may comprise a luminance polar field-of-view profile that has reduced off-axis visibility for off-axis viewing positions that cooperates with the passive retarders and additional polariser to further reduce off-axis image visibility.

The backlight may comprise: an array of light sources; a directional waveguide comprising: an input end extending in a lateral direction along a side of the directional waveguide, the light sources being disposed along the input end and arranged to input input light into the waveguide; and opposed first and second guide surfaces extending across the directional waveguide from the input end for guiding light input at the input end along the waveguide, the waveguide being arranged to deflect input light guided through the directional waveguide to exit through the first guide surface.

The backlight may be a collimating backlight. The backlight may further comprise a light turning film and the directional waveguide may be a collimating waveguide. The collimating waveguide may comprise (i) a plurality of elongate lenticular elements; and (ii) a plurality of inclined light extraction features, wherein the plurality of elongate lenticular elements and the plurality of inclined light extraction features are oriented to deflect input light guided through the directional waveguide to exit through the first guide surface. Advantageously a thin backlight may be provided with a narrow output luminance profile that cooperates with the passive retarders and additional polariser to further reduce off-axis image visibility.

The directional waveguide may be an imaging waveguide arranged to image the light sources in the lateral direction so that the output light from the light sources is directed into respective optical windows in output directions that are distributed in dependence on the input positions of the light sources. The imaging waveguide may comprise: a reflective end for reflecting the input light back along the imaging waveguide, wherein the second guide surface may be arranged to deflect the reflected input light through the first guide surface as output light; the second guide surface may comprise light extraction features and intermediate regions between the light extraction features, the light extraction features being oriented to deflect the reflected input light through the first guide surface as output light and the intermediate regions being arranged to direct light through the waveguide without extracting it; and the reflective end may have positive optical power in the lateral direction extending between sides of the waveguide that extend between the first and second guide surfaces. Advantageously a narrow output luminance profile may be provided that cooperates with the passive retarders and additional polariser to further reduce off-axis image visibility.

The display polariser may be an input polariser arranged on the input side of the spatial light modulator between the backlight and the spatial light modulator, and the additional polariser is arranged between the input polariser and the backlight.

The additional polariser may be a reflective polariser. The additional polariser may provide polarisation recirculation for a backlight. Advantageously display efficiency may be increased, and display thickness reduced.

The display device may further comprise an output polariser arranged on the output side of the spatial light modulator. The display polariser may be an output polariser arranged on the output side of the spatial light modulator. The display device may further comprise an input polariser arranged on the input side of the spatial light modulator.

The display device may further comprise a further additional polariser arranged on the input side of the spatial light modulator and at least one further passive retarder arranged between the at least one further additional polariser and the input polariser. Advantageously the off-axis luminance may be further reduced to provide improved privacy performance and reduce stray light.

The spatial light modulator may be an emissive spatial light modulator, and the display polariser may be an output polariser arranged on the output side of the emissive spatial light modulator.

The display device may be arranged in a vehicle. The display device may be arranged beneath a transparent window in the vehicle. The display device may be arranged in front of a seat in the vehicle. Advantageously stray light from a display may be provided to a driver or a passenger. Stray light levels may be reduced for night time operation. Display size for a given stray light limit in a cabin may be increased. Entertainment information may be provided to a passenger without distraction of a driver.

According to a second aspect of the present disclosure there is provided a view angle control optical element for application to a display device comprising a spatial light modulator and a display polariser, the view angle control optical element comprising: control polariser and at least one passive retarder for arrangement between the control polariser and the display polariser on application of the view angle control optical element to the display device. The at least one passive retarder may comprise at least two passive retarders with at least two different orientations of slow axes.

The at least one passive retarder may comprise a pair of passive retarders which have slow axes in the plane of the passive retarders that are crossed. The pair of passive retarders may have slow axes that extend at 45° and at 135°, respectively, with respect to an electric vector transmission direction that is parallel to the electric vector transmission of the control polariser. The view angle control optical element may further comprise an additional pair of passive retarders disposed between the first mentioned pair of passive retarders and which have slow axes in the plane of the passive retarders that are crossed. The additional pair of passive retarders may have slow axes that each extend at 0° and at 90°, respectively, with respect to an electric vector transmission direction that is parallel to the electric vector transmission of the control polariser. The retardance for light of a wavelength of 550 nm of each passive retarder may be in a range from 600 nm to 850 nm, preferably in a range from 650 nm to 730 nm, and most preferably in a range from 670 nm to 710 nm. The at least one passive retarder may comprise a passive retarder having a slow axis perpendicular to the plane of the passive retarder. The at least one passive retarder may comprise two passive retarders having a slow axis perpendicular to the plane of the passive retarders, and a pair of passive retarders which have slow axes in the plane of the passive retarders that are crossed. The pair of passive retarders may have slow axes in the plane of the passive retarders extend at 22.5° and 112.5°, respectively, with respect to an electric vector transmission direction that is parallel to the electric vector transmission of the control polariser. The passive retarders having a slow axis perpendicular to the plane of the passive retarders may alternate with the pair of passive retarders that have slow axes in the plane of the passive retarders. The at least one passive retarder may comprise a passive retarder which has a slow axis with a component in the plane of the passive retarder and a component perpendicular to the plane of the passive retarder. The component in the plane of the passive retarder may extend at 0°, with respect to an electric vector transmission direction that is parallel or perpendicular to the electric vector transmission of the control polariser. The view angle control optical element may further comprise at least one further passive retarder and a further additional polariser; wherein the at least one further passive retarder may be arranged between the first mentioned additional polariser and the further additional polariser.

Advantageously the view angle control of the passive retarders and additional polarisers, further passive retarders and further additional polarisers may be provided for off-axis luminance control of a display for privacy and low stray light applications. Further, an after-market privacy control element and/or stray light control element may be provided that does not require matching to the panel pixel resolution to avoid Moiré artefacts. The view angle control element may be cut to size and orientation of the output polariser.

Any of the aspects of the present disclosure may be applied in any combination.

Embodiments of the present disclosure may be used in a variety of optical systems. The embodiments may include or work with a variety of projectors, projection systems, optical components, displays, microdisplays, computer systems, processors, self-contained projector systems, visual and/or audio-visual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which:

FIG. 12D is a schematic diagram illustrating in top view operation of an inclined planar feature of a collimating waveguide for off-axis illumination;

FIG. 12E is a schematic diagram illustrating in end view operation of an inclined planar feature of a collimating waveguide for off-axis illumination;

FIG. 12F is a schematic diagram illustrating in side view operation of an inclined planar feature of a collimating waveguide for off-axis illumination;

FIG. 12G is a schematic diagram illustrating in top view operation of a non-inclined lenticular structure of a collimating waveguide for off-axis illumination after incidence with an inclined planar feature;

FIG. 12H is a schematic diagram illustrating in end view operation of a non-inclined lenticular structure of a collimating waveguide for off-axis illumination after incidence with an inclined planar feature;

FIG. 12I is a schematic diagram illustrating in side view operation of a non-inclined lenticular structure of a collimating waveguide for off-axis illumination after incidence with an inclined planar feature;

DETAILED DESCRIPTION

Figure 1A:
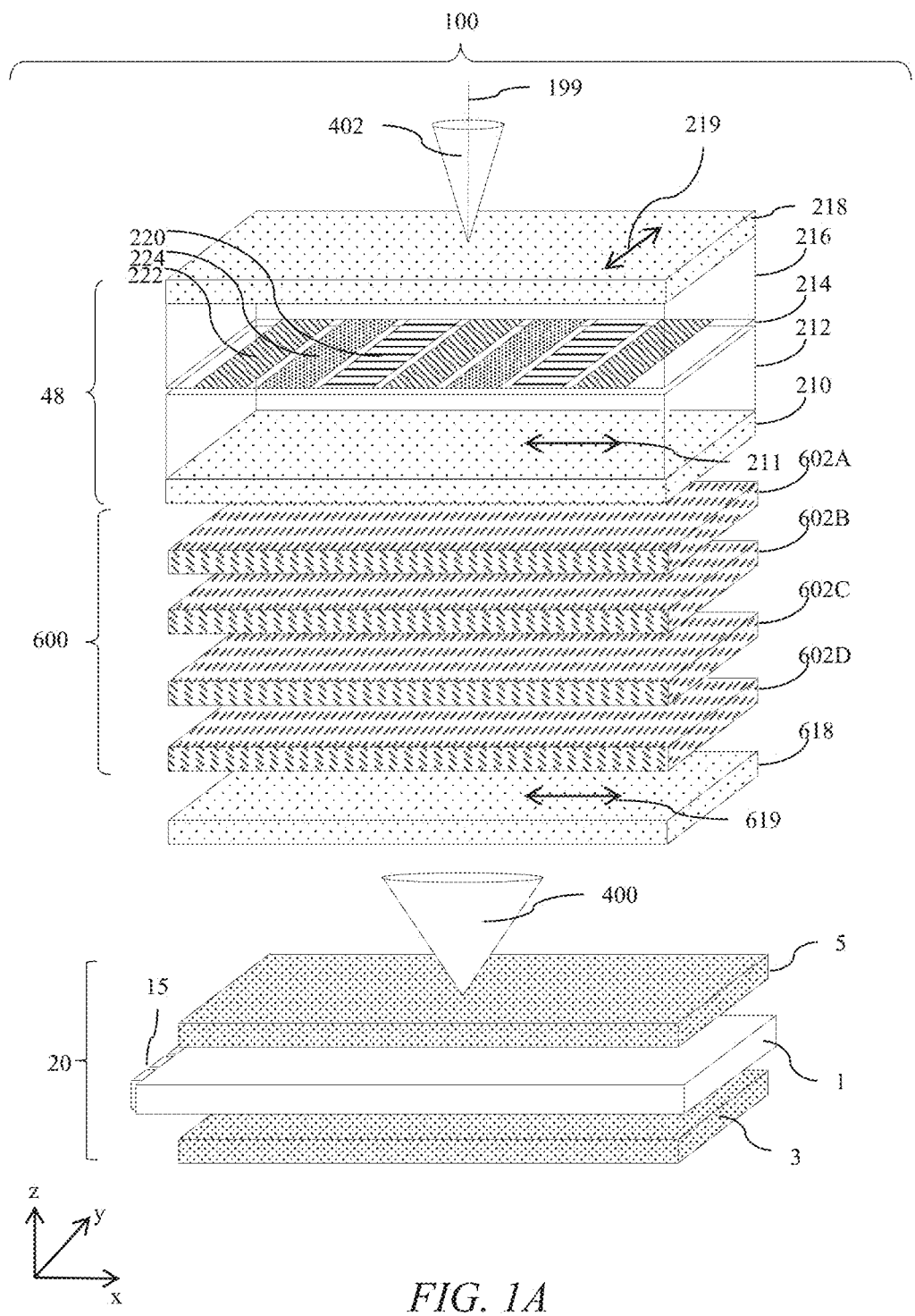
FIG. 1A is a schematic diagram illustrating in side perspective view a directional display device comprising a front passive retarder, a transmissive spatial light modulator and a backlight.

Terms related to optical retarders for the purposes of the present disclosure will now be described.

In the present embodiments, slow axis typically refers to the orientation orthogonal to the normal direction in which linearly polarized light has an electric vector direction parallel to the slow axis travels at the slowest speed. The slow axis direction is the direction of this light with the highest refractive index at the design wavelength.

For positive dielectric anisotropy uniaxial birefringent materials the slow axis direction is the extraordinary axis of the birefringent material. The ordinary axes in such materials are typically parallel to the normal direction, and orthogonal to the normal direction and the slow axis.

The terms half a wavelength and quarter a wavelength refer to the operation of a retarder for a design wavelength $\lambda_0$ that may typically be between 500 nm and 570 nm. In the present illustrative embodiments exemplary retardance values are provided for a wavelength of 550 nm unless otherwise specified.

The retarder provides a phase shift between two perpendicular polarization components of the light wave incident thereon and is characterized by the amount of relative phase, Γ, that it imparts on the two polarization components; which is related to the birefringence Δn and the thickness d of the retarder by $$\Gamma = 2 \cdot \pi \cdot \Delta n \cdot d / \lambda_0 \qquad \text{eqn. 1}$$

where Δn is defined as the difference between the extraordinary and the ordinary index of refraction, i.e.

$$\Delta n = n_e - n_o \qquad \text{eqn. 2}$$

Herein, the retarders are passive retarders, that is retarders having a birefringence that does not change. In particular, no means to change the birefringence of the passive retarders is provided.

For a half wave retarder, the relationship between d, Δn, and $\lambda_0$ is chosen so that the phase shift between polarization components is Γ=π. For a quarter wave retarder, the relationship between d, Δn, and $\lambda_0$ is chosen so that the phase shift between polarization components is Γ=π/2.

The term half wave retarder herein typically refers to light propagating normal to the retarder and normal to the spatial light modulator.

In the present disclosure an 'A-plate' refers to an optical retarder utilizing a layer of birefringent material with its optical axis parallel to the plane of the layer. The plane of the retarders refers to the slow axis of the retarders extend in a plane, that is the x-y plane.

A 'positive A-plate' refers to positively birefringent A-plates, i.e. A-plates with a positive Δn.

In the present disclosure a 'C-plate' refers to an optical retarder utilizing a layer of birefringent material with its optical axis perpendicular to the plane of the layer. A 'positive C-plate' refers to positively birefringent C-plates, i.e. C-plates with a positive Δn.

In the present disclosure an 'O-plate' refers to an optical retarder utilizing a layer of birefringent material with its optical axis having a component parallel to the plane of the layer and a component perpendicular to the plane of the layer. A 'positive O-plate' refers to positively birefringent O-plates, i.e. O-plates with a positive Δn.

Achromatic retarders may be provided wherein the material of the retarder is provided with an retardance Δn·d that varies with wavelength λ as $$\Delta n \cdot d / \lambda = \kappa \qquad \text{eqn. 3}$$

where κ is substantially a constant.

Examples of suitable materials include modified polycarbonates from Teijin Films. Achromatic retarders may be provided in the present embodiments to advantageously minimise colour changes between polar angular viewing directions which have low luminance reduction and polar angular viewing directions which have increased luminance reductions as will be described below.

Positive retarders such as A-plates, positive O-plates and positive C-plates may typically be provided by stretched films or rod like liquid crystal molecules. Negative retarders such as negative C-plates may be provided by stretched films or discotic like liquid crystal molecules.

The structure and operation of a privacy display device will now be described. Such a structure may also be provided for a low stray light display device, such as for night time operation.

FIG. 1A is a schematic diagram illustrating in side perspective view a display device 100 comprising: a spatial light modulator 48; at least one display polariser 210 arranged on a side of the spatial light modulator 48; an additional polariser 618 arranged on the same side of the spatial light modulator 48 as the display polariser 210; and at least one passive retarder 600 arranged between the additional polariser 618 and the display polariser 210.

The spatial light modulator 48 is a transmissive spatial light modulator and the display device further comprises a backlight arranged to output light. The spatial light modulator 48 may comprise a liquid crystal display comprising input display polariser 210, output display polariser 218 with substrates 212, 216, liquid crystal layer 214 and red, green and blue pixels 220, 222, 224.

Transmissive spatial light modulators 48 may further comprise retarders between the input display polariser 210 and the output display polariser 218 for example as disclosed in U.S. Pat. No. 8,237,876, which is herein incorporated by reference in its entirety. Such retarders (not shown) are in a different place to the passive retarders 602 of the present embodiments. Such retarders compensate for contrast degradations for off-axis viewing locations, which is a different effect to the luminance reduction for off-axis viewing positions of the present embodiments.

Backlight 20 may be arranged to provide illumination to the spatial light modulator 48 and may comprise input light sources 15, waveguide 1, rear reflector 3 and optical stack 5 comprising diffusers, reflective polarisers, light turning films and other known optical backlight structures. In the present embodiments, the backlight 20 may be arranged to provide an angular light distribution in light cone 400 that has reduced luminance for off-axis viewing positions in comparison to head-on luminance.

Polariser 218 is arranged on a side of the spatial light modulator 48 facing the side comprising the display polariser 210. Polarisers 210, 218 are absorptive polarisers that may be a dichroic polariser, arranged to provide high extinction ratio for light from the pixels 220, 222, 224 of the spatial light modulator 48. Additional polariser 618 comprises an absorptive polariser.

The display polariser 218 and the additional polariser 618 have electric vector transmission directions 219, 619 that are parallel. As will be described below, such parallel alignment achieves high transmission for central viewing locations and reduction of off-axis luminance. Light cone 400 that is output from the backlight 20 may be output from the display device 100 with light cone 402 that has a smaller size than cone 400.

The at least one passive retarder 600 comprises passive retarders 602A, 602B, 602C, 602D arranged in a stack together with the additional polariser 618 and display polariser 210. The components of the stack may be attached by means of lamination or may be solvent bonded. Stray light reflections and light losses may advantageously be reduced.

An embodiment with an emissive spatial light modulator will now be described.

Figure 1B:
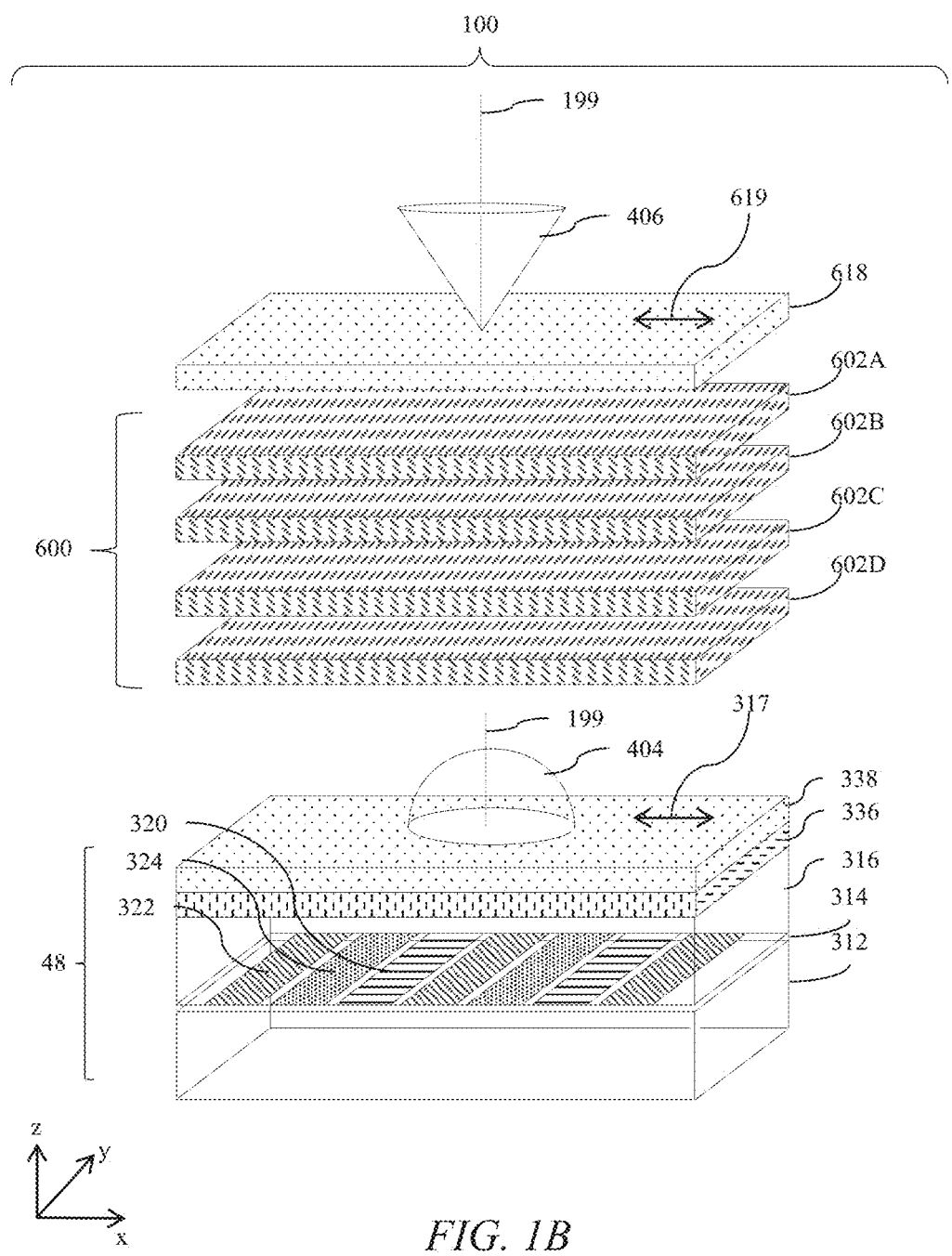
FIG. 1B is a schematic diagram illustrating in side perspective view a directional display device comprising a front passive retarder and an emissive spatial light modulator.

FIG. 1B is a schematic diagram illustrating in side perspective view a display device 100 wherein the spatial light modulator 48 is an emissive spatial light modulator, and the display polariser 338 is an output polariser arranged on the output side of the emissive spatial light modulator 48.

The spatial light modulator 48 comprises an emissive display such as an OLED display comprising, output display polariser 316 with substrates 312, 316, light emission layer 314 and red, green and blue emissive pixels 320, 322, 324, optical isolation retarder 336 and display polariser 338.

Optical isolation retarder 336 is provided between the display polariser 318 and an OLED display emission layer. Such retarders are described further in U.S. Pat. No. 7,067, 985 which is herein incorporated by reference in its entirety. Retarder 336 is in a different place to the passive retarders 602 of the present embodiments. Isolation retarder 336 reduces frontal reflections from the OLED display emission layer which is a different effect to the luminance reduction for off-axis viewing positions of the present embodiments.

The display polariser 338 and the additional polariser 618 are absorbing polarisers such as dichroic polarisers (as compared to reflective polarisers) and have electric vector transmission directions 317, 619 that are parallel. Such parallel alignment achieves high transmission for central viewing locations and reduction of off-axis luminance.

Emissive materials such as OLED materials typically output light with a directional distribution that is substantially Lambertian with a light cone 404 that is typically larger than cone 400 for a directional backlight 20 of FIG. 1A. Light cone 404 that is provided by the emissive spatial light modulator 48 to the passive retarders 602 and additional polariser 618 may be output from the display as light cone 406 that has a smaller size than light cone 404.

Figure 1C:
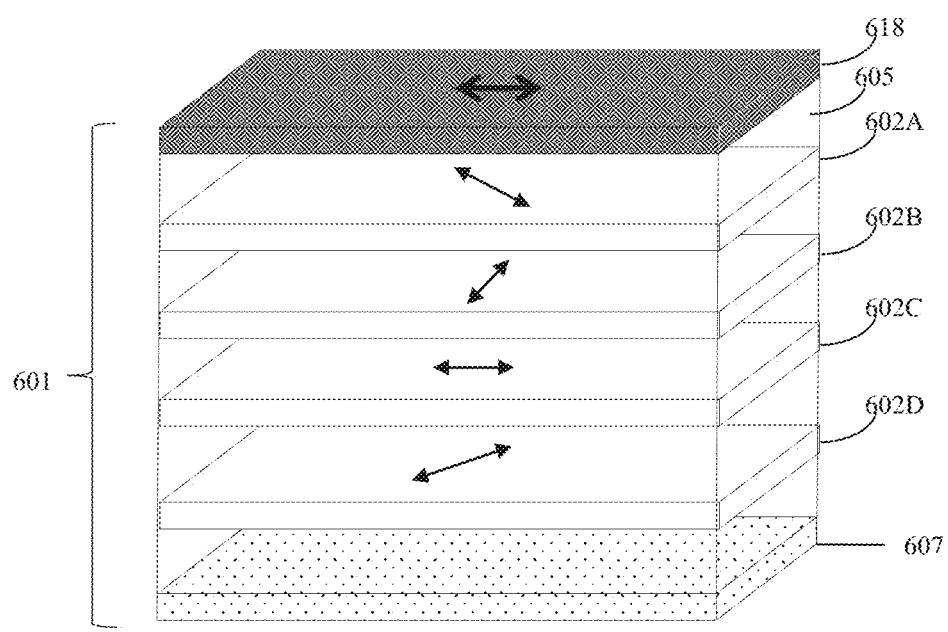
FIG. 1C is a schematic diagram illustrating in side perspective view a view angle control element comprising a passive retarder stack, a control polariser and a diffuser.

FIG. 1C is a schematic diagram illustrating in side perspective view a view angle control element 601 comprising a passive retarder stack comprising passive retarders 602A, 602B, 602C, 602D, a control polariser 618 and a diffuser 607. Layers may be attached in layer 605 by means of adhesives such as pressure sensitive adhesives and optically clear adhesives or may be solvent bonded.

In use, view angle control element 601 may be attached by a user to a polarised output spatial light modulator. View angle control element 601 may be provided as a flexible film for curved and bent displays. Alternatively the view angle control element 601 may be provided on a rigid substrate such as a glass substrate.

Advantageously, an after-market privacy control element and/or stray light control element may be provided that does not require matching to the panel pixel resolution to avoid Moiré artefacts. The view angle control element may be cut to size and orientation of the output polariser.

Diffuser 607 may be arranged to minimise wetting between the retarder 602D and a spatial light modulator.

The arrangement of the passive retarders of FIGS. 1A and 1B will now be described.

Figure 2:
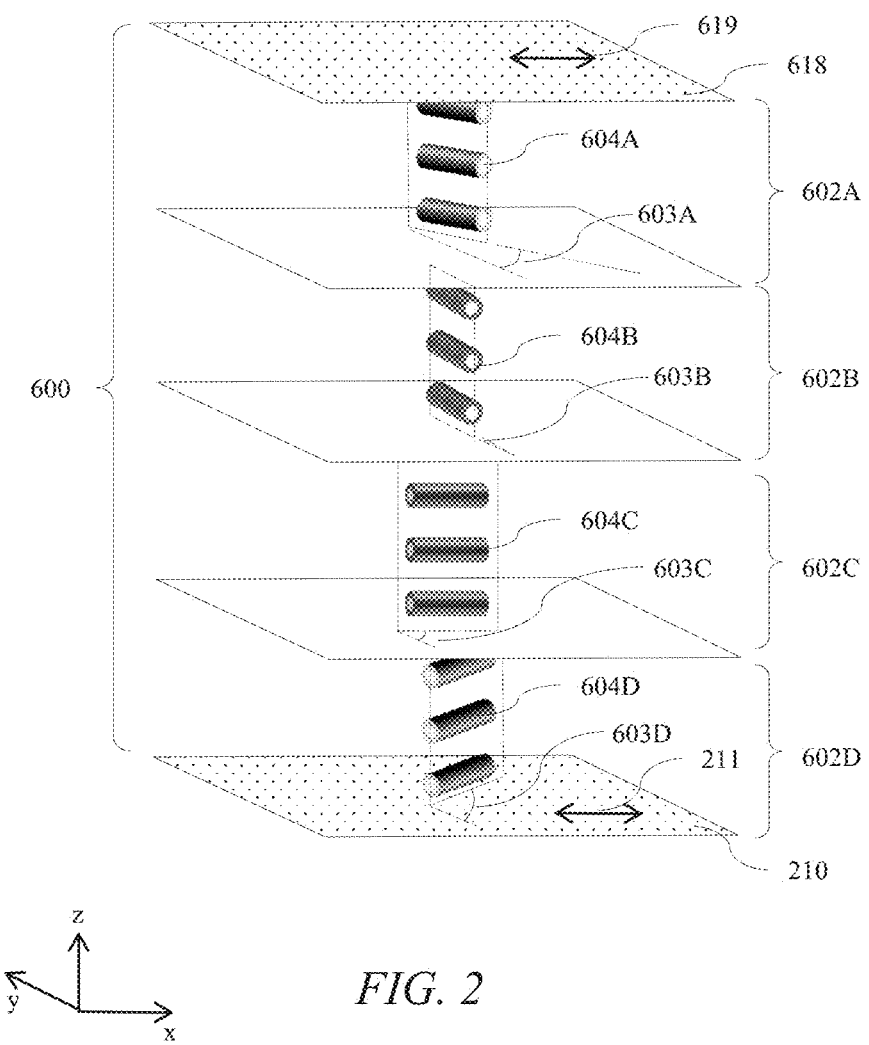
FIG. 2 is a schematic diagram illustrating in side perspective view an optical stack arranged to provide field-of-view modification of a display device.

FIG. 2 is a schematic diagram illustrating in side perspective view an optical stack arranged to provide field-of-view modification for a display device 100. The optical arrangement of retarders is further described in TABLE 1.

TABLE 1

| | | | Passive retarder | | |
| --- | --- | --- | --- | --- | --- |
| FIGS. | Layer | Type | Out of plane angle/° | In plane angle/° | Δn.d/ nm |
| 2, 3A, 3B | 602A | Positive A | 0 | 45 | 700 |
| | 602B | | | 90 | |
| | 602C | | | 0 | |
| | 602D | | | 135 | |

In the present disclosure a zero out of plane angle refers to an A-plate, and a 90 degree out of plane angle refers to a C-plate. The in-plane angle refers to the in-plane rotation of the slow axis orientations of the retarder material in comparison to the electric vector transmission directions 211, 317, 619 respectively of the display polariser 210, 316 and additional polariser 618.

The at least one retarder thus comprises a pair of passive retarders 602A, 602D which have slow axes in the plane of the retarders that are crossed. The pair of retarders each comprise plural A-plates having respective slow axes aligned at different angles from each other. The pair of passive retarders 602B, 602C have slow axes that each extend at 90° and 0°, respectively, with respect to an electric vector transmission direction that is parallel to the electric vector transmission 211 of the display polariser 210.

Each passive retarder 602A, 602B, 602C, 602D comprises birefringent molecules 604A, 604B, 604C, 604D that may be fixed liquid crystals such as UV cured reactive mesogens, stretched polymers or other known birefringent materials.

For FIG. 1A, the pair of passive retarders 602A, 602D have slow axes that extend at 45° and at 135°, respectively, with respect to an electric vector transmission direction 211 that is parallel to the electric vector transmission of the display polariser 210 respectively.

For FIG. 1B, the pair of passive retarders 602A, 602D have slow axes that extend at 45° and at 135°, respectively, with respect to an electric vector transmission direction 317 that is parallel to the electric vector transmission of the display polariser 316 respectively.

The display further comprises an additional pair of passive retarders 602B, 602C disposed between the first mentioned pair of passive retarders 602A, 602D and which have slow axes in the plane of the retarders that are crossed. The additional pair of passive retarders 602B, 602C have slow axes that each extend at 0° and at 90°, respectively, with respect to an electric vector transmission direction 211, 317 that is parallel to the electric vector transmission of the display polariser 210, 316.

The angular field of view of the stack of FIG. 2 and TABLE 1 arranged between parallel polarisers 210, 618 will now be described.

Figure 3A:
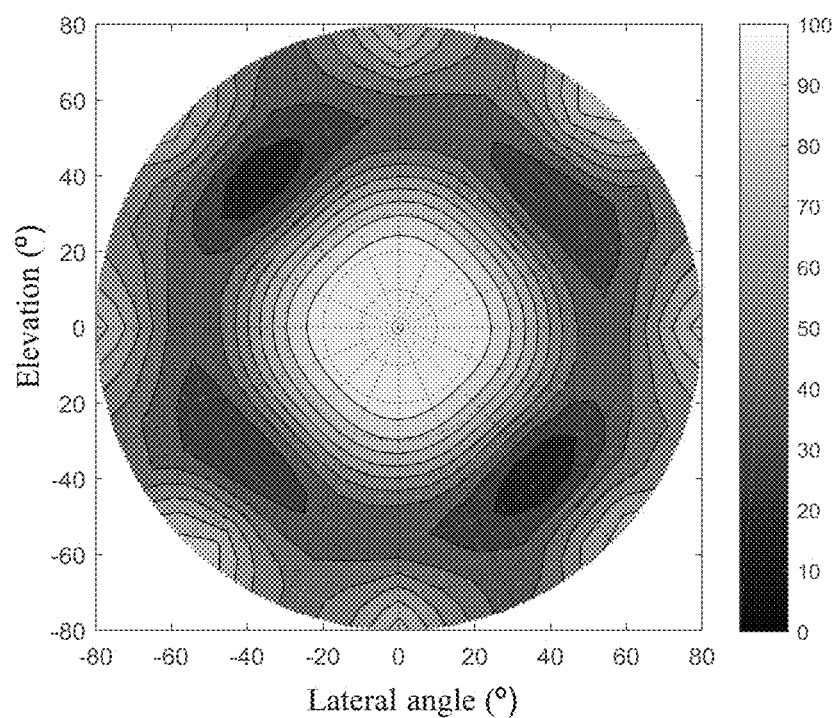
FIG. 3A and FIG. 3B are schematic graphs illustrating the variation of output transmission with polar direction for transmitted light rays in the passive retarder stack of FIG. 2.
Figure 3B:
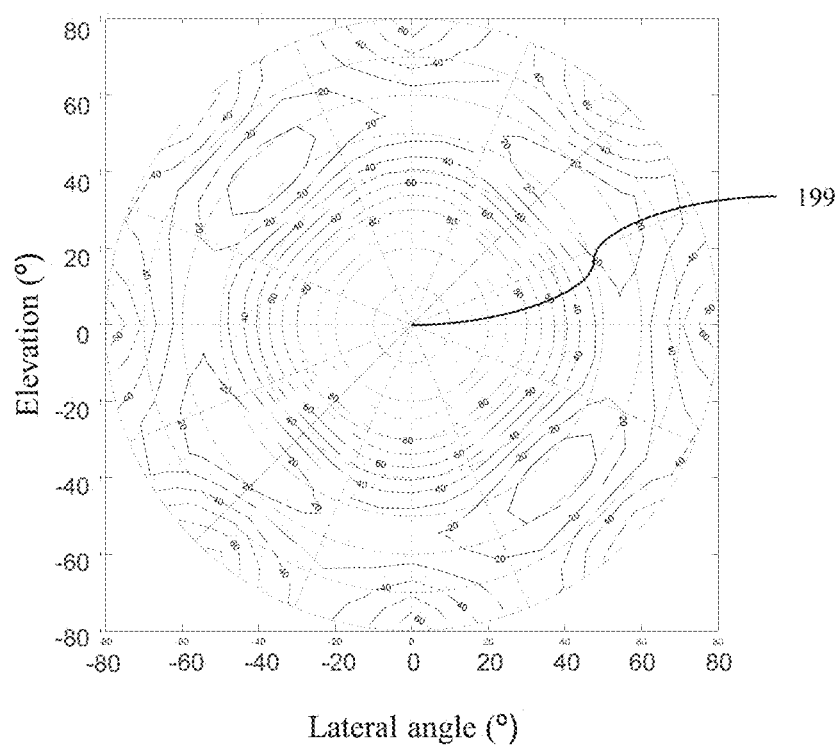

FIGS. 3A-3B are schematic graphs illustrating the variation of output transmission with polar direction for transmitted light rays in the passive retarder stack of FIG. 2.

The graphs represent the polar variation of relative transmittance of the stack of retarders 600 between the parallel display polariser 210 and additional polariser 618. Thus on-axis rays have substantially no change to luminance, other than losses from polariser head-on transmission and Fresnel reflection losses. Off-axis rays have reduced luminance as illustrated, and as will be described below.

Some modification of the profile roll-off may be achieved by adjustment of the retardance of each of the passive retarders 602A, 602B, 602C, 602D. The retardance of each of the A-plates may be the same, or may be different to modify field-of-view properties.

In the present embodiments, the at least one passive retarder 600 may be configured, in combination with the display polariser 210, 218, 316 and the additional polariser 618, to have the effect that the luminance of light output from the display device at an acute angle to the optical axis (off-axis) is reduced, i.e. compared to at least one retarder not being present. The at least one passive retarder 600 may also be configured, in combination with the display polariser 210, 218, 316 and the additional polariser 618, to have the effect that the luminance of light output from the display device along the optical axis (on-axis) not reduced, i.e. compared to at least one retarder not being present.

The present embodiment provides a transmission profile that has some rotational symmetry. Advantageously a privacy display may be provided with reduced visibility of image from a wide field of view for lateral or elevated viewing positions of a snooper. Further, such an arrangement may be used to achieve enhanced privacy operation for landscape and portrait operation of a mobile display.

In further illustrative embodiments, the retardance of each A-plate for light of a wavelength of 550 nm may be in a range from 600 nm to 850 nm, preferably in a range from 650 nm to 730 nm, and most preferably in a range from 670 nm to 710 nm. The colour change of absorbed light from a central viewing location to an off-axis viewing location may be advantageously reduced.

In the present embodiments, 'crossed' refers to an angle of substantially 90° between the slow axes of the two retarders in the plane of the retarders. To reduce cost of retarder materials, it is desirable to provide materials with some variation of retarder orientation due to stretching errors during film manufacture, for example. Variations of retardation slow axis orientation will now be described. Variations in retarder orientation away from preferable directions can reduce the head-on luminance and increase the minimum transmission.

In further illustrative embodiments, preferably the angle 603A is at least 40° and at most 50°, more preferably at least 42.5° and at most 47.5° and most preferably at least 44° and at most 46°. Preferably the angle 603D is at least 130° and at most 140°, more preferably at least 132.5° and at most 137.5° and most preferably at least 134° and at most 136°.

In further illustrative embodiments, the inner retarder pair 602B, 602C may have looser tolerances than the outer retarder pair 602A, 602D. Preferably the angle 603B is at least −10° and at most 10°, more preferably at least −5° and at most 5° and most preferably at least −2° and at most 2°. Preferably the angle 603C is at least 80° and at most 100°, more preferably at least 85° and at most 95° and most preferably at least 88° and at most 92°.

Advantageously the cost of the optical stack may be reduced by providing passive retarders 602B, 602C with looser tolerances than passive retarders 602A, 602D while maintaining desirable head-on luminance and off-axis luminance reduction.

The operation of the privacy mode of the display of FIGS. 1A-1B will now be described further.

Figure 4A:
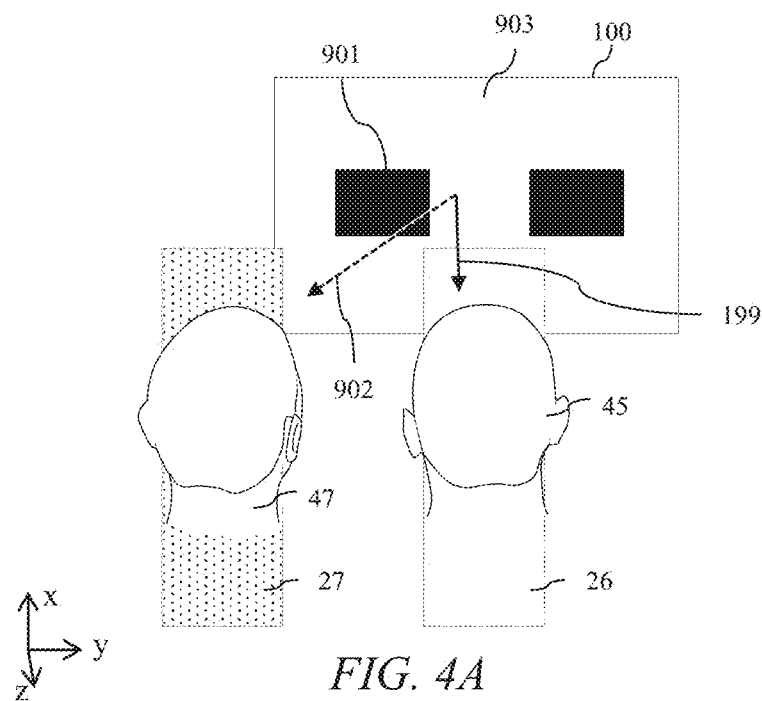
FIG. 4A is a schematic diagram illustrating in front perspective view observation of transmitted output light for a privacy display.

FIG. 4A is a schematic diagram illustrating in front perspective view observation of transmitted output light for a display operating in privacy mode. Display device 100 may be provided with white regions 903 and black regions 901. A snooper 47 may observe an image on the display if luminance difference between the observed regions 901, 903 can be perceived. In operation, primary user 45 observes full luminance images by rays propagating close the optical axis 199 to viewing locations 26. Snooper 47 observes reduced luminance rays 902 in viewing locations 27. Regions 26, 27 further represent on-axis and off-axis regions of FIGS. 3A-3B.

Figure 4B:
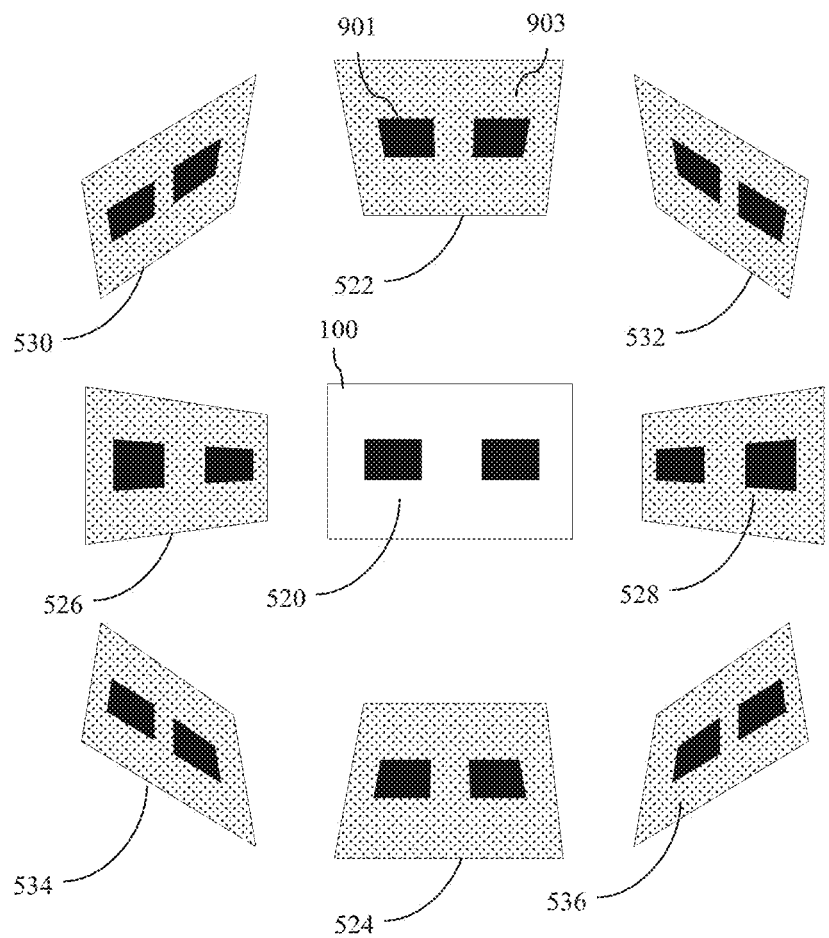
FIG. 4B is a schematic diagram illustrating in front perspective views the appearance of the display of FIG. 1A or FIG. 1B.

FIG. 4B is a schematic diagram illustrating in front perspective views the appearance of the display of FIG. 1A operating in privacy mode 1 with luminance variations as illustrated in FIGS. 3A-3B. Thus outer viewing angles provide a display appearance 530, 522, 532, 528, 536, 524, 534, 526 with reduced luminance, whereas head-on viewing location 520 provides much higher luminance.

Advantageously a privacy display or a low stray light display may be provided with rotationally symmetric luminance reduction.

Use of the display of FIGS. 1A-1B in an automotive environment will now be described.

Figure 5:
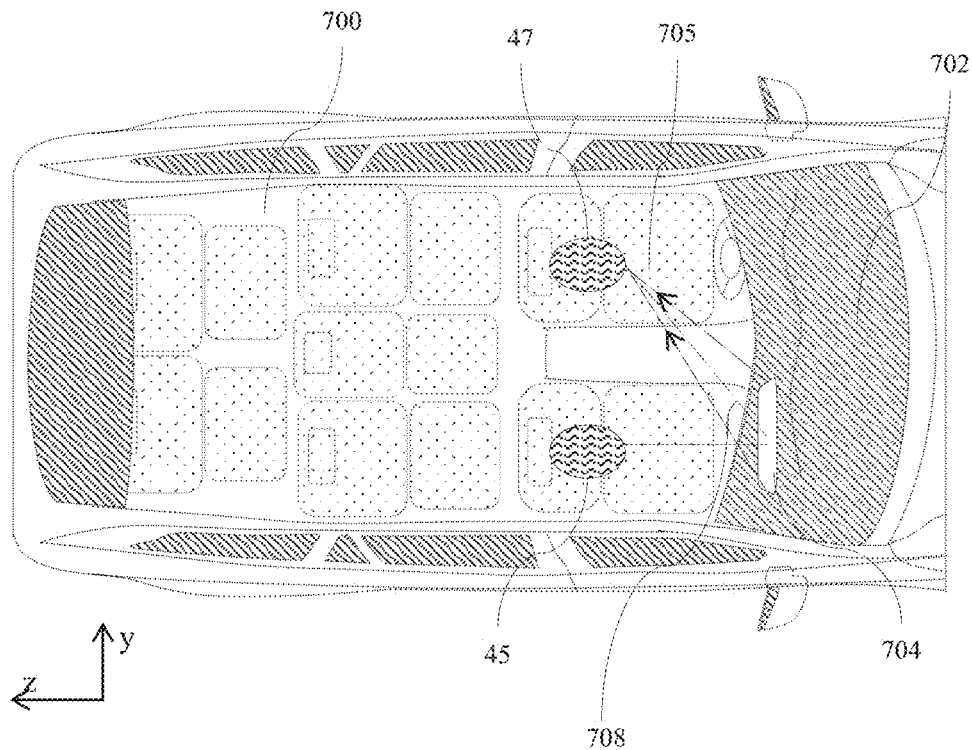
FIG. 5 is a schematic diagram illustrating in top view an automotive cabin and illumination of a driver from a mounted display.
Figure 6:
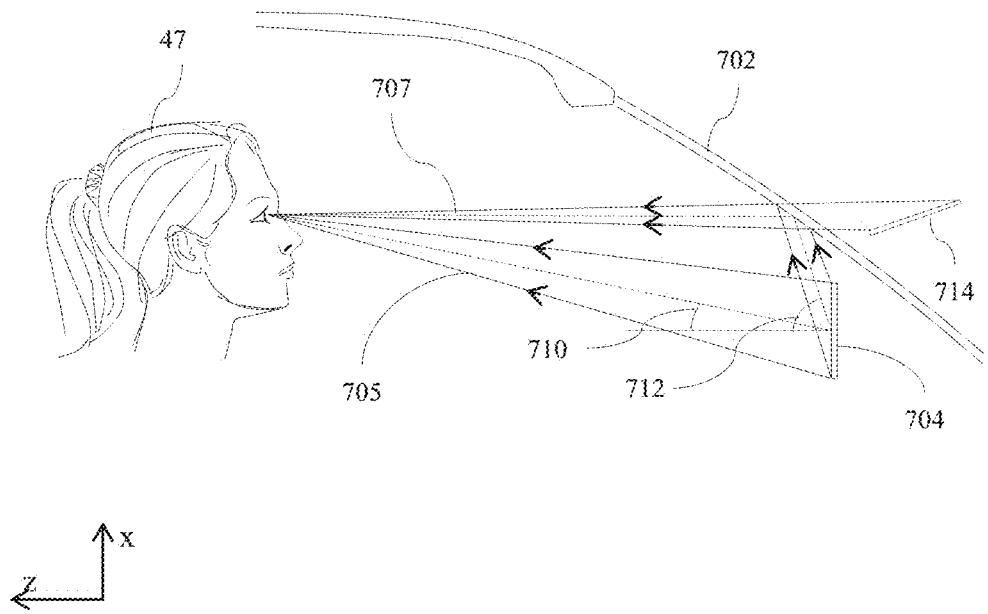
FIG. 6 is a schematic diagram illustrating in side view an automotive cabin and illumination of a driver from a mounted display.

FIG. 5 is a schematic diagram illustrating in top view an automotive cabin 700 and illumination of a driver 47 from a dashboard mounted display device 704 and FIG. 6 is a schematic diagram illustrating in side view an automotive cabin 700 and illumination of a driver 47 from a display 704, wherein the display device is arranged in a vehicle and is arranged beneath a transparent window 702 in the vehicle and is arranged in front of a seat 701 in the vehicle in which passenger 45 is located.

In the present disclosure viewing windows are different from transparent windows. Viewing windows refer to angular illumination cones of a display device at a desirable viewing distance. Transparent windows refer to physical transparent surfaces such as windscreens, windshields, side windows or other transparent surfaces and are typically made from glass, glass composites or other transparent materials.

The display device 704 may be arranged with respect to the driver at non-central regions, in either embodiment to provide off-axis illumination of light rays 705 from the centre of the display 704 to driver 47 in the negative lateral angle direction, at lateral angle 708. In operation, light rays 705 are directed to the driver 47 and further light rays 707 are directed to the driver 47 by means of reflection at the windscreen 702, forming a virtual image 714. The lateral angle direction 708 of light output from the display 704 may be the same for light rays 705, 707; however the respective elevation directions 710, 712 are different.

Image 714 may be distracting to the driver 47 and reduction of its luminance would thus be desirable. Advantageously the present embodiments achieve high luminance to passenger 45 and substantially reduced luminance to driver 47 such that the passenger display is not distracting. Further windscreen reflections are reduced for night time use.

Further the size of an information display that may be provided to a driver or a passenger may be increased without increasing the total stray light directed into the vehicle cabin. Driver night vision may be less impacted by stray light falling onto vehicle internal surfaces, increasing driver safety.

The minimum transmission for some off-axis regions of the polar field of view of FIGS. 3A-3B may be 10% or greater of peak head-on transmittance. If a Lambertian display is provided, such high transmittance can provide high visibility of displayed images.

It would be desirable to further reduce the off-axis illumination from a directional display comprising a passive retarder 600 for field-of-view control. Arrangements of directional backlights for a transmissive spatial light modulator 48 will now be described.

Figure 7:
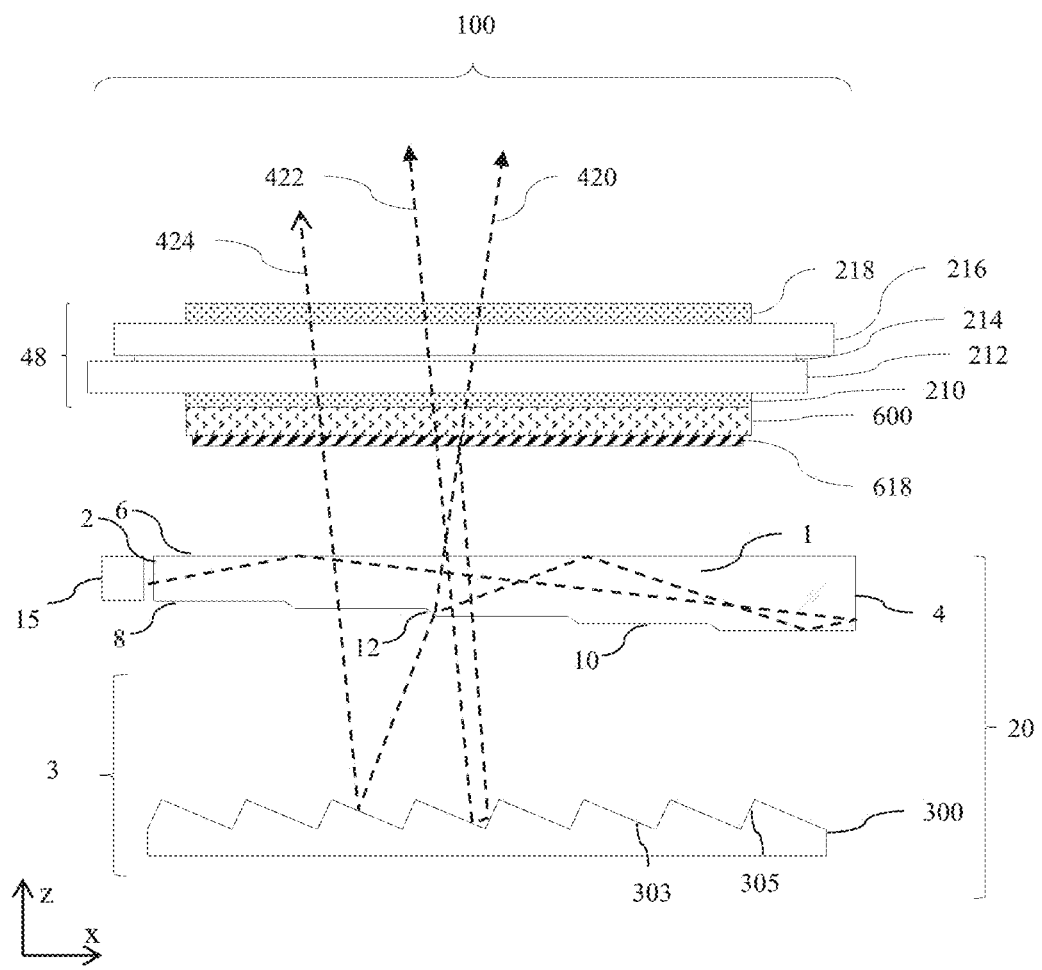
FIG. 7 is a schematic diagram illustrating in side view a directional display device comprising a rear passive retarder and a directional backlight comprising an imaging waveguide.

FIG. 7 is a schematic diagram illustrating in side view a directional display device comprising a rear passive retarder and a directional backlight comprising an imaging waveguide 1. The directional display device comprises spatial light modulator 48 and a directional backlight 20. The directional backlight 20 comprises: an array of light sources 15; a directional waveguide 1 comprising: an input end 2 extending in a lateral direction along a side of the waveguide 1, the light sources 15 being disposed along the input end 2 and arranged to input input light rays 420, 422, 424 into the waveguide 1; and opposed first and second guide surfaces 6,8 extending across the waveguide from the input end 2 for guiding light input at the input end 2 along the waveguide 1, the waveguide 1 being arranged to deflect input light guided through the waveguide 1 to exit through the first guide surface 6.

The imaging waveguide 1 further comprises a reflective end 4 for reflecting the input light back along the imaging waveguide 1, wherein the second guide surface 8 is arranged to deflect the reflected input light through the first guide surface 6 as output light. The second guide surface 8 comprises light extraction features 12 and intermediate regions 10 between the light extraction features 12, the light extraction features 12 being oriented to deflect the reflected input light through the first guide surface 6 as output light and the intermediate regions 10 being arranged to direct light through the waveguide 1 without extracting it. The reflective end 4 has positive optical power in the lateral direction (y-axis) extending between sides of the waveguide 1 that extend between the first and second guide surfaces 6,8. In operation, light rays 420, 422 are guided without loss to the reflective end 4, and are incident onto light extraction features 12 arranged on the second guiding surface 8.

The display polariser 210 is an input polariser arranged on the input side of the spatial light modulator 48 between the backlight 20 and the spatial light modulator 48, and the additional polariser 618 is arranged between the input polariser 210 and the backlight 20. The additional polariser 618 is a reflective polariser.

Light ray 420 is reflected by total internal reflection at the facet 12 and directed through the additional polariser 618, passive retarder 600 and spatial light modulator 48. Light ray 424 is transmitted by the light extraction feature 12 and is incident on facet 303 of rear reflector 300, whereon it is transmitted by the waveguide 1, additional polariser 618, passive retarder 600 and spatial light modulator 48. Light ray 424 is reflected by reflective polariser 618 and is incident on facets 303, 305 such that it is recycled by the optical system.

On-axis light rays 420, 422, 424 have a luminance that is substantially unmodified by the passive retarder 600, additional polariser 618 and input polariser 210. Off-axis light rays are attenuated by the passive retarder 600, additional polariser 618 and input polariser 210 as illustrated in FIG. 3A, for example. The additional polarises 618 may thus advantageously provide increased luminance by recycling polarised light as well as providing reduction of off-axis luminance for reduced stray light and privacy operation.

The imaging of the waveguide 1 for use in a directional backlight 20 will now be described.

Figure 8A:
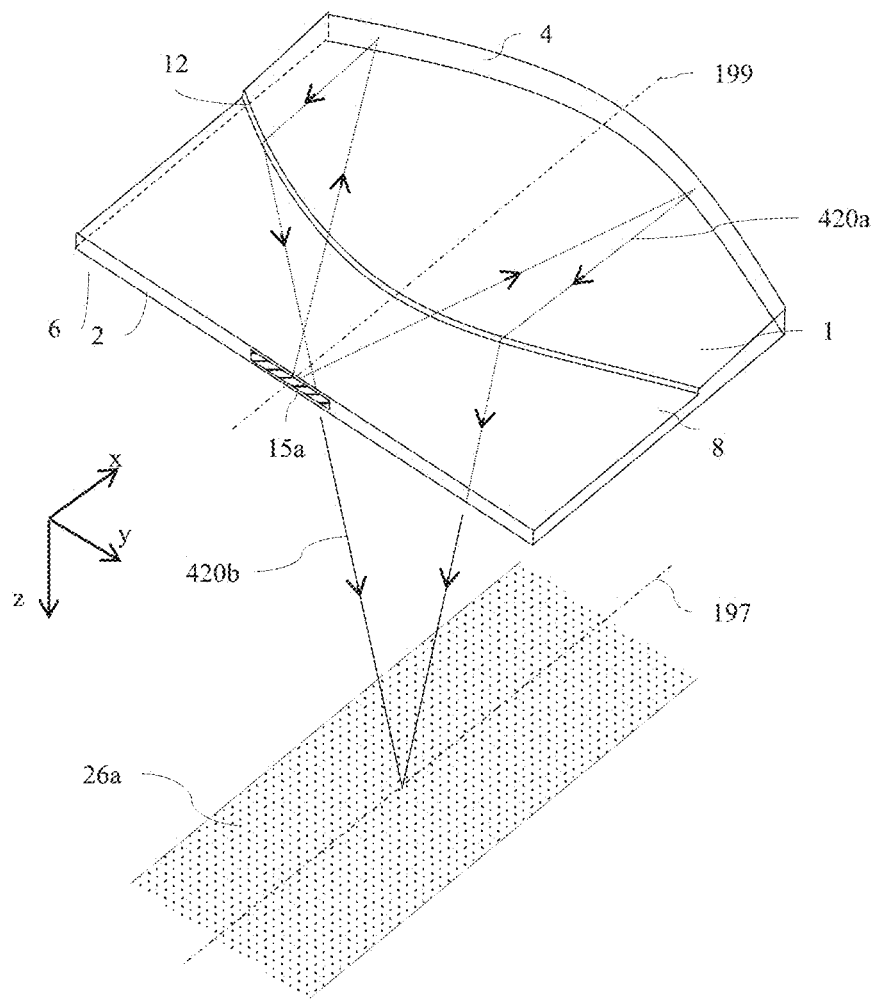
FIG. 8A is a schematic diagram illustrating in perspective rear view formation of a viewing window from an imaging waveguide.

FIG. 8A is a schematic diagram illustrating in perspective rear view formation of a viewing window 26 from an imaging waveguide 1.

The waveguide 1 is arranged to image the light sources 15 in the lateral direction (y-direction) so that the output light from the light sources 15 is directed into respective optical windows 26 in output directions that are distributed in dependence on the input positions of the light sources 15. By way of example, light source 15*a* is imaged to optical window 26*a* by the curved reflective end 4 and curved light extraction features 12. Rays 420*a*, 420*b* illustrate two different ray paths from the source 15*a* to the optical window 26*a*. Source 15*a* that is arranged on the optical axis 199 of the optical waveguide 1 is imaged to axis 197 in the optical window plane.

The polar luminance profile of the output of FIG. 8A when used in a display device with no passive retarder 600 will now be described.

Figure 8B:
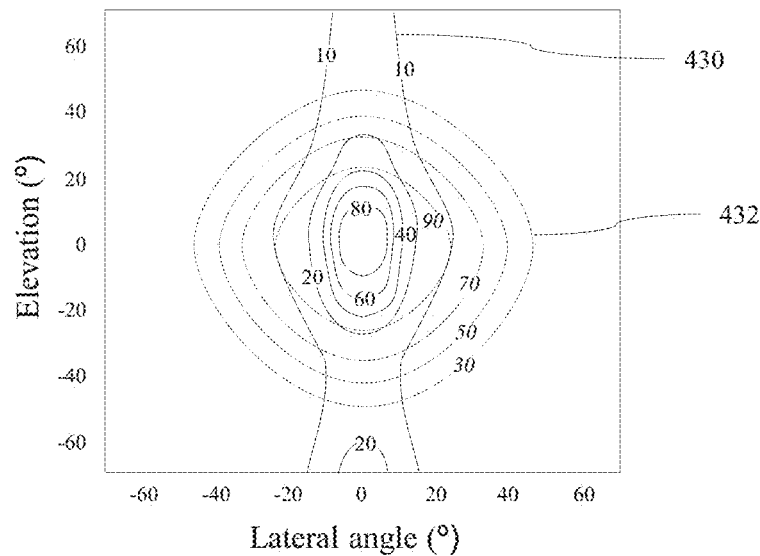
FIG. 8B is a schematic graph illustrating the variation of output transmission with polar direction for transmitted light rays in a display device comprising the imaging waveguide of FIG. 8A arranged for narrow angle output.

FIG. 8B is a schematic graph illustrating the variation of output transmission with polar direction for transmitted light rays in a display device 100 comprising the imaging waveguide 1 of FIG. 8A arranged for narrow angle output and with no passive retarder 600. Contours 430 are illustrated for the directional display device 100 with no passive retarder 600 and for comparison, transmission contours 432 of the passive retarder 600 of FIGS. 3A-3B are also provided.

Advantageously head-on luminance is maintained. In operation, the backlight apparatus 20 of FIG. 7 may provide undesirable stray light at higher angles that are typically occupied by snooper 47. Such high angles may include for example lateral angles of greater than 45 degrees and elevations from 0 degrees to 60 degrees.

Typical output luminance at snooper 47 viewing angles may be less than 2.5% of head-on luminance in the absence of passive retarder 600.

Desirably for a lateral viewing angle of 45 degrees, and z luminance of less than 1.5%, preferably less than 1% and most preferably less than 0.5% may be provided for a high performance privacy display. Advantageously, the passive retarder 600 of the present embodiments may further reduce the image visibility for off-axis snooper 47 viewing locations to less than 0.5% when used with a display comprising the directional backlight 20 of FIG. 7.

It would be desirable to provide a display that can be switched for visibility at higher viewing angles.

Figure 8C:
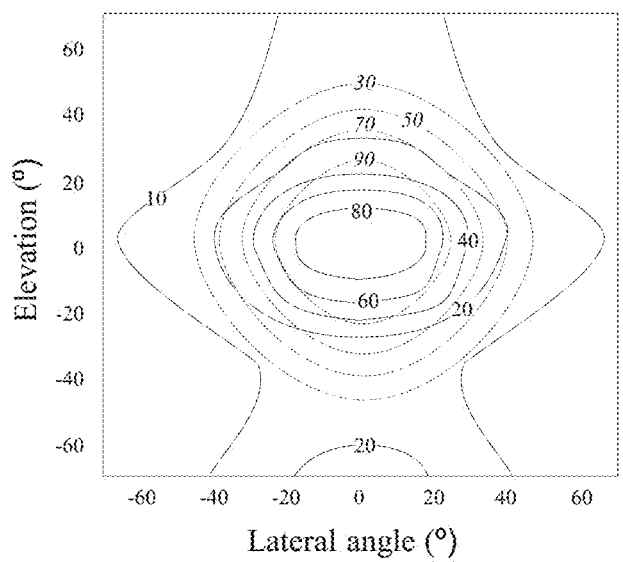
FIG. 8C is a schematic graph illustrating the variation of output transmission with polar direction for transmitted light rays in a display device comprising the imaging waveguide of FIG. 8A arranged for wide angle output.

FIG. 8C is a schematic graph illustrating the variation of output transmission with polar direction for transmitted light rays in a display device 100 comprising the imaging waveguide 1 of FIG. 8A arranged for wide angle output and no passive retarder 600.

In comparison to FIG. 8B, the width of the array 15 of light sources is increased and the luminance distribution is widened so that the output at 45 degrees lateral angle may be increased to 5% of head-on luminance or more when the display is provided with passive retarder 600 and additional polariser 618.

Advantageously multiple viewers may observe the display. Further, for a fixed display viewing position, the polar field of view provides a spatial roll-off in luminance. Increasing the field of view advantageously increases the display uniformity for the head-on user.

It would be desirable to provide enhanced privacy operation in both landscape and portrait operation.

Figure 9:
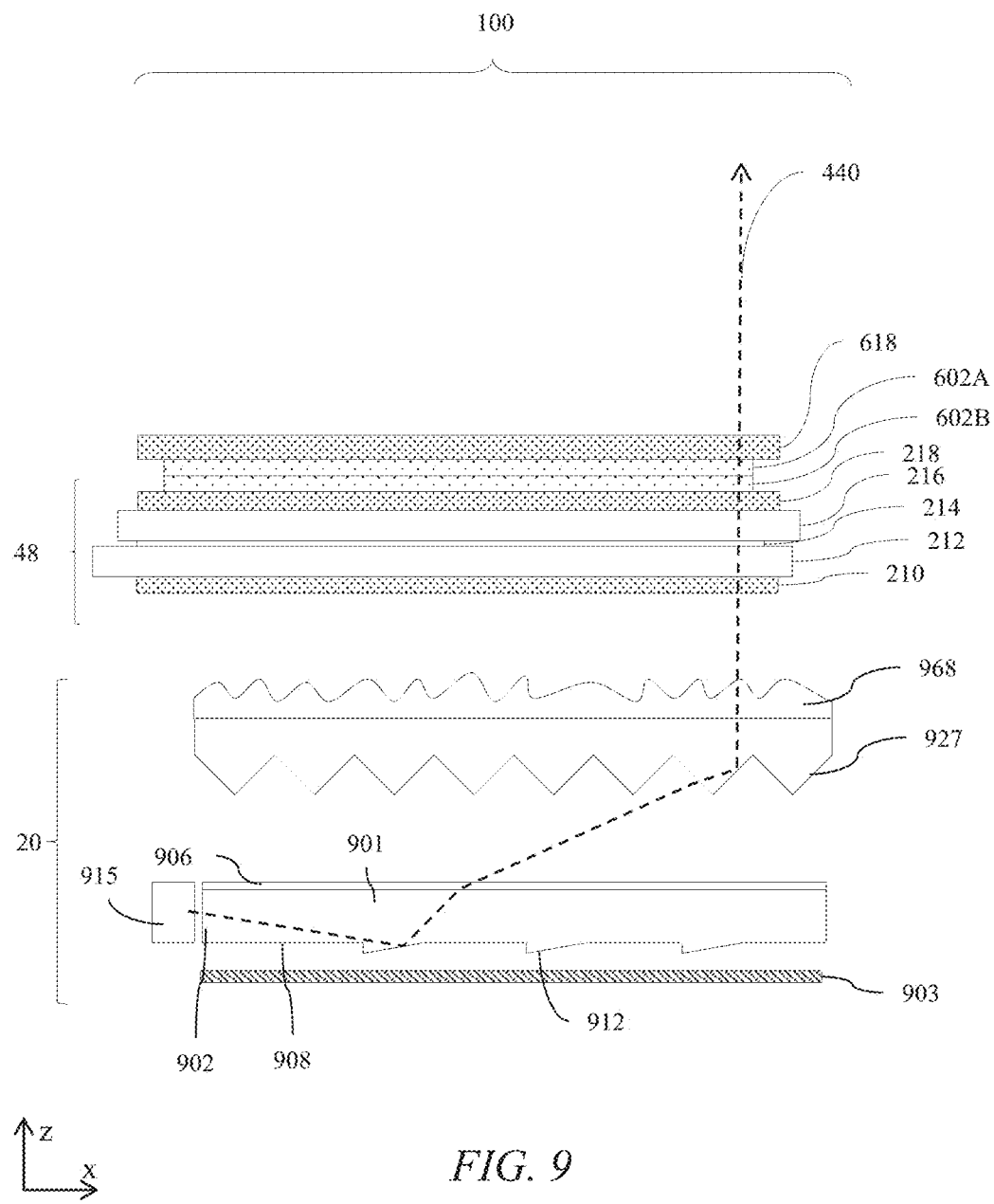
FIG. 9 is a schematic diagram illustrating in side view a directional display device comprising a front passive retarder and a directional backlight comprising a collimating waveguide.

FIG. 9 is a schematic diagram illustrating in side view a directional display device 100 comprising a front passive retarder 600 and a directional backlight comprising a collimating waveguide 901 to provide a collimating backlight 20.

The display device 100 comprises an output polariser 218 arranged on the output side of the spatial light modulator 48 that may be an LCD. The display polariser is an output polariser 218 arranged on the output side of the spatial light modulator 48. The display device further comprises an input polariser 210 arranged on the input side of the spatial light modulator 48.

A directional backlight 20 comprises a collimating waveguide 901 that comprises a plurality of elongate lenticular elements; and a plurality of inclined light extraction features arranged in an array wherein the plurality of elongate lenticular elements 906 and the plurality of inclined light extraction features 912 are oriented to deflect input light guided through the directional waveguide 901 to exit through the first guide surface.

Collimating waveguide 901 comprises planar light guiding surface 908 further comprising light deflecting features 912. A lenticular surface comprising lenticular elements 906 is arranged opposite light guiding surface 908, and provided with extended cylindrical lens shapes. Light from illumination source 915 is guided within the waveguide 901 and output towards turning film 927 either by transmission through the lenticular surface 906 or by reflection from the reflector 903 after exiting planar surfaces 908. Output light rays 950 from the waveguide 901 are deflected by total internal reflection in the turning film 927 to exit through diffuser 968, the spatial light modulator 48, passive retarder 602A, 602B and additional polariser 618.

In comparison to the arrangement of FIG. 7, thickness may be advantageously reduced.

The operation of the backlight 20 of FIG. 9 will now be further described.

Figure 10A:
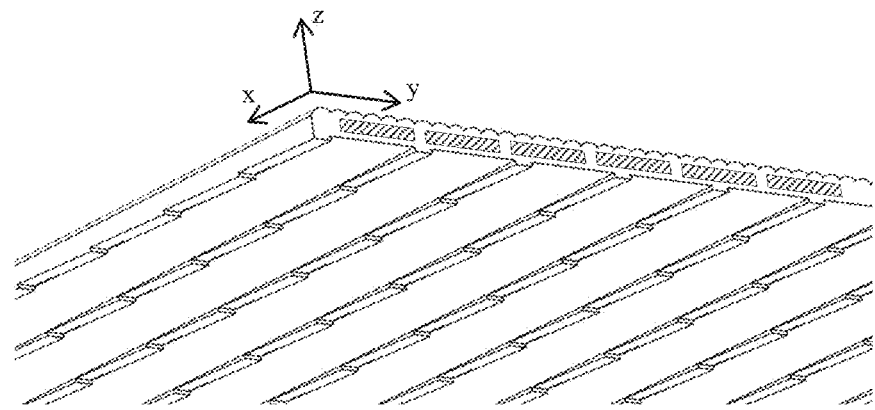
FIG. 10A, FIG. 10B, and FIG. 10C are schematic diagrams illustrating in various perspective views a collimating waveguide.
Figure 10B:
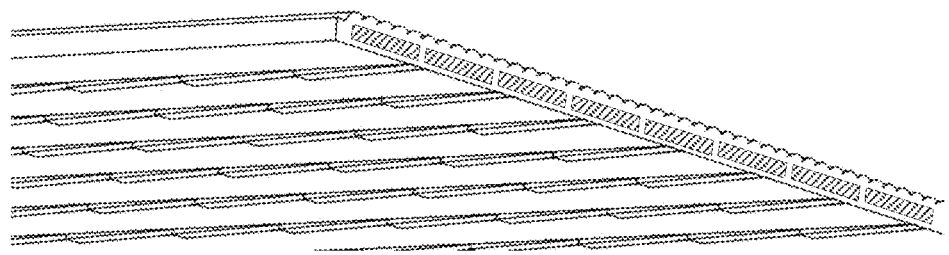
Figure 10C:
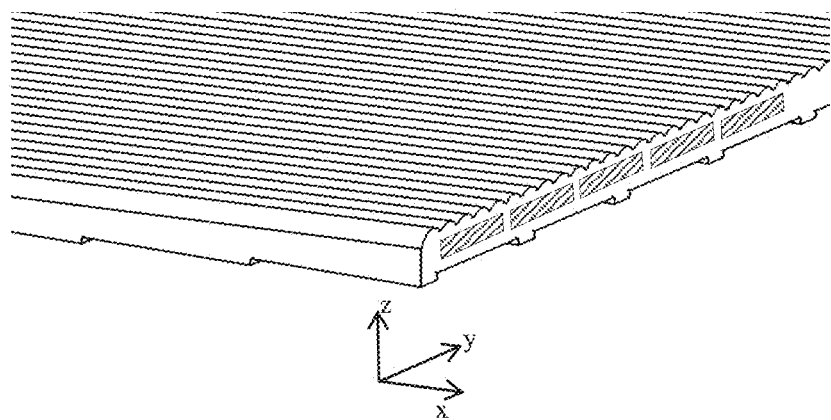

FIGS. 10A-10C are schematic diagrams illustrating in various perspective views a collimating waveguide. Such a waveguide is known and is for example provided in commercially available product HP EliteBook 840 G3.

The operation of the light extraction features 912 will now be described further for light input from light source 915 at the input end 902 of the collimating waveguide 901.

Figure 11A:
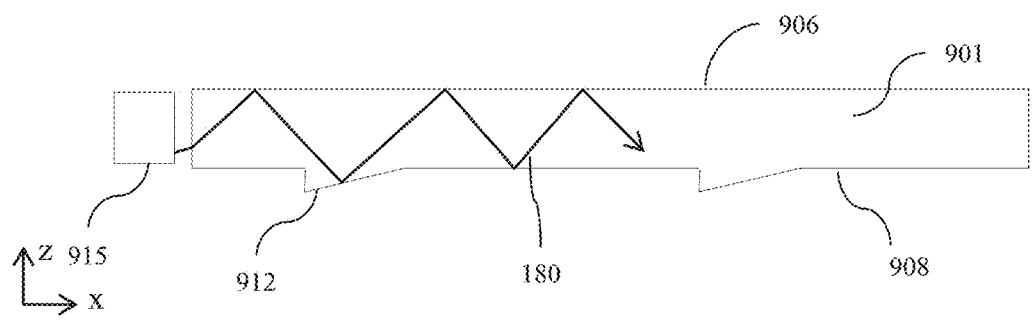
FIG. 11A is a schematic diagram illustrating in side view operation of a first inclined planar region of a collimating waveguide comprising a planar non-inclined region for on-axis illumination.

FIG. 11A is a schematic diagram illustrating in side view operation of a first inclined planar region 912 of a collimating waveguide 901 for on-axis illumination. Light ray 180 propagates by guiding between surfaces 906 and 908. Light ray 180 has angle of incidence at surface 906, 908 gradually reduced by the tapering of the features 912. Light rays that are at smaller angles of incidence than the critical angle in the material of the collimating waveguide 901 are extracted at angles close to grazing the first or second guiding surfaces 906, 908. In operation the taper angle 133 of the features 912 is arranged to not provide alone sufficient light leakage from the collimating waveguide 901; that is insufficient leakage would be present if the non-inclined lenticular surface 30 were not present.

Figure 11B:
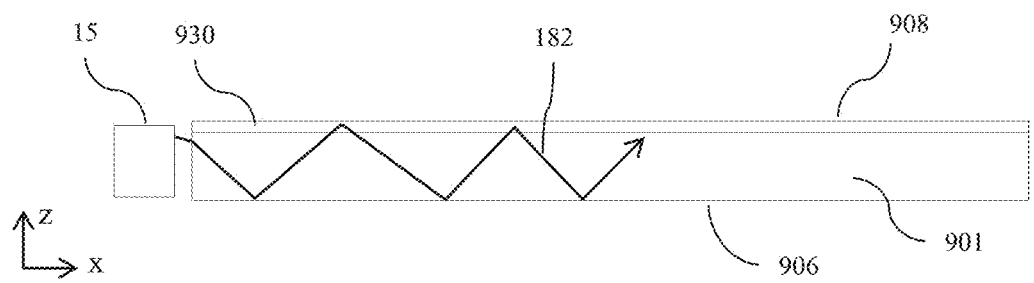
FIG. 11B is a schematic diagram illustrating in side view operation of a non-inclined lenticular structure of a collimating waveguide for on-axis illumination.

FIG. 11B is a schematic diagram illustrating in side view operation of a non-inclined lenticular structure 930 for on-axis illumination. At each reflection at the non-inclined lenticular surface 930, a deflection of the light ray 182 is provided that is out of plane of the paper in FIG. 11B. The resultant ray thus sees a taper effect due to the inclined surface of the lenticular surface 30. Some reflections increase the angle of incidence while other reflections reduce the angle of incidence. In operation the net ray angle of incidence change is small and does not provide sufficient light leakage from the collimating waveguide 901; that is insufficient leakage would be present if the planar surfaces 912 were not present.

The directionality of light extraction from surface 930 will now be further described for light rays incident at different positions across the lenticular surface 930 for light that has not undergone reflections at feature 912.

Figures 12A, 12B, 12C:
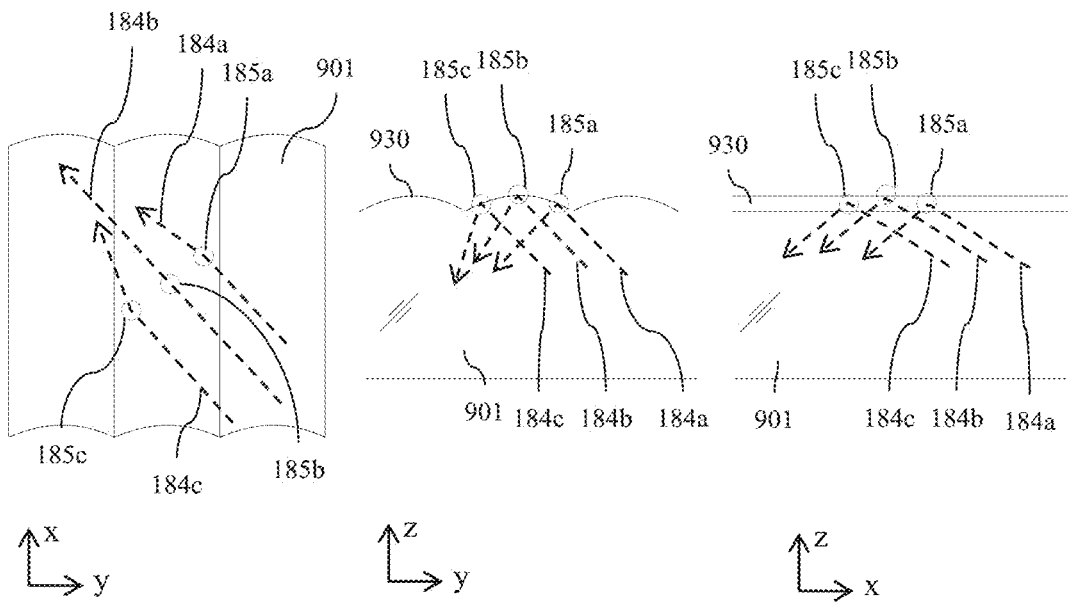
FIG. 12A is a schematic diagram illustrating in top view operation of a non-inclined lenticular structure of a collimating waveguide for off-axis illumination.
FIG. 12B is a schematic diagram illustrating in end view operation of a non-inclined lenticular structure of a collimating waveguide for off-axis illumination.
FIG. 12C is a schematic diagram illustrating in side view operation of a non-inclined lenticular structure of a collimating waveguide for off-axis illumination.

FIG. 12A is a schematic diagram illustrating in top view operation of a non-inclined lenticular structure for off-axis illumination; FIG. 12B is a schematic diagram illustrating in end view operation of a non-inclined lenticular structure for off-axis illumination; and FIG. 12C is a schematic diagram illustrating in side view operation of a non-inclined lenticular structure for off-axis illumination.

Rays 184a, 184b, 184c have locations of incidence 185a, 185b, 185c respectively at the lenticular surface 30. In top view the rays 184a, 184c are deflected by the inclined lenticular surface 930. In end view, the angle of reflection varies across the surface 930 while in side view the angle of reflection is unmodified. For each reflection, the ray angles are sufficiently above the critical angle that no light is extracted.

FIG. 12D is a schematic diagram illustrating in top view operation of an inclined planar feature for off-axis illumination; FIG. 12E is a schematic diagram illustrating in end view operation of an inclined planar feature for off-axis illumination; and FIG. 12F is a schematic diagram illustrating in side view operation of an inclined planar feature for off-axis illumination.

Rays 184*a*, 184*b*, 184*c* have locations of incidence 185*a*, 185*b*, 185*c* respectively at the planar light extraction feature 912. In top view and end view the rays 184*a*, 184*b*, 184*c* are slightly deflected by the inclined feature 912. In side view the dominant effect of the surface of the feature 912 can be visualised, the angle 187*b* being smaller than the angle 187*a*. Thus the taper angle 133 of the feature 912 directs light rays 184*b* closer to the critical angle.

The combined effect of the features 912 and non-inclined lenticular surface 930 will now be described.

FIG. 12G is a schematic diagram illustrating in top view operation of a non-inclined lenticular structure for off-axis illumination after incidence with an inclined planar feature 912; FIG. 12H is a schematic diagram illustrating in end view operation of a non-inclined lenticular structure for off-axis illumination after incidence with an inclined planar feature 912; and FIG. 12I is a schematic diagram illustrating in side view operation of a non-inclined lenticular structure for off-axis illumination after incidence with an inclined planar feature 912.

The light rays 184*a-c* have angles of incidence that have been reduced after reflection at light extraction feature 912. Light rays 184*a*, 184*b* still remain above the critical angle of incidence when incident on the lenticular surface 930. However, light ray 184*c* is incident at an angle below the critical angle and is extracted. The direction of extraction is inclined towards the longitudinal direction in comparison to the incident ray angle, as illustrated in FIG. 12G. In this manner, the light extraction features 912 and lenticular surface 30 cooperate to extract light in directions close to the longitudinal direction.

Figure 13:
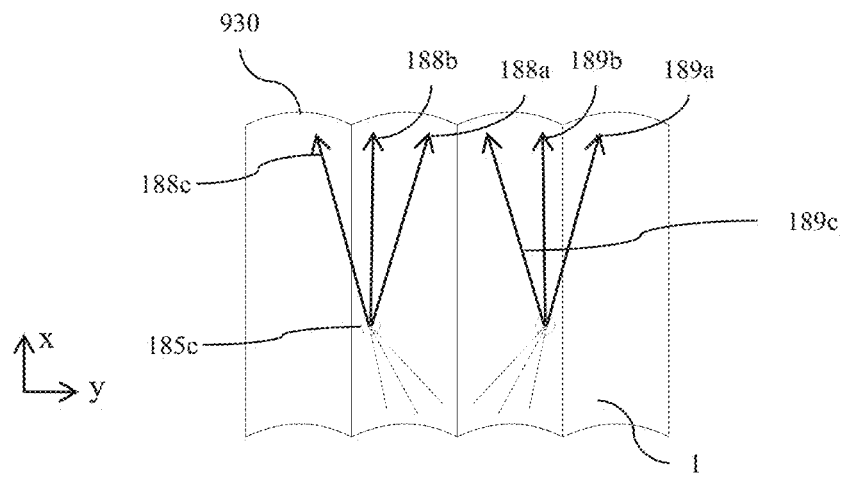
FIG. 13 is a schematic diagram illustrating in top view the output surface of a collimating waveguide and collimating effect of the output surface.

FIG. 13 is a schematic diagram illustrating in top view output of an optical waveguide. Thus light cones comprising rays 188*a*, 188*b*, 188*c* are preferentially output from the lenticular surface 930, arising for light travelling towards an inclined surface. Thus reflected ray bundles 189*a-c* are also provided from the oppositely tilted lenticular surface.

Figure 14:
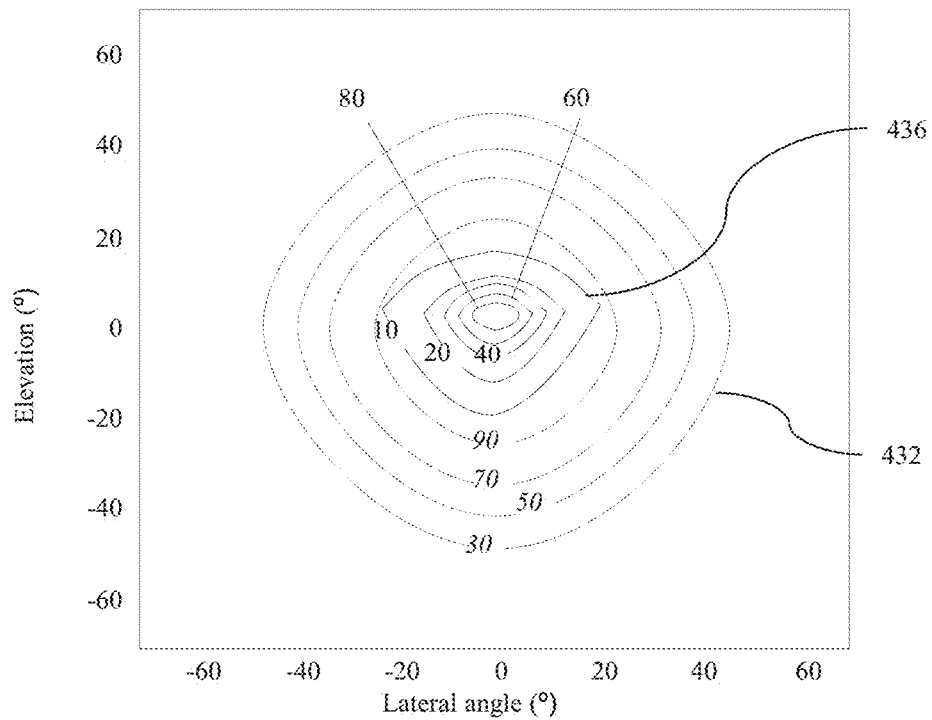
FIG. 14 is a schematic graph illustrating the variation of output transmission with polar direction for transmitted light rays in a display device comprising the collimating waveguide of FIG. 9.

FIG. 14 is a schematic graph illustrating simulated iso-luminance field-of-view polar plot for the directional display device 100 arrangement of FIG. 9 after incidence onto turning film 927.

Contours 436 are illustrated for the directional display device 100 with no passive retarder 600 and for comparison, transmission contours 432 of the passive retarder 600 of FIGS. 3A-3B are also provided.

The source 915 may be arranged at the lower edge of the display device 100 so the horizontal viewing angle direction is in the lateral direction (parallel to x-axis) and the vertical viewing angle direction is the longitudinal direction (parallel to y-axis).

In the longitudinal direction the light ray distribution is provided by light at near grazing angles of incidence onto the light guiding surface 8 and thus has a restricted cone angle. In the lateral viewing angle direction, the output luminance profile is determined by the distribution of rays from the lenticular surface 30 as shown in FIG. 13.

Advantageously a narrow cone angle may be provided in both lateral and elevation directions. Such an illumination profile may be used for high efficiency output to reduce power consumption or to increase output luminance for a given input power consumption.

The passive retarder 600 and additional polariser 618 of the present embodiments may provide reduction of luminance in both lateral and elevation directions. Advantageously a high performance privacy display may be provided that operates in both landscape and portrait orientations.

It may be desirable to provide a display device that switches to a wide angle mode of operation.

Figure 15:
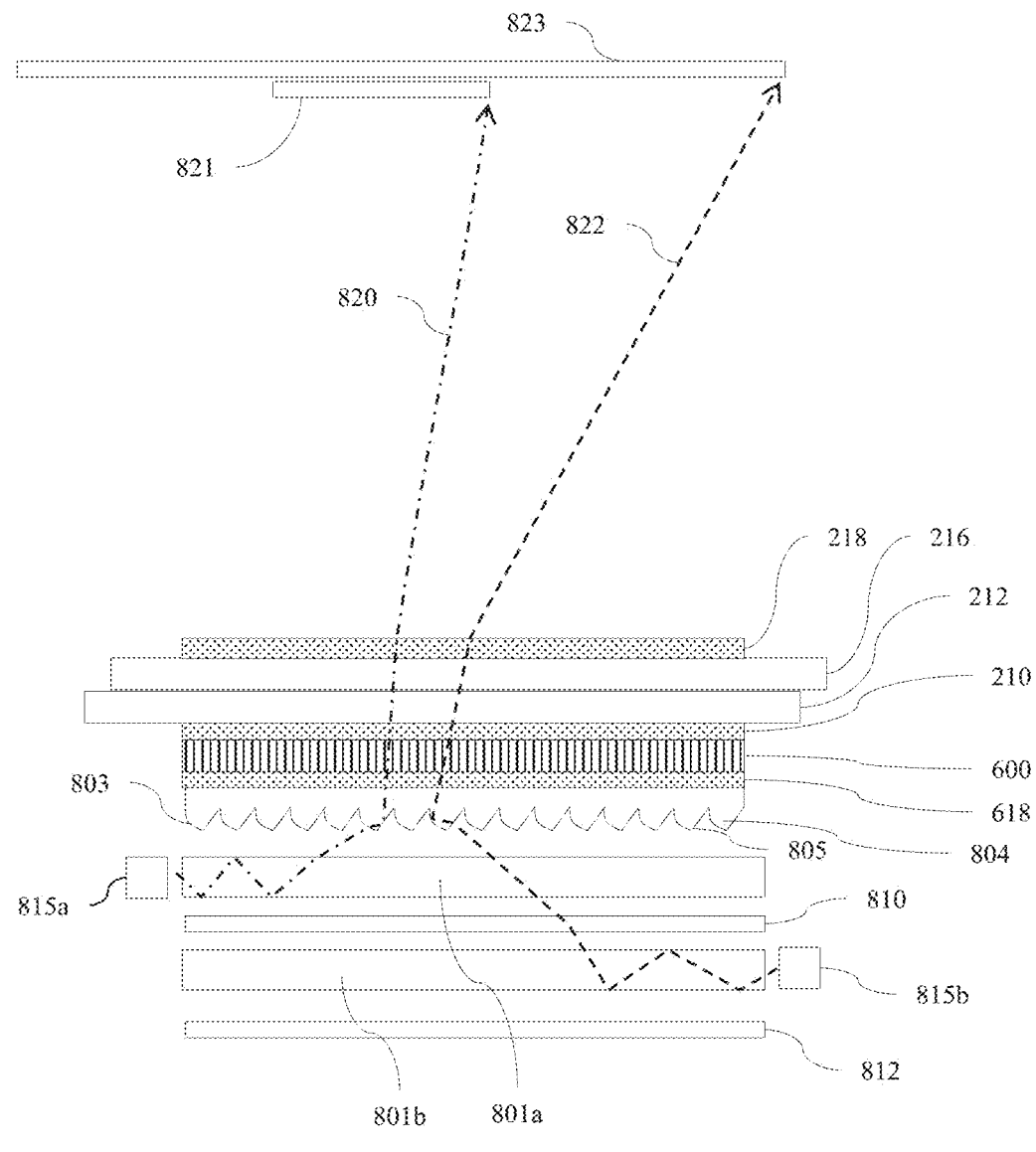
FIG. 15 is a schematic diagram illustrating in side view a directional display device comprising a rear passive retarder and a directional backlight comprising a collimating waveguide and a wide angle waveguide.

FIG. 15 is a schematic diagram illustrating in side view a switchable directional display device comprising a rear passive retarder 600 and additional polariser 618 wherein the display polariser is the input polariser 210. A directional backlight comprises a collimating waveguide 801*a* and a wide angle waveguide 801*b*. Diffuser layers 810 and reflector layer 812 may be further provided. Such a display structure is known and is of the type for example provided in commercially available product HP EliteBook 840 G3.

In operation, the waveguide 801*a* is illuminated by light source 815*a*. A narrow field of view is provided that has luminance for snooper 47 locations further reduced by passive retarder 600 and additional polariser 618. Thus light rays 820 are substantially directed to viewing locations 821 and higher angle rays have substantially reduced luminance.

In wide angle mode of operation, off-axis luminance is increased by means of illumination of light source 815*b*, design of waveguide 801*b* and diffuser layers 810. Thus light rays 822 are directed to a wider range of viewing locations 823.

Advantageously a switching privacy display may be provided that has landscape and portrait modes for bath privacy and wide angle modes of operation.

In the present embodiments, backlight 20 may further comprise a switchable backlight arranged to switch the output angular luminance profile in order to provide reduced off-axis luminance in a privacy mode of operation and higher off-axis luminance in a wide angle mode of operation.

Directional backlights will now be further described.

Figure 16A:
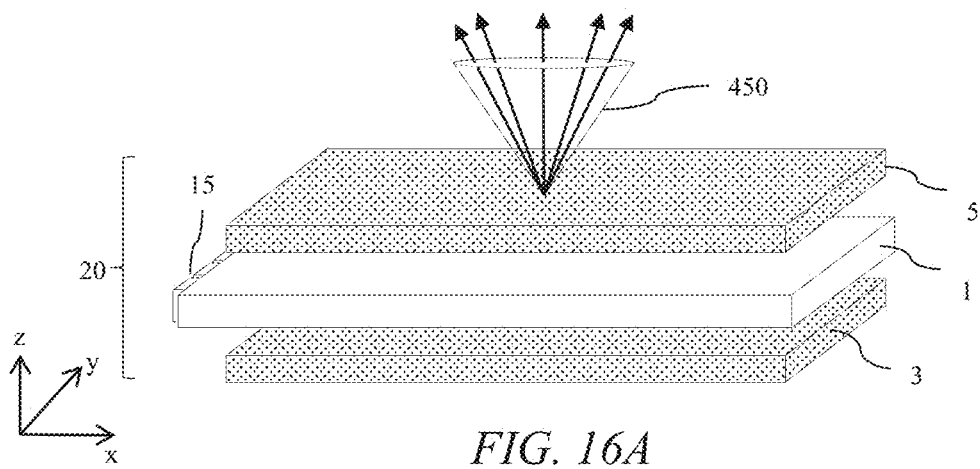
FIG. 16A is a schematic diagram illustrating in front perspective view a directional backlight.
Figure 16B:
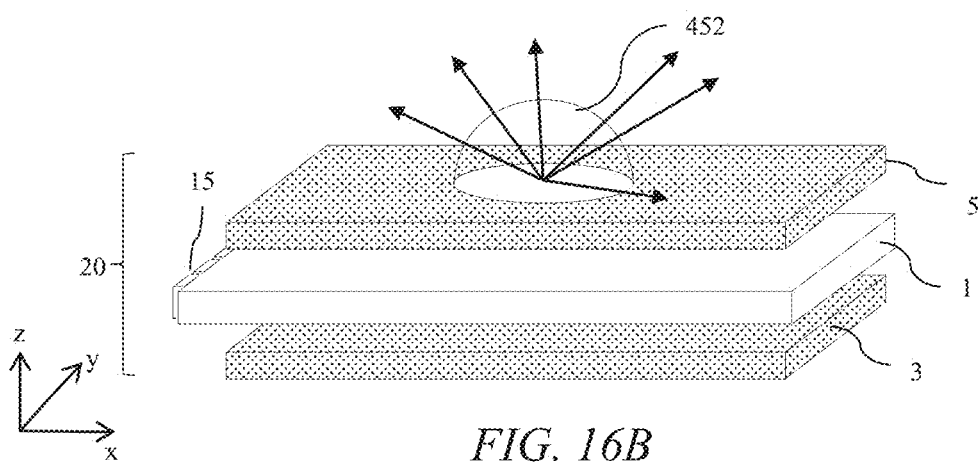
FIG. 16B is a schematic diagram illustrating in front perspective view a non-directional backlight.

FIG. 16A is a schematic diagram illustrating in front perspective view a directional backlight 20; and FIG. 16B is a schematic diagram illustrating in front perspective view a non-directional backlight 20. Thus a directional backlight provides a narrow cone, whereas a non-directional backlight provides a wide angular distribution of light output rays.

Figure 16C:
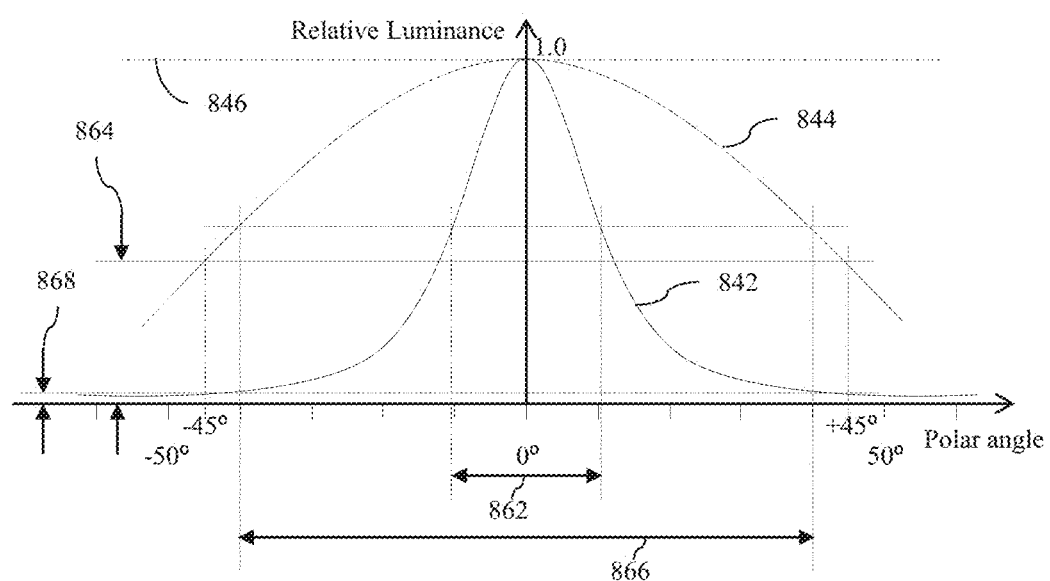
FIG. 16C is a schematic graph illustrating variation with luminance with polar viewing angle of a narrow field-of-view display.

FIG. 16C is a schematic graph illustrating variation with luminance with polar viewing angle for various different backlight arrangements. The graph of FIG. 16C may be a cross section through the polar field-of-view profiles described herein. For zero elevation, the polar angle is the same as the lateral viewing angle.

A Lambertian backlight has a luminance profile 846 that is independent of viewing angle.

A typical wide angle backlight has a roll-off at higher angles such that the full width half maximum 866 of relative luminance may be preferably greater than 40°, more preferably greater than 60° and most preferably greater than 80°. Further the relative luminance 864 at +/−45°, is preferably greater than 7.5%, more preferably greater than 10% and most preferably greater than 20%.

By way of comparison a directional backlight 20 has a roll-off at higher angles such that the full width half maximum 862 of relative luminance may be at most 40°, preferably at most 30° and more preferably at most 25°. Further the directional backlight 20 provides a luminance at polar angles to the normal to the spatial light modulator greater than 45 degrees that is at most 10% of the luminance along the normal to the spatial light modulator, preferably at most 5% of the luminance along the normal to the spatial light modulator, and more preferably at most 2.5% of the luminance along the normal to the spatial light modulator.

In combination with the passive retarders 602 and additional polarises 618 of the present embodiments, a display device 100 comprising a directional backlight 20 may advantageously provide very low visibility to snoopers 47 at off-axis positions.

Further arrangements of passive retarder 600 will now be described.

Figure 17A:
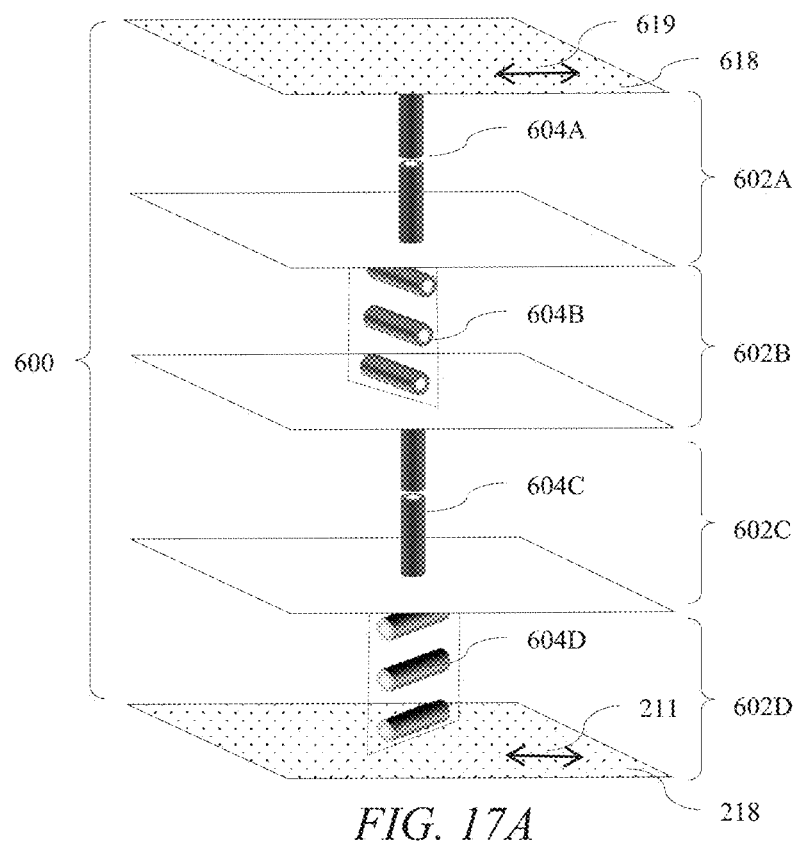
FIG. 17A is a schematic diagram illustrating in side perspective view an optical stack of a passive retarder comprising A-plates and positive C-plates arranged to provide field-of-view modification of a display device.
Figure 17B:
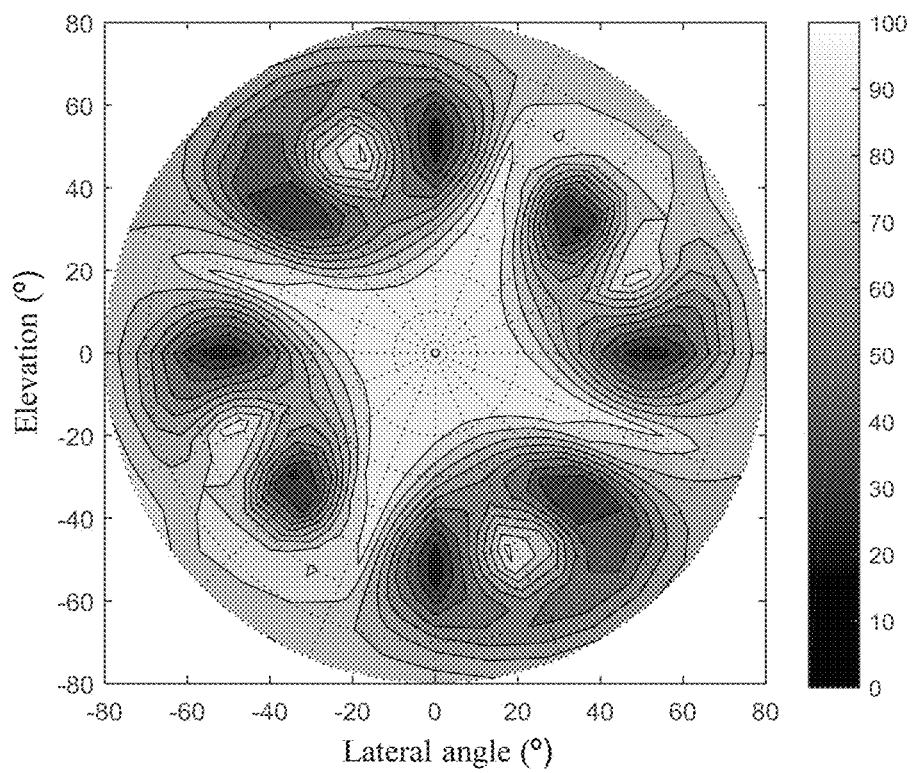
FIG. 17B is a schematic graph illustrating the variation of output transmission with polar direction for transmitted light rays in the passive retarder of FIG. 17A.

FIG. 17A is a schematic diagram illustrating in side perspective view an optical stack of a passive retarder comprising A-plates and positive C-plates arranged to provide field-of-view modification of a display device 100; and FIG. 17B is a schematic graph illustrating the variation of output transmission with polar direction for transmitted light rays in the passive retarder of FIG. 17A comprising the structure illustrated in TABLE 2.

TABLE 2

| | | Passive retarder | | | |
|---|---|---|---|---|---|
| FIGS. | Layer | Type | Out of plane angle/° | In plane angle/° | Δn.d/ nm |
| 17A & 17B | 602A | Positive C | 90 | 0 | 1000 |
| | 602B | Positive A | 0 | 112.5 | 260 |
| | 602C | Positive C | 90 | 0 | 1000 |
| | 602D | Positive A | 0 | 22.5 | 260 |

In comparison to the embodiment of FIG. 2, positive C and positive A retarders are provided. The at least one passive retarder 600 comprises a pair of passive retarders 602B, 602D which have slow axes in the plane of the retarders that are crossed and passive retarders 602A, 602C having a slow axis perpendicular to the plane of the retarder. The pair of passive retarders 602D, 602B that have slow axes in the plane of the retarders extend at 22.5° and 112.5°, respectively, with respect to an electric vector transmission direction that is parallel to the electric vector transmission 219 of the display polariser 218.

In comparison to the arrangement of FIG. 2 and TABLE 1, the retardance of the positive A-plates is reduced and so thinner materials may be used. Advantageously display thickness may be reduced. Positive C-plates may be provided by curing films of homeotropically aligned liquid crystal material. In comparison to the field of view of FIG. 3A, the central region of high luminance is increased. Advantageously display uniformity may be increased for a head-on display user 45.

Figure 18A:
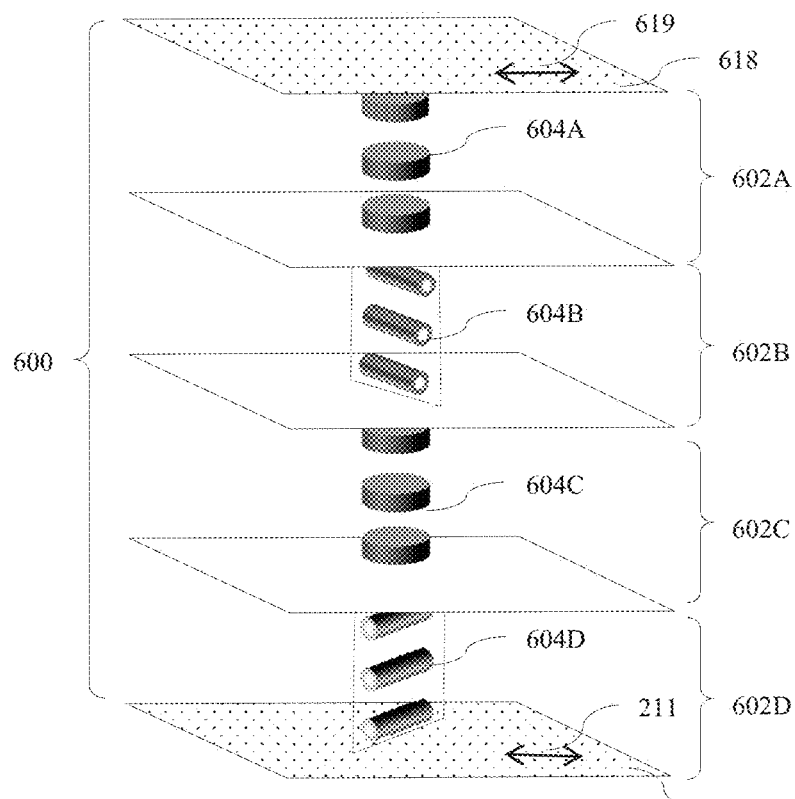
FIG. 18A is a schematic diagram illustrating in side perspective view an optical stack of a passive retarder comprising A-plates and negative C-plates arranged to provide field-of-view modification of a display device.
Figure 18B:
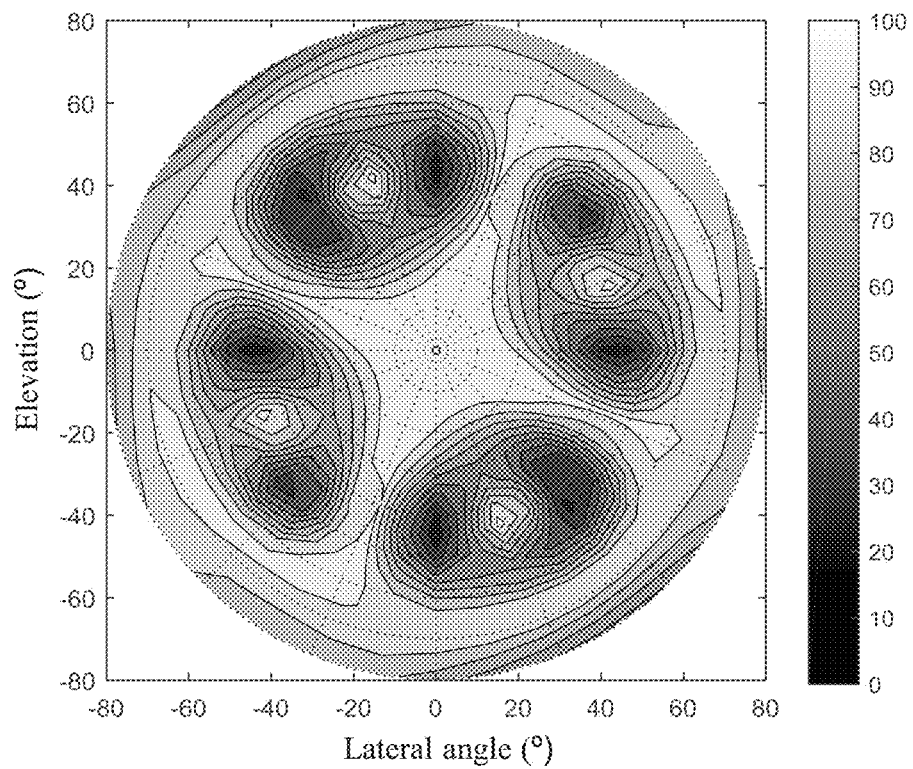
FIG. 18B is a schematic graph illustrating the variation of output transmission with polar direction for transmitted light rays in the passive retarder of FIG. 18A.

FIG. 18A is a schematic diagram illustrating in side perspective view an optical stack of a passive retarder comprising A-plates and negative C-plates arranged to provide field-of-view modification of a display device 100; and FIG. 18B is a schematic graph illustrating the variation of output transmission with polar direction for transmitted light rays in the passive retarder of FIG. 18A comprising the structure illustrated in TABLE 3.

TABLE 3

| | | Passive retarder | | | |
|---|---|---|---|---|---|
| FIGS. | Layer | Type | Out of plane angle/° | In plane angle/° | Δn.d/ nm |
| 18A & 18B | 602A | Negative C | 90 | 0 | -1000 |
| | 602B | Positive A | 0 | 112.5 | 260 |
| | 602C | Negative C | 90 | 0 | -1000 |
| | 602D | Positive A | 0 | 22.5 | 260 |

The at least one passive retarder 600 comprises two passive retarders 602A, 602C having a slow axis perpendicular to the plane of the retarders, and a pair of passive retarders 602B, 602D which have slow axes in the plane of the retarders that are crossed. The pair of passive retarders 602B, 602D that have slow axes in the plane of the retarders extend at 22.5° and 112.5°, respectively, with respect to an electric vector transmission direction that is parallel to the electric vector transmission 219 of the display polariser 218. The passive retarders 602A, 602C having a slow axis perpendicular to the plane of the retarders 600 alternate with the pair of passive retarders 602B, 602D that have slow axes in the plane of the retarders.

Advantageously common retarder materials 604A, 604C may be provided in comparison to FIG. 17A, reducing cost and complexity.

Figure 19A:
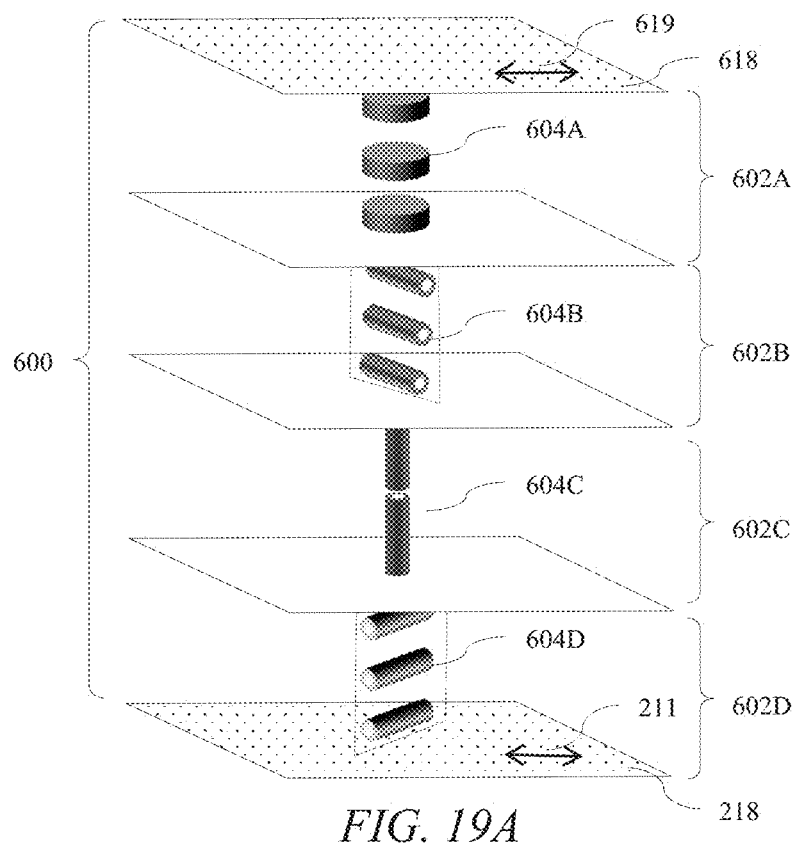
FIG. 19A is a schematic diagram illustrating in side perspective view an optical stack of a passive retarder comprising A-plates, a negative C-plate and a positive C-plate arranged to provide field-of-view modification of a display device.
Figure 19B:
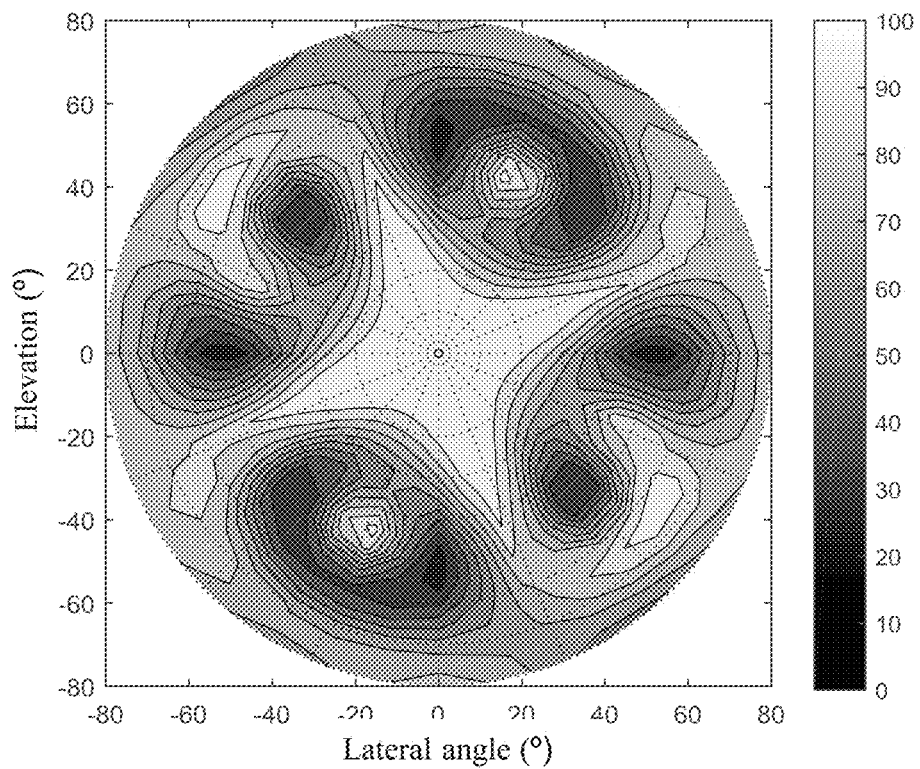
FIG. 19B is a schematic graph illustrating the variation of output transmission with polar direction for transmitted light rays in the passive retarder of FIG. 19A.

FIG. 19A is a schematic diagram illustrating in side perspective view an optical stack of a passive retarder comprising A-plates, a negative C-plate and a positive C-plate arranged to provide field-of-view modification of a display device 100; and FIG. 19B is a schematic graph illustrating the variation of output transmission with polar direction for transmitted light rays in the passive retarder of FIG. 19A, comprising the structure illustrated in TABLE 4.

TABLE 4

| | | Passive retarder | | | |
|---|---|---|---|---|---|
| FIGS. | Layer | Type | Out of plane angle/° | In plane angle/° | Δn.d/ nm |
| 19A & 19B | 602A | Negative C | 90 | 0 | -1000 |
| | 602B | Positive A | 0 | 112.5 | 260 |
| | 602C | Positive C | 90 | 0 | 1000 |
| | 602D | Positive A | 0 | 22.5 | 260 |

It would be desirable to provide reduction of luminance in a lateral direction while providing comfortable viewing freedom for rotation about a horizontal axis.

Figure 20A:
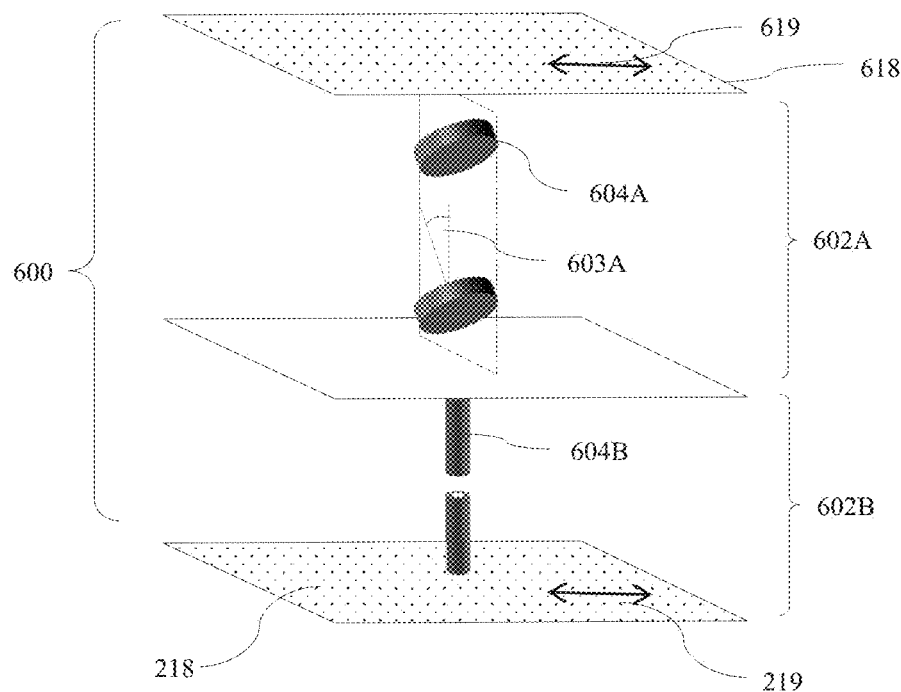
FIG. 20A is a schematic diagram illustrating in side perspective view an optical stack of a passive retarder comprising a negative O-plate tilted in a plane orthogonal to the display polariser electric vector transmission direction and a negative C-plate and arranged to provide field-of-view modification of a display device.
Figure 20B:
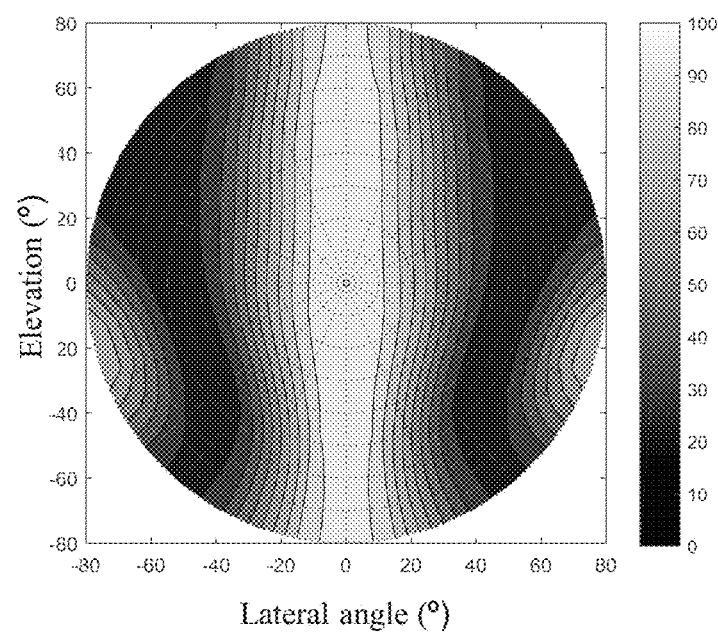
FIG. 20B is a schematic graph illustrating the variation of output transmission with polar direction for transmitted light rays in the passive retarder of FIG. 20A.

FIG. 20A is a schematic diagram illustrating in side perspective view an optical stack of a passive retarder 600 comprising a negative O-plate tilted in a plane orthogonal to the display polariser electric vector transmission direction and a negative C-plate and arranged to provide field-of-view modification of a display device; and FIG. 20B is a schematic graph illustrating the variation of output transmission with polar direction for transmitted light rays in the passive retarder of FIG. 20A, comprising the structure illustrated in TABLE 5.

TABLE 5

| | | Passive retarder | | | |
|---|---|---|---|---|---|
| FIGS. | Layer | Type | Out of plane angle/° | In plane angle/° | Δn.d/ nm |
| 20A & 20B | 602A | Negative O | 65 | 90 | -550 |
| | 602B | Positive C | 90 | 0 | +500 |

The at least one passive retarder 600 thus comprises a passive retarder 602A that is a negative O-plate which has a slow axis with a component in the plane of the passive retarder 602A and a component perpendicular to the plane of the passive retarder 602A. Further the component in the plane of the passive retarder extends at 90°, with respect to an electric vector transmission direction that is parallel to the electric vector transmission 219 of the display polariser 218.

The at least one passive retarder 602B comprises a passive retarder having a slow axis perpendicular to the plane of the passive retarder.

Advantageously luminance may be reduced for lateral viewing directions. A mobile display may be comfortably rotated about a horizontal axis while achieving privacy for off-axis snoopers in a lateral direction.

Another arrangement to achieve a similar luminance reduction to FIG. 20B will now be described.

Figure 20C:
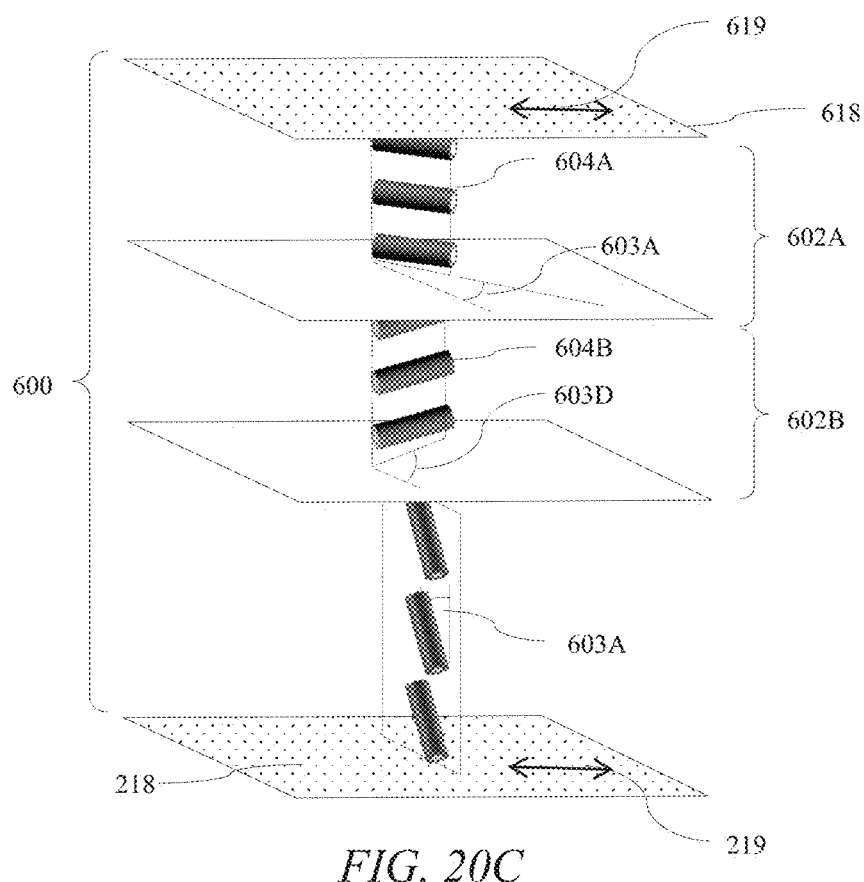
FIG. 20C is a schematic diagram illustrating in side perspective view an optical stack of a passive retarder comprising a positive O-plate tilted in a plane orthogonal to the display polariser electric vector transmission direction and crossed A-plates and arranged to provide field-of-view modification of a display device.
Figure 20D:
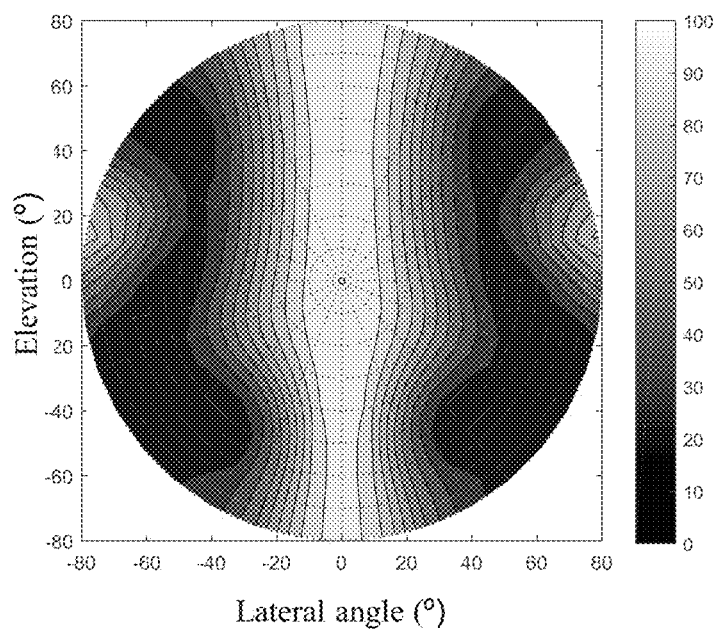
FIG. 20D is a schematic graph illustrating the variation of output transmission with polar direction for transmitted light rays in the passive retarder of FIG. 20C.

FIG. 20C is a schematic diagram illustrating in side perspective view an optical stack of a passive retarder comprising a positive O-plate tilted in a plane orthogonal to the display polariser electric vector transmission direction and crossed A-plates and arranged to provide field-of-view modification of a display device; and FIG. 20D is a schematic graph illustrating the variation of output transmission with polar direction for transmitted light rays in the passive retarder of FIG. 20C, comprising the structure illustrated in TABLE 6.

TABLE 6

| | | | Passive retarder | | |
|---|---|---|---|---|---|
| FIGS. | Layer | Type | Out of plane angle/° | In plane angle/° | Δn.d/ nm |
| 20C & 20D | 602A | Positive A | 0 | 45 | +500 |
| | 602B | Positive A | 0 | 135 | +500 |
| | 602C | Positive O | 65 | 90 | +550 |

The at least one passive retarder 600 thus comprises passive retarders 602A, 602B that are crossed A-plates and retarder 602C which has a slow axis with a component in the plane of the passive retarder 602C and a component perpendicular to the plane of the passive retarder 602C. The component in the plane of the passive retarder extends at 90°, with respect to an electric vector transmission direction that is parallel to the electric vector transmission 219 of the display polariser 218.

In comparison to FIG. 20A, alternative material systems may be provided for the passive retarders 602A, 602B, 602C. Advantageously luminance may be reduced for lateral viewing directions. A mobile display may be comfortably rotated about a horizontal axis while achieving privacy for off-axis snoopers in a lateral direction.

It would be desirable to achieve lateral luminance control while reducing the number of passive retarders.

Figure 21A:
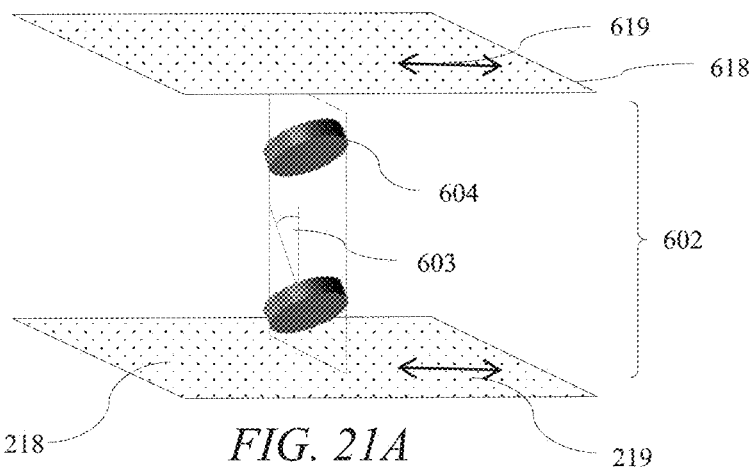
FIG. 21A is a schematic diagram illustrating in side perspective view an optical stack of a passive retarder comprising a negative O-plate tilted in a plane orthogonal to the display polariser electric vector transmission direction and arranged to provide field-of-view modification of a display device.
Figure 21B:
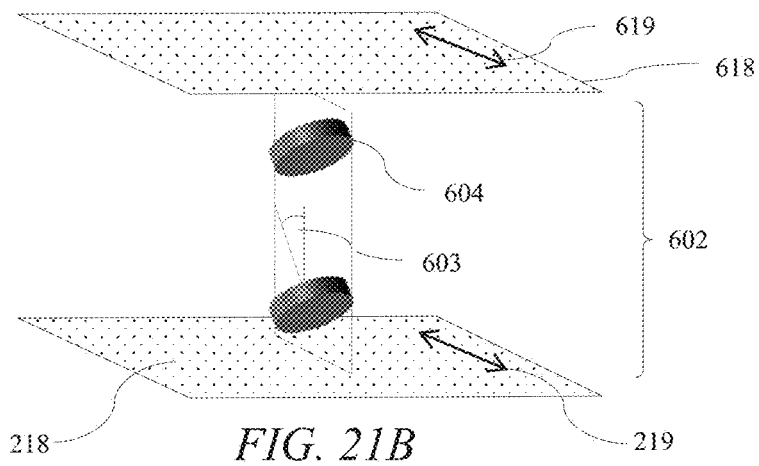
FIG. 21B is a schematic diagram illustrating in side perspective view an optical stack of a passive retarder comprising a negative O-plate tilted in a plane parallel to the display polariser electric vector transmission direction and arranged to provide field-of-view modification of a display device.
Figure 21C:
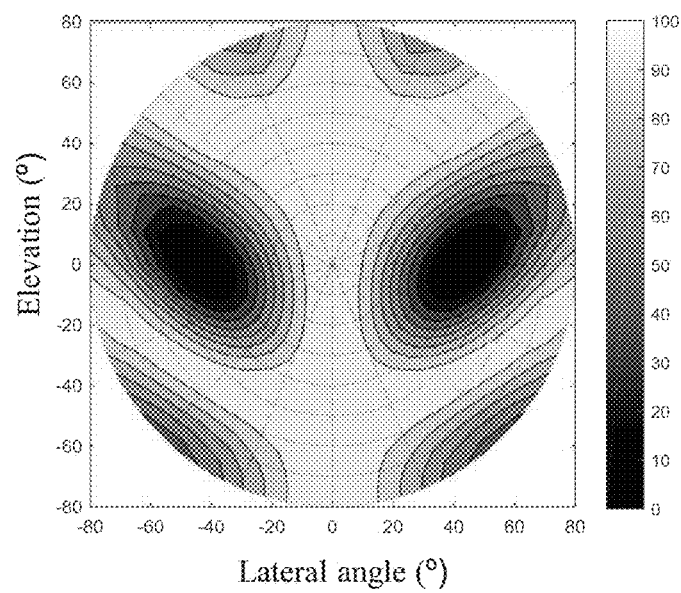
FIG. 21C is a schematic graph illustrating the variation of output transmission with polar direction for transmitted light rays in the passive retarder of FIG. 21A and FIG. 21B.

FIG. 21A is a schematic diagram illustrating in side perspective view an optical stack of a passive retarder comprising a negative O-plate tilted in a plane orthogonal to the display polariser 218 electric vector transmission direction 219 and arranged to provide field-of-view modification of a spatial light modulator 48 and backlight 20; FIG. 21B is a schematic diagram illustrating in side perspective view an optical stack of a passive retarder comprising a negative O-plate tilted in a plane parallel to the display polariser 218 electric vector transmission direction 219 and arranged to provide field-of-view modification of a spatial light modulator 48 and backlight 20; and FIG. 21C is a schematic graph illustrating the variation of output transmission with polar direction for transmitted light rays in the passive retarder of FIG. 21A and FIG. 21B, comprising the structure illustrated in TABLE 7.

TABLE 7

| | | | Passive retarder | | |
|---|---|---|---|---|---|
| FIGS. | Layer | Type | Out of plane angle/° | In plane angle/° | Δn.d/ nm |
| 21A & 21C | 602 | Negative O | 65 | 90 | −700 |
| 21B & 21C | 602 | Negative O | 65 | 0 | −700 |

The at least one passive retarder 600 thus comprises a passive retarder 602 which has a slow axis with a component in the plane of the passive retarder 602 and a component perpendicular to the plane of the passive retarder 602. Further the component in the plane of the passive retarder extends at 0°, with respect to an electric vector transmission direction that is perpendicular to the electric vector transmission 219 of the display polariser 218 as illustrated in FIG. 21A or is parallel to the electric vector transmission 219 of the display polariser 218 as illustrated in FIG. 21B.

In each of the present embodiments, the alignments of the passive retarders 602 may be with respect to a direction parallel or perpendicular to the electric vector transmission 219 of the display polariser 218, and provide similar or identical performance for both alignments.

Advantageously a luminance reduction may be provided for off-axis lateral viewing positions while achieving high head-on efficiency and wide viewing freedom for rotation about a horizontal axis from a single passive retarder, reducing cost and complexity.

Figure 22A:
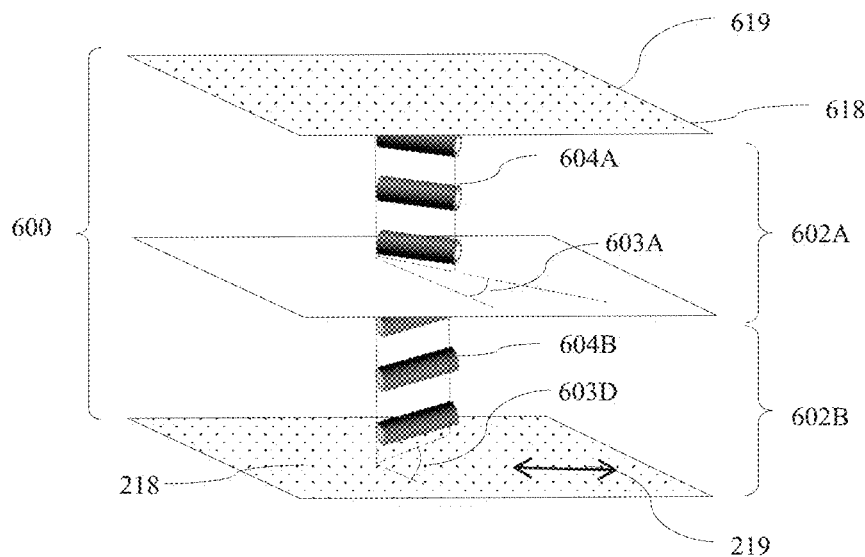
FIG. 22A is a schematic diagram illustrating in side perspective view an optical stack of a passive retarder comprising crossed A-plates and arranged to provide field-of-view modification of a display device.
Figure 22B:
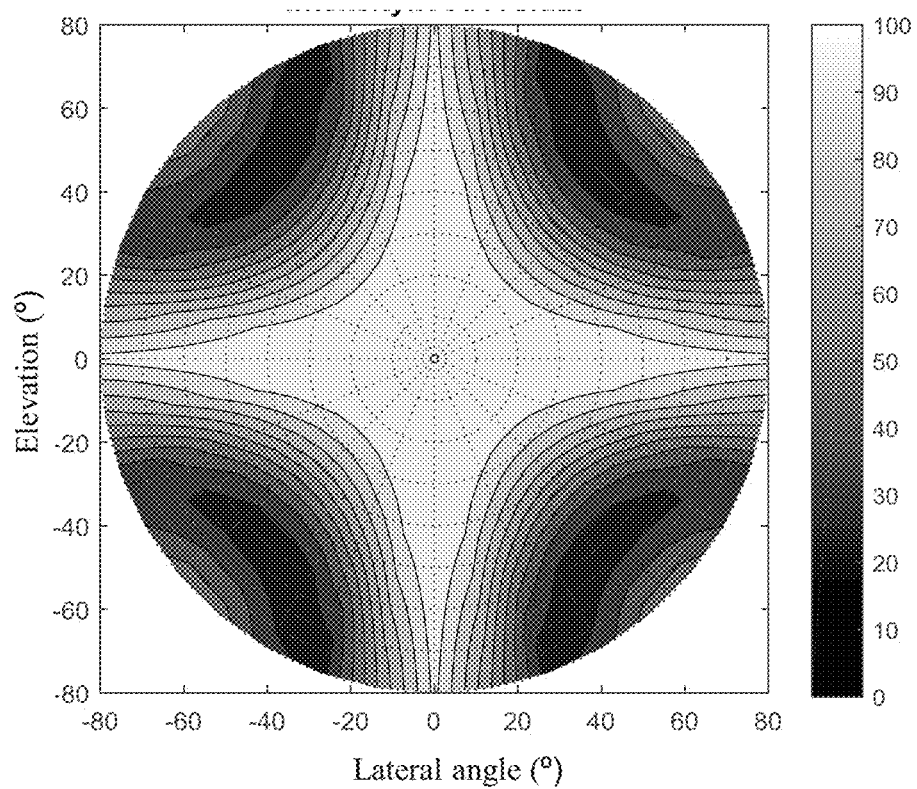
FIG. 22B is a schematic graph illustrating the variation of output transmission with polar direction for transmitted light rays in the passive retarder of FIG. 22A.

FIG. 22A is a schematic diagram illustrating in side perspective view an optical stack of a passive retarder comprising crossed A-plates 602A, 602B and arranged to provide field-of-view modification of a display device 100; and FIG. 22B is a schematic graph illustrating the variation of output transmission with polar direction for transmitted light rays in the passive retarder of FIG. 22A, comprising the structure illustrated in TABLE 8.

TABLE 8

| | | | Passive retarder | | |
|---|---|---|---|---|---|
| FIGS. | Layer | Type | Out of plane angle/° | In plane angle/° | Δn.d/ nm |
| 22A & 22B | 602A | Positive A | 0 | 45 | 660 |
| | 602B | Positive A | 0 | 135 | 660 |

The at least one retarder thus comprises a pair of passive retarders 602A, 602B that have slow axes in the plane of the retarders that are crossed. Preferably the angle 603A is at least −10° and at most 10°, more preferably at least −5° and at most 5° and most preferably at least −2° and at most 2°. Preferably the angle 603B is at least 80° and at most 100°, more preferably at least 85° and at most 95° and most preferably at least 88° and at most 92°.

Advantageously the cost of the optical stack may be reduced by providing passive retarders 602A, 602B with loose tolerances while maintaining desirable head-on luminance and off-axis luminance reduction. Very low thickness may be provided by means of cured reactive mesogen films. Advantageously the cost and complexity of the passive retarder 600 is reduced. Further, visibility for snoopers 47 in viewing quadrants is reduced.

Figure 23A:
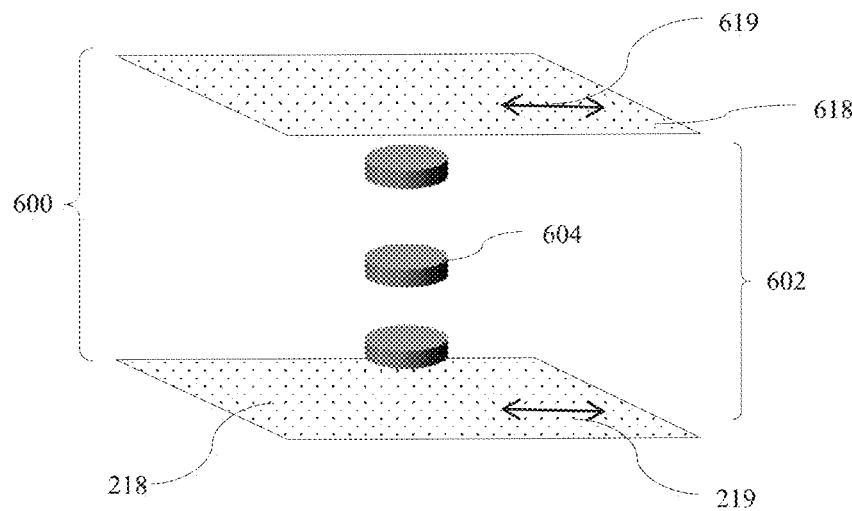
FIG. 23A is a schematic diagram illustrating in side perspective view an optical stack of a passive retarder comprising a negative C-plate and arranged to provide field-of-view modification of a display device.
Figure 23B:
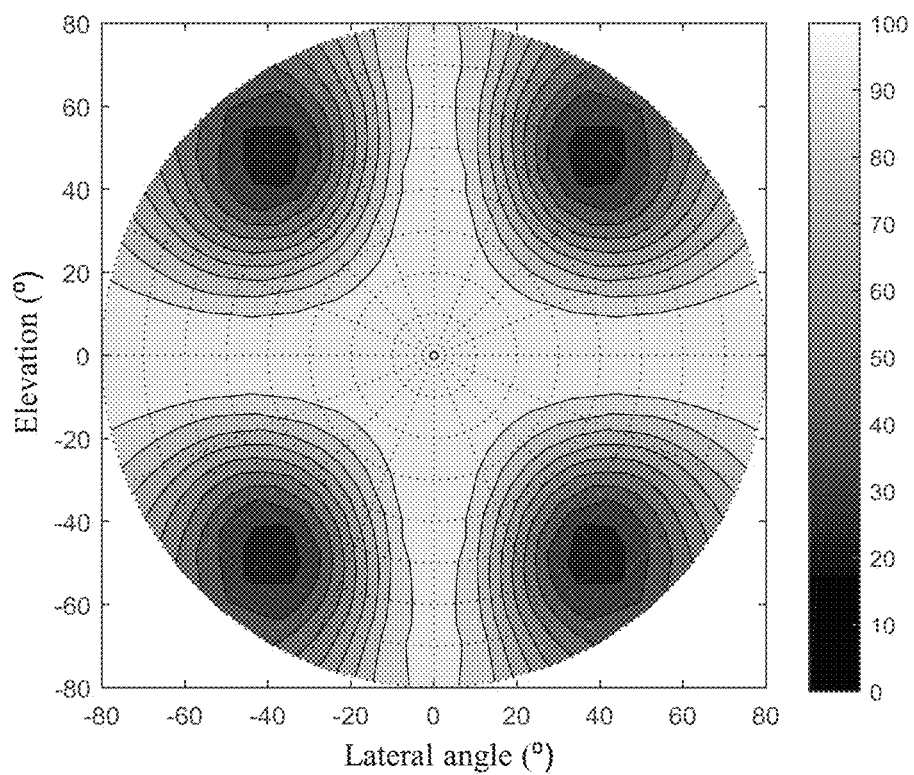
FIG. 23B is a schematic graph illustrating the variation of output transmission with polar direction for transmitted light rays in the passive retarder of FIG. 23A.

FIG. 23A is a schematic diagram illustrating in side perspective view an optical stack of a passive retarder comprising a negative C-plate and arranged to provide field-of-view modification of a display device 100; FIG. 23B is a schematic graph illustrating the variation of output transmission with polar direction for transmitted light rays in the passive retarder of FIG. 23A, comprising the structure illustrated in TABLE 9.

TABLE 9

| | | Passive retarder | | | |
|---|---|---|---|---|---|
| FIGS. | Layer | Type | Out of plane angle/° | In plane angle/° | Δn.d/ nm |
| 23A & 23B | 602 | Negative C | 90 | 0 | −680 |

Advantageously the cost and complexity of the passive retarder 600 is reduced. Further, visibility for snoopers 47 in viewing quadrants is reduced in comparison to an unmodified display. For the head-on user 45, image visibility for rotations of the display about a horizontal axis is also improved in comparison to the passive retarder 600 of FIG. 2.

It would be desirable to further reduce the transmittance for off-axis viewing positions in comparison to the passive retarders 600 between a single pair of parallel polarisers described above.

Figure 24A:
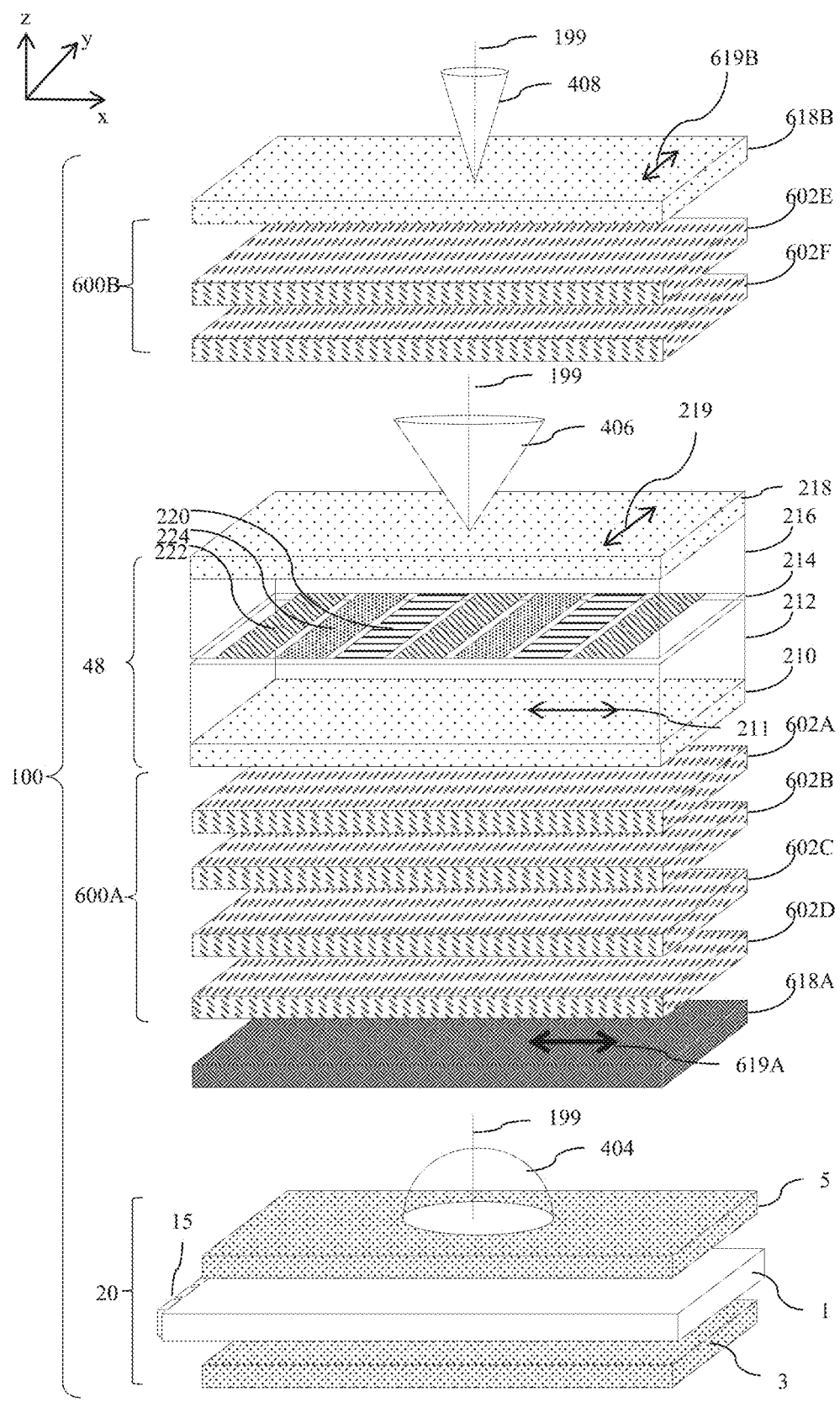
FIG. 24A is a schematic diagram illustrating in side perspective view a directional display device comprising a rear passive retarder and additional polariser and a front further passive retarder and further additional polariser, a transmissive spatial light modulator and a backlight.

FIG. 24A is a schematic diagram illustrating in side perspective view a directional display device comprising a rear passive retarder and additional polariser and a front further passive retarder and further additional polariser, a transmissive spatial light modulator and a backlight; comprising the structure illustrated in TABLE 10.

TABLE 10

| | | Passive retarder | | | |
|---|---|---|---|---|---|
| FIGS. | Layer | Type | Out of plane angle/° | In plane angle/° | Δn.d/ nm |
| 24A-C | 602A | Positive A | 0 | 45 | 700 |
| | 602B | | | 90 | |
| | 602C | | | 0 | |
| | 602D | | | 135 | |
| | 210 | Polariser | — | 0 | — |
| | 602E | Negative O | 65 | 90 | −550 |
| | 602F | Positive C | 90 | 0 | +500 |

The display device 100 comprises passive retarder 600A and additional polariser 618A such that the passive retarder 600A is arranged between the additional polariser 618A and input polariser 210. The display device 100 further comprises at least one further passive retarder 600B and a further additional polariser 618A arranged in series with the passive polariser 600A and additional polariser 618A wherein the further passive polariser 600B is arranged between the output display polariser 218 and the further additional polariser 618B.

Thus input light cone 404 from backlight 20 is output from the spatial light modulator 48 as cone 406 which is further narrowed to cone 408 by the further passive retarder 602E, 602F and the further additional polariser 618B.

The off-axis transmittance may be achieved by multiplication of the profiles of FIG. 3A and FIG. 20B for example. Such an arrangement may provide high on-axis efficiency and substantial reduction of off-axis luminance for conventional backlights that may have near Lambertian light cones 404 for example.

The additional polariser 618A may be a reflective polariser arranged between the spatial light modulator 48 and the backlight 20. Advantageously the head-on efficiency compared to a backlight in which reflective polariser is already used is maintained.

Advantageously directional waveguides may or may not be used, achieving reduced cost and thickness. Further measures to minimise stray light within the backlight may be removed, achieving reduced cost and improved privacy performance.

Figure 24B:
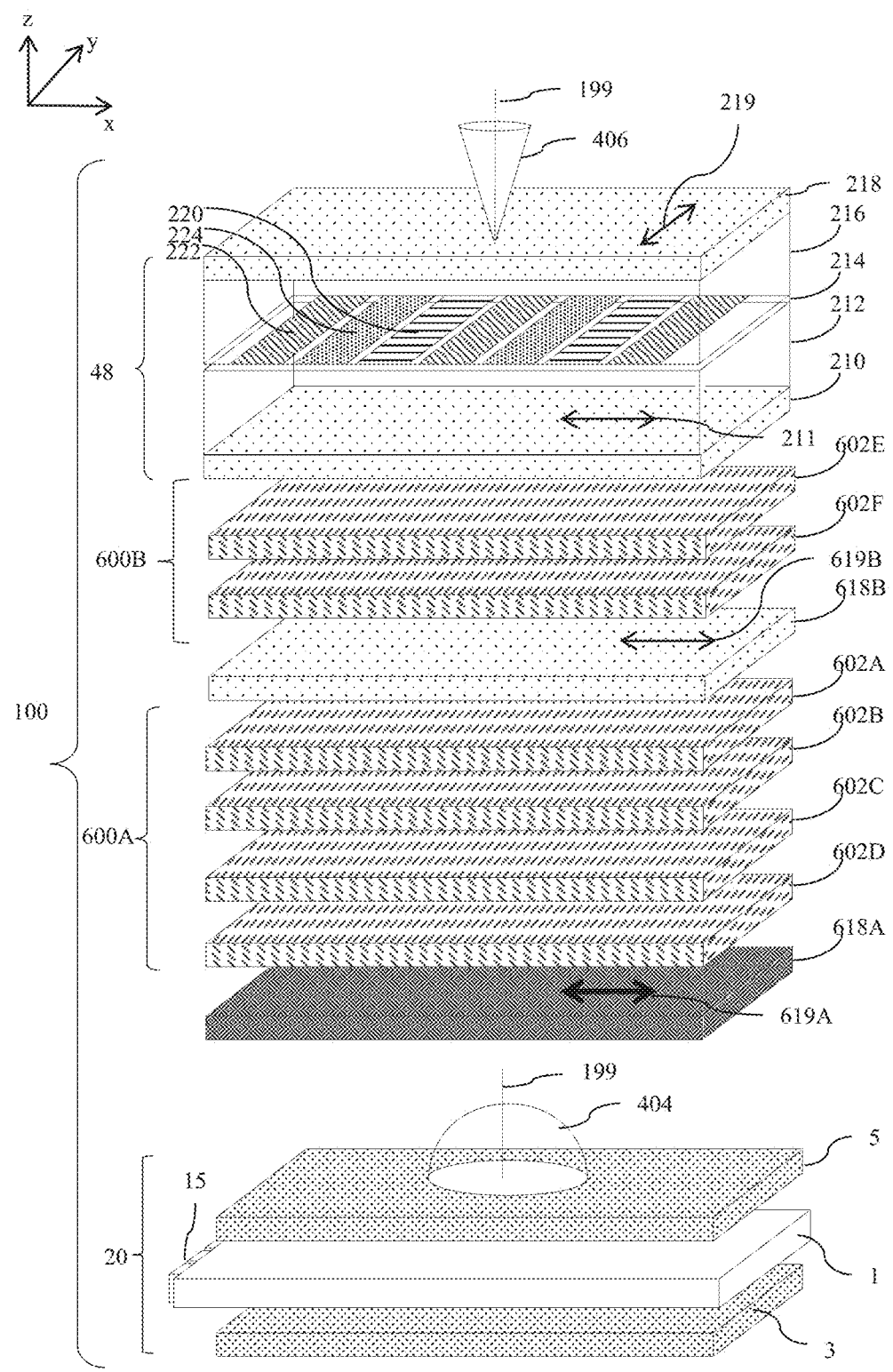
FIG. 24B is a schematic diagram illustrating in side perspective view a directional display device comprising a rear passive retarder and additional polariser and a rear further passive retarder and further additional polariser, a transmissive spatial light modulator and a backlight.

FIG. 24B is a schematic diagram illustrating in side perspective view a directional display device comprising a rear passive retarder and additional polariser and a rear further passive retarder and further additional polariser, a transmissive spatial light modulator and a backlight.

The at least one further passive retarder 600B is arranged between the additional polariser 618A and the further additional polariser 618B. Advantageously front-of-display appearance is unmodified and image fidelity optimised. Further the passive retarders 600A, 600B may be arranged to compensate for respective angular colour roll-offs for each of the individual passive retarders. Advantageously colour changes with viewing angle may be minimised.

Figure 24C:
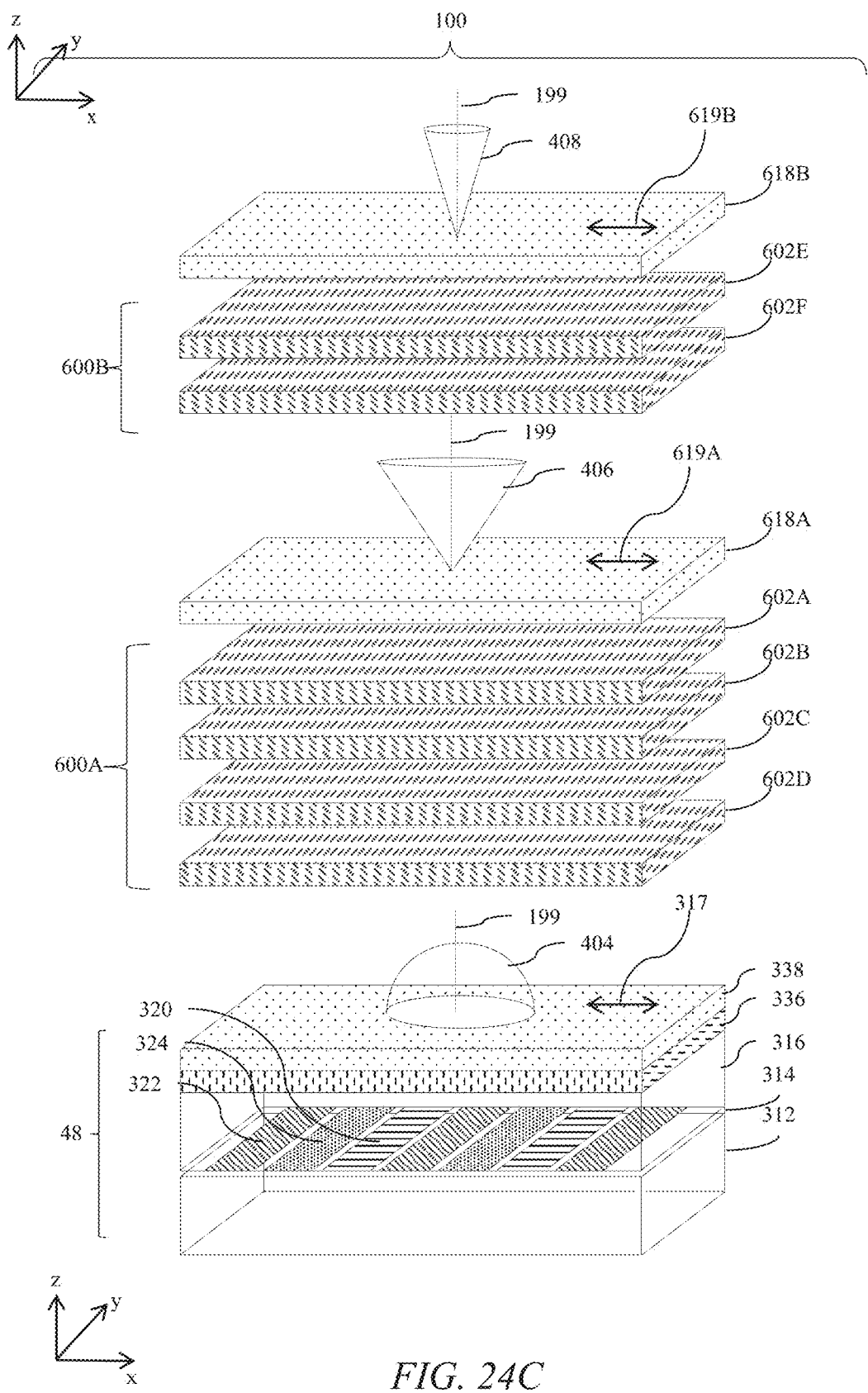
FIG. 24C is a schematic diagram illustrating in side perspective view a directional display device comprising a front passive retarder and additional polariser and a front further passive retarder and further additional polariser arranged on an emissive display.

FIG. 24C is a schematic diagram illustrating in side perspective view a directional display device comprising a front passive retarder and additional polariser and a front further passive retarder and further additional polariser arranged on an emissive spatial light modulator 48. The Lambertian light cone 404 may be restricted by means of the passive retarders 600A, 600B and polarisers 618A, 618B to provide output light cone 408. Advantageously an emissive display may be provided with privacy and low stray light operation with low off-axis luminance levels in comparison to the arrangement of FIG. 1B.

The passive retarder 600B may be the same arrangement as 600A to advantageously achieve improved performance for landscape-portrait operation.

Alternatively the passive retarder 600A may be the same arrangement as 600B to advantageously achieve improved performance for landscape-only or portrait-only operation. The optical isolator function of polariser 338 and retarder 336 is maintained, advantageously achieving high image contrast.

The field-of-view transmission control a further be provided by view angle control elements 601 as will now be further described.

A view angle control optical element 601 for application to a display device comprising a spatial light modulator 48 and a display polariser 210, 218 or 318 may comprise: control polariser 618 and at least one passive retarder 600 for arrangement between the control polariser 618 and the display polariser 210, 218 or 318 on application of the view angle control optical element to the display device. The at least one passive retarder 600 may comprise at least two passive retarders 602A, 602B with at least two different orientations of slow axes.

The at least one passive retarder 600 may comprise a pair of passive retarders 602A, 602D which have slow axes in the plane of the passive retarders 602A, 602D that are crossed. The pair of passive retarders 602A, 602D may have slow axes that extend at 45° and at 135°, respectively, with respect to an electric vector transmission direction that is parallel to the electric vector transmission of the control polariser.

The view angle control optical element may further comprise an additional pair of passive retarders 602B, 602C disposed between the first mentioned pair of passive retarders and which have slow axes in the plane of the passive retarders that are crossed. The additional pair of passive retarders 602B, 602C may have slow axes that each extend at 0° and at 90°, respectively, with respect to an electric vector transmission direction that is parallel to the electric vector transmission of the control polariser. The retardance for light of a wavelength of 550 nm of each passive retarder may be in a range from 600 nm to 850 nm, preferably in a range from 650 nm to 730 nm, and most preferably in a range from 670 nm to 710 nm.

The at least one passive retarder 600 may comprise a passive retarder 602 having a slow axis perpendicular to the plane of the passive retarder. The at least one passive retarder may comprise two passive retarders having a slow axis perpendicular to the plane of the passive retarders, and a pair of passive retarders which have slow axes in the plane of the passive retarders that are crossed. The pair of passive retarders may have slow axes in the plane of the passive retarders extend at 22.5° and 112.5°, respectively, with respect to an electric vector transmission direction that is parallel to the electric vector transmission of the control polariser. The passive retarders having a slow axis perpendicular to the plane of the passive retarders may alternate with the pair of passive retarders that have slow axes in the plane of the passive retarders.

The at least one passive retarder may comprise a passive retarder which has a slow axis with a component in the plane of the passive retarder and a component perpendicular to the plane of the passive retarder. The component in the plane of the passive retarder may extend at 0°, with respect to an electric vector transmission direction that is parallel or perpendicular to the electric vector transmission of the control polariser. The view angle control optical element may further comprise at least one further passive retarder and a further additional polariser; wherein the at least one further passive retarder may be arranged between the first mentioned additional polariser and the further additional polariser.

Advantageously the view angle control of the passive retarders and additional polarisers, further passive retarders and further additional polarisers may be provided for off-axis luminance control of a display for privacy and low stray light applications. Performance may be similar or the same to the at least one passive retarder 600 and additional polariser 618 provided with the display polariser 210, 218, 318 of a spatial light modulator 48 described elsewhere herein.

Further, an after-market privacy control element and/or stray light control element may be provided that does not require matching to the panel pixel resolution to avoid Moiré artefacts. The view angle control element may be conveniently cut to size and orientation of the output polariser and may be a flexible element that may be used with curved, foldable or bent displays.

A further exemplary embodiment of a view angle control element 601 will now be described.

Figure 24D:
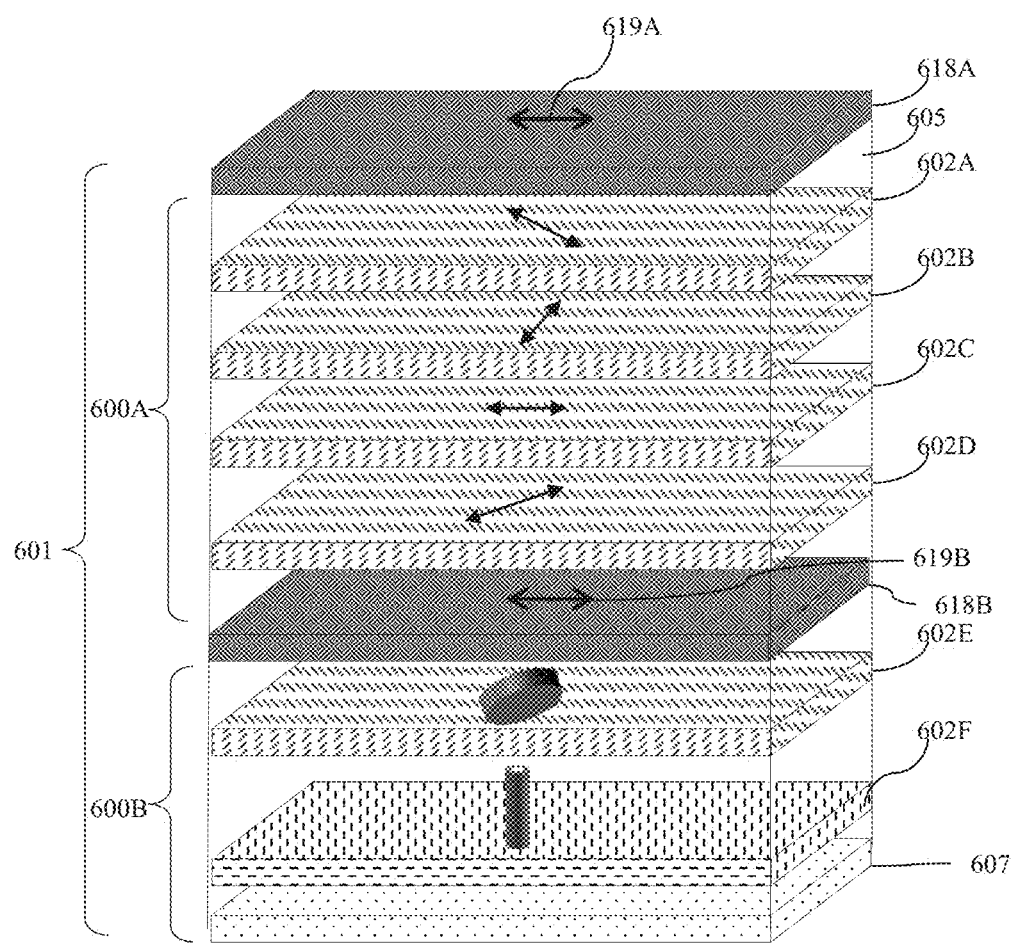
FIG. 24D is a schematic diagram illustrating in side perspective view a view angle control element comprising a passive retarder stack, a control polariser, a further passive retarder stack, a further control polariser and a diffuser.

FIG. 24D is a schematic diagram illustrating in side perspective view a view angle control element 601 comprising a passive retarder stack 602A, 602B, 602C, 602D, a control polariser 618A, a further passive retarder stack 602E, 602F, a further control polariser 618B and a diffuser 607. Such a view angle control element 601 may be added to a spatial light modulator with a wide field of view and achieve reduced stray light and reduced visibility to an off-axis snooper while minimising head-on loss without Moiré effects. The diffuser 607 may provide resistance to wetting of the view angle control element 601 to the display.

Advantageously the view angle control element 601 may be cut to size from a large roll for either factory fitting between the spatial light modulator and backlight, or front of display. Alternatively the view angle control element 601 may be provided as an after-market attachment to the front a spatial light modulator by a display user.

The operation of retarder layers between parallel polarisers for off-axis illumination will now be described further.

Figure 25A:
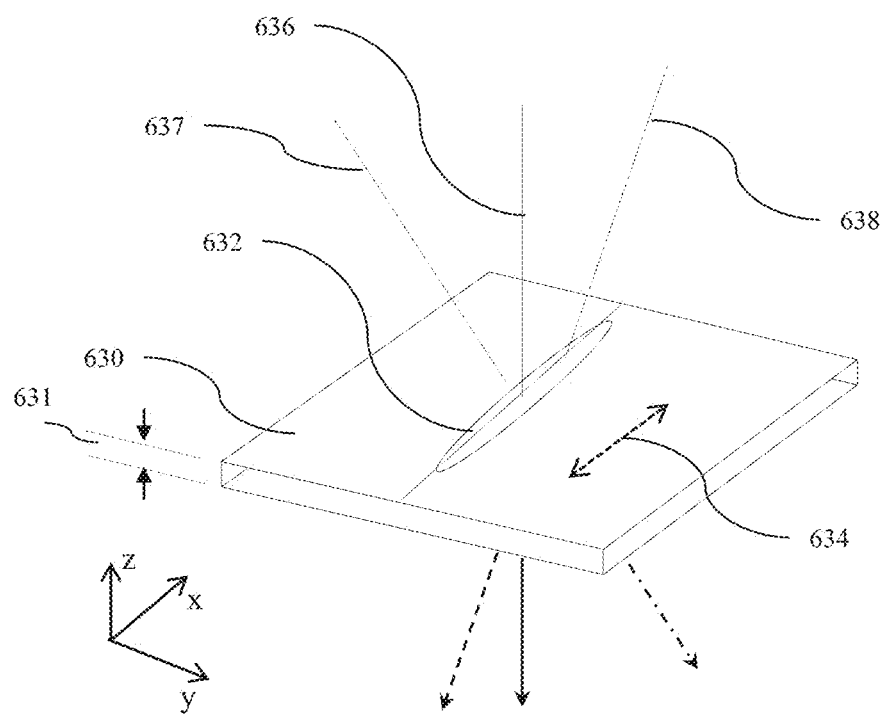
FIG. 25A is a schematic diagram illustrating in perspective view illumination of a retarder layer by off-axis light.

FIG. 25A is a schematic diagram illustrating in perspective view illumination of a retarder layer by off-axis light. Correction retarder 630 may comprise birefringent material, represented by refractive index ellipsoid 632 with slow axis direction 634 at 0 degrees to the x-axis, and have a thickness 631. Normal light rays 636 propagate so that the path length in the material is the same as the thickness 631. Light rays 637 are in the y-z plane have an increased path length; however the birefringence of the material is substantially the same as the rays 636. By way of comparison light rays 638 that are in the x-z plane have an increased path length in the birefringent material and further the birefringence is different to the normal ray 636.

The retardance of the retarder 630 is thus dependent on the angle of incidence of the respective ray, and also the plane of incidence, that is rays 638 in the x-z will have a retardance different from the normal rays 636 and the rays 637 in the y-z plane.

The interaction of polarized light with the retarder 630 will now be described. To distinguish from the first and second polarization components during operation in a directional backlight 101, the following explanation will refer to third and fourth polarization components.

Figure 25B:
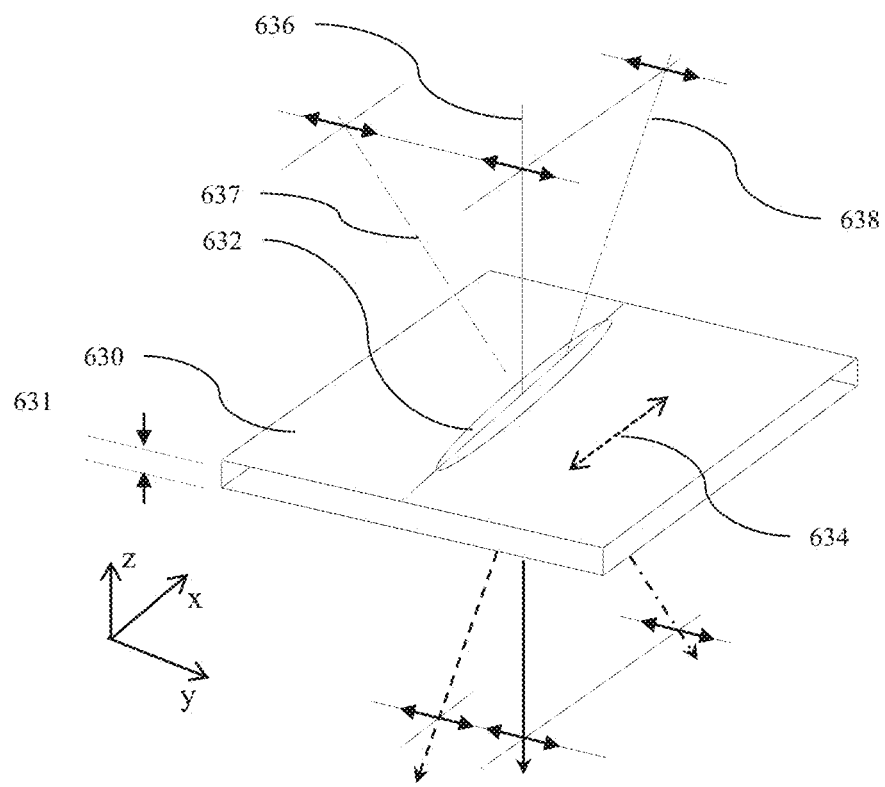
FIG. 25B is a schematic diagram illustrating in perspective view illumination of a retarder layer by off-axis light of a first linear polarization state at 0 degrees.
Figure 25C:
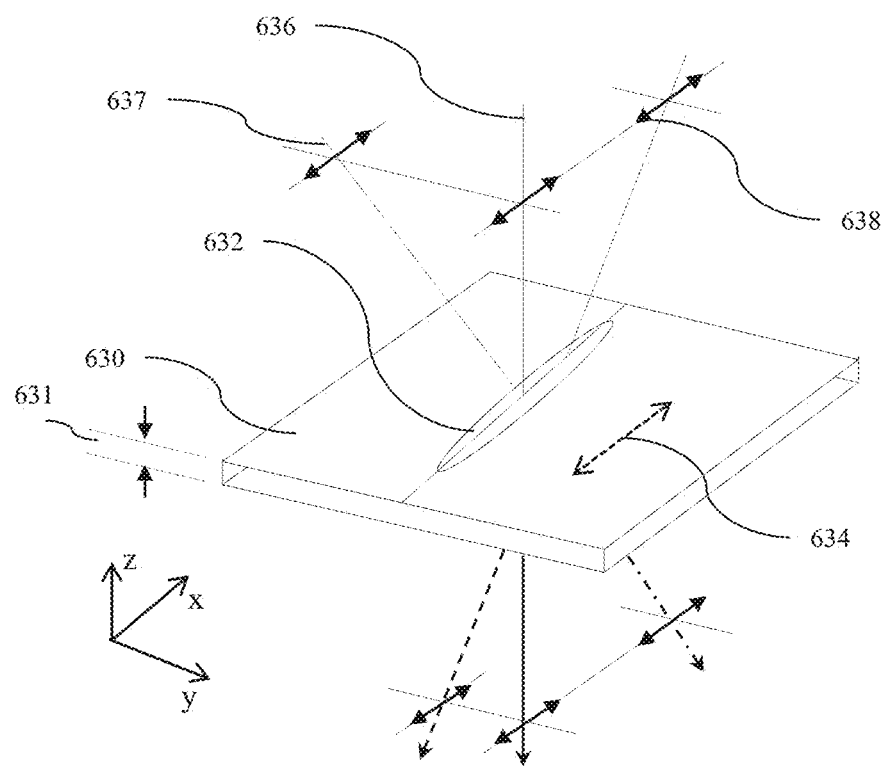
FIG. 25C is a schematic diagram illustrating in perspective view illumination of a retarder layer by off-axis light of a first linear polarization state at 90 degrees.

FIG. 25B is a schematic diagram illustrating in perspective view illumination of a retarder layer by off-axis light of a third linear polarization state at 90 degrees to the x-axis and FIG. 25C is a schematic diagram illustrating in perspective view illumination of a retarder layer by off-axis light of a fourth linear polarization state at 0 degrees to the x-axis. In such arrangements, the incident linear polarization states are aligned to the optical axes of the birefringent material, represented by ellipse 632. Consequently, no phase difference between the third and fourth orthogonal polarization components is provided, and there is no resultant change of the polarization state of the linearly polarized input for each ray 636, 637, 638.

Figure 25D:
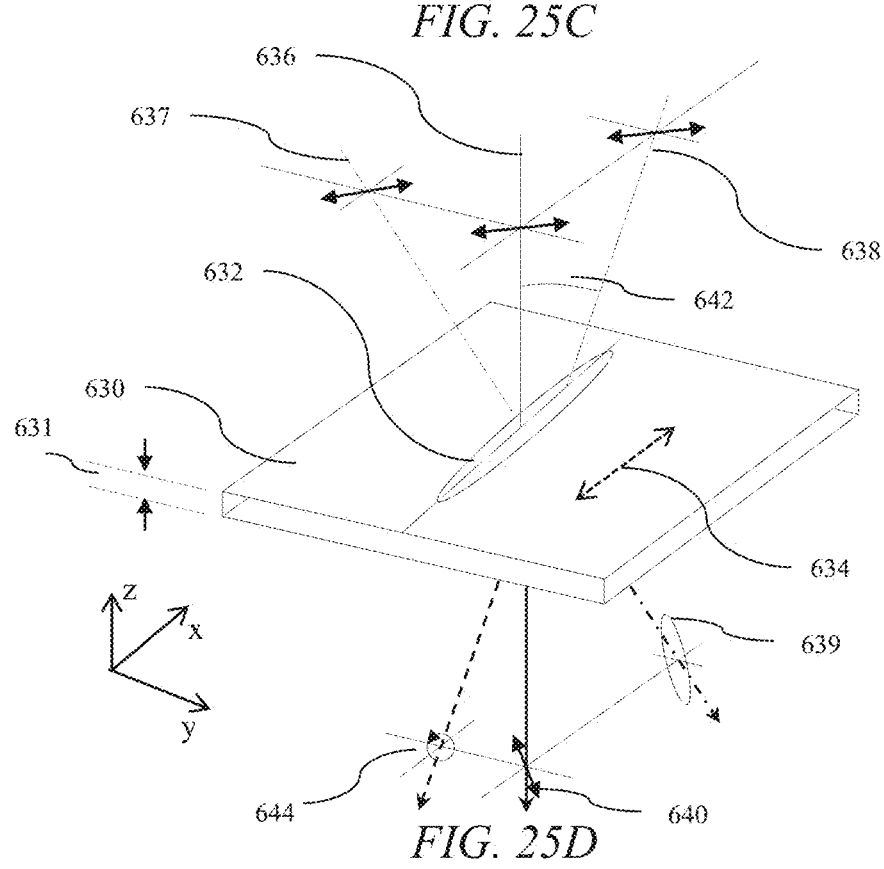
FIG. 25D is a schematic diagram illustrating in perspective view illumination of a retarder layer by off-axis light of a first linear polarization state at 45 degrees.

FIG. 25D is a schematic diagram illustrating in perspective view illumination of a retarder 630 layer by off-axis light of a linear polarization state at 45 degrees. The linear polarization state may be resolved into third and fourth polarization components that are respectively orthogonal and parallel to slow axis 634 direction. The retarder thickness 631 and material retardance represented by refractive index ellipsoid 632 may provide a net effect of relatively shifting the phase of the third and fourth polarization components incident thereon in a normal direction represented by ray 636 by half a wavelength, for a design wavelength. The design wavelength may for example be in the range of 500 to 550 nm.

At the design wavelength and for light propagating normally along ray 636 then the output polarization may be rotated by 90 degrees to a linear polarization state 640 at −45 degrees. Light propagating along ray 637 may see a phase difference that is similar but not identical to the phase difference along ray 637 due to the change in thickness, and thus an elliptical polarization state 639 may be output which may have a major axis similar to the linear polarization axis of the output light for ray 636.

By way of contrast, the phase difference for the incident linear polarization state along ray 638 may be significantly different, in particular a lower phase difference may be provided. Such phase difference may provide an output polarization state 644 that is substantially circular at a given inclination angle 642.

To illustrate the off-axis behaviour of retarder stacks, the angular luminance control of C-plates 308, 310 between an additional absorptive polariser 618 and output display polariser 218 will now be described for various off-axis illumination arrangements.

The operation of the C-plate between the parallel polarisers 500, 210 will now be described.

Figure 26A:
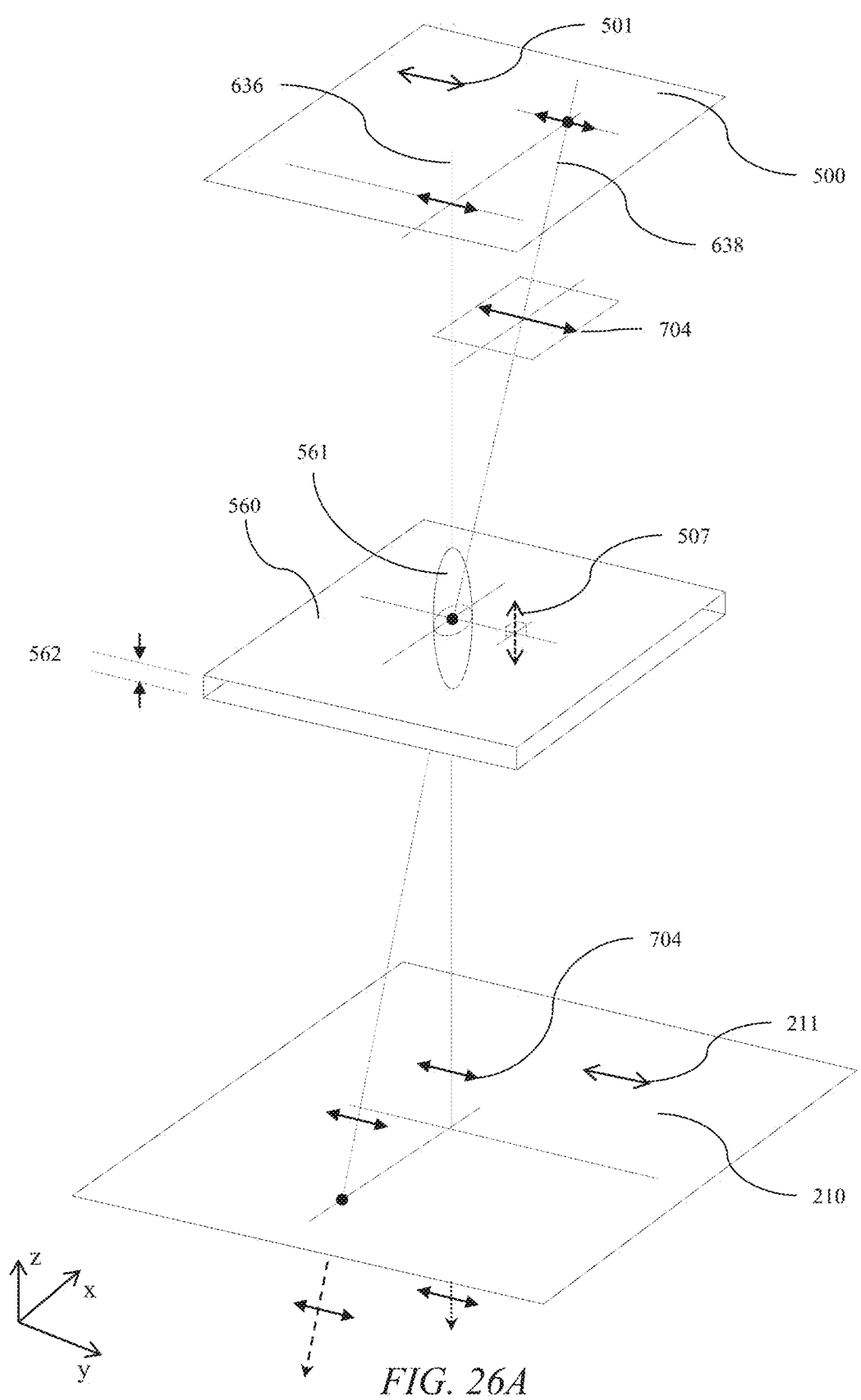
FIG. 26A is a schematic diagram illustrating in perspective view illumination of a C-plate retarder by off-axis polarised light with a positive elevation.

FIG. 26A is a schematic diagram illustrating in perspective view illumination of a C-plate layer by off-axis polarised light with a positive elevation. Incident linear polarisation component 704 is incident onto the birefringent material 632 of the C-plate 560 with optical axis direction 507 that is perpendicular to the plane of the retarder 560. Polarisation component 704 sees no net phase difference on transmission through the liquid crystal molecule and so the output polarisation component is the same as component 704. Thus a maximum transmission is seen through the polariser 210. Thus the at least one retarder comprises a retarder 560 having a slow axis 561 perpendicular to the plane of the retarder 560, that is the x-y plane. The retarder 560 having a slow axis perpendicular to the plane of the retarder comprises a C-plate.

Figure 26B:
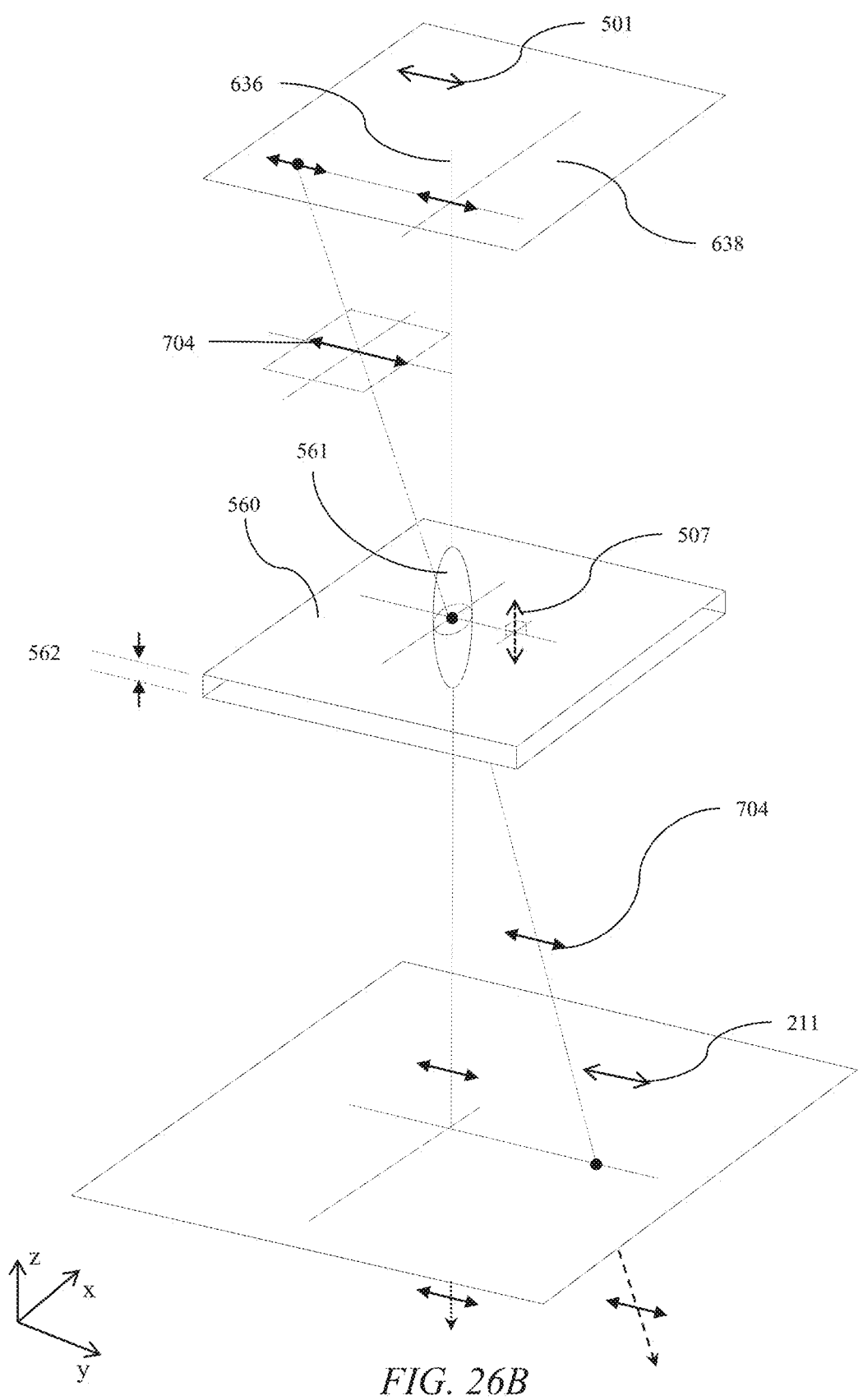
FIG. 26B is a schematic diagram illustrating in perspective view illumination of a C-plate retarder by off-axis polarised light with a negative lateral angle.

FIG. 26B is a schematic diagram illustrating in perspective view illumination of a C-plate layer by off-axis polarised light with a negative lateral angle. As with the arrangement of FIG. 26A, polarisation state 704 sees no net phase difference and is transmitted with maximum luminance.

Figure 26C:
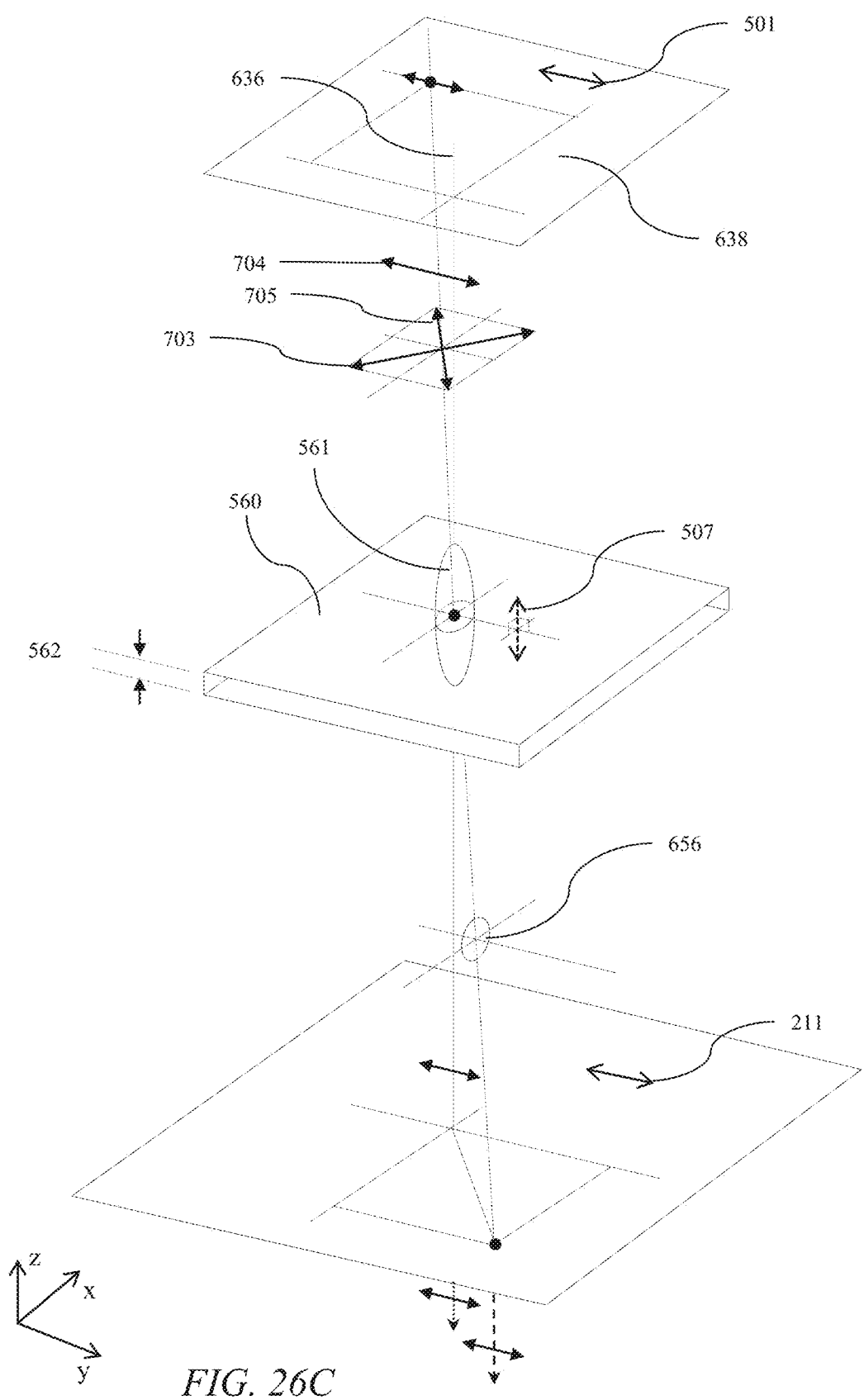
FIG. 26C is a schematic diagram illustrating in perspective view illumination of a C-plate retarder by off-axis polarised light with a positive elevation and negative lateral angle.

FIG. 26C is a schematic diagram illustrating in perspective view illumination of a C-plate layer by off-axis polarised light with a positive elevation and negative lateral angle. In comparison to the arrangement of FIGS. 26A-B, the polarisation state 704 resolves onto eigenstates 703, 705 with respect to the birefringent material 632 providing a net phase difference on transmission through the retarder 560. The resultant elliptical polarisation component 656 is transmitted through polariser 210 with reduced luminance in comparison to the rays illustrated in FIGS. 26A-B.

Figure 26D:
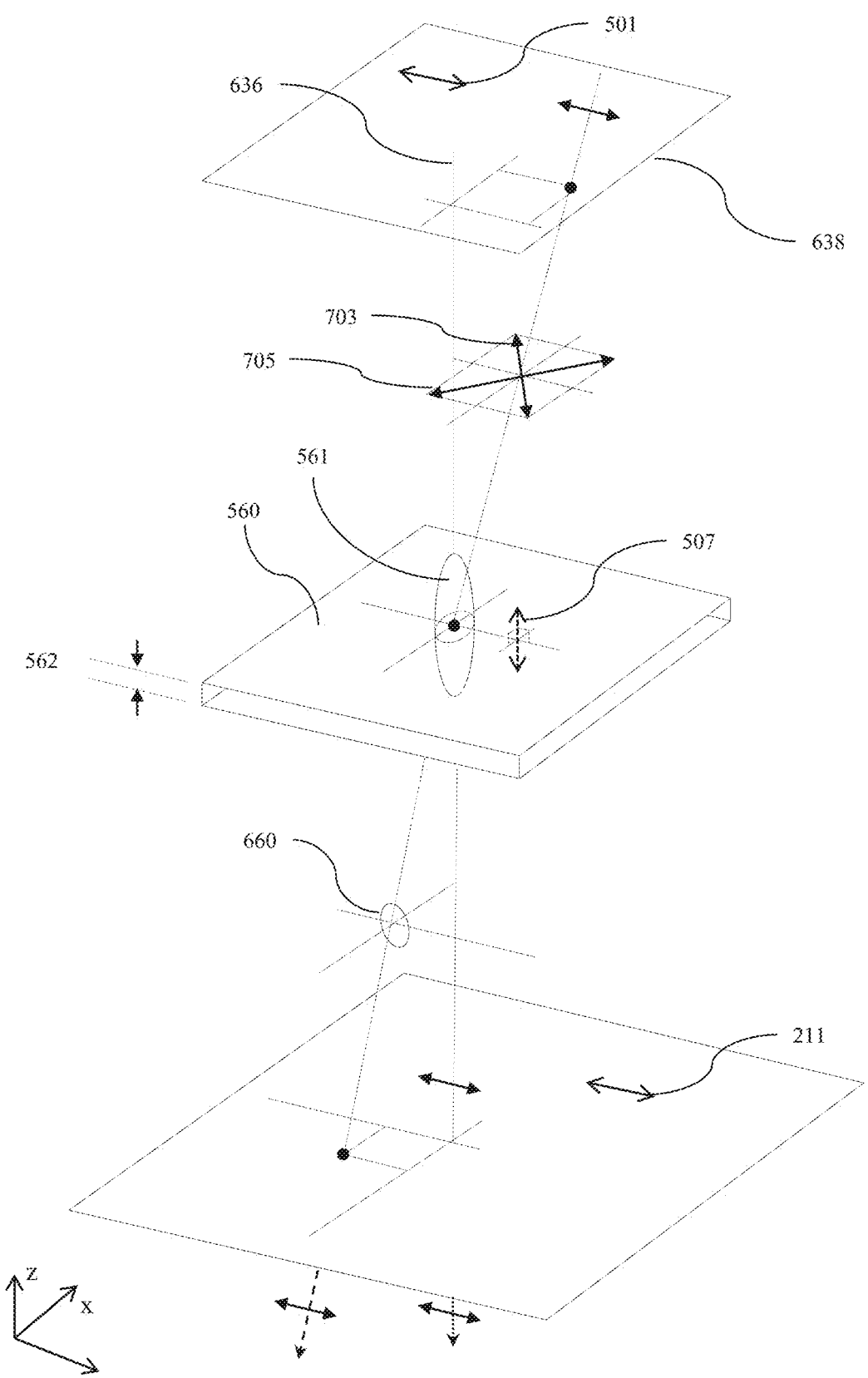
FIG. 26D is a schematic diagram illustrating in perspective view illumination of a C-plate retarder by off-axis polarised light with a positive elevation and positive lateral angle.

FIG. 26D is a schematic diagram illustrating in perspective view illumination of a C-plate layer by off-axis polarised light with a positive elevation and positive lateral angle. In a similar manner to FIG. 26C, the polarisation component 704 is resolved into eigenstates 703, 705 that undergo a net phase difference, and elliptical polarisation component 660 is provided, which after transmission through the polariser reduces the luminance of the respective off-axis ray.

Returning to the description of FIG. 23B which is a schematic graph illustrating the variation of output transmission with polar direction for transmitted light rays in the passive retarder of FIG. 23A and FIGS. 26A-D. Thus, the C-plate may provide luminance reduction in polar quadrants. To illustrate the off-axis behaviour of retarder stacks, the angular luminance control of crossed A-plates 308, 310 between an additional absorptive polariser 618 and output display polariser 218 will now be described for various off-axis illumination arrangements.

Figure 27A:
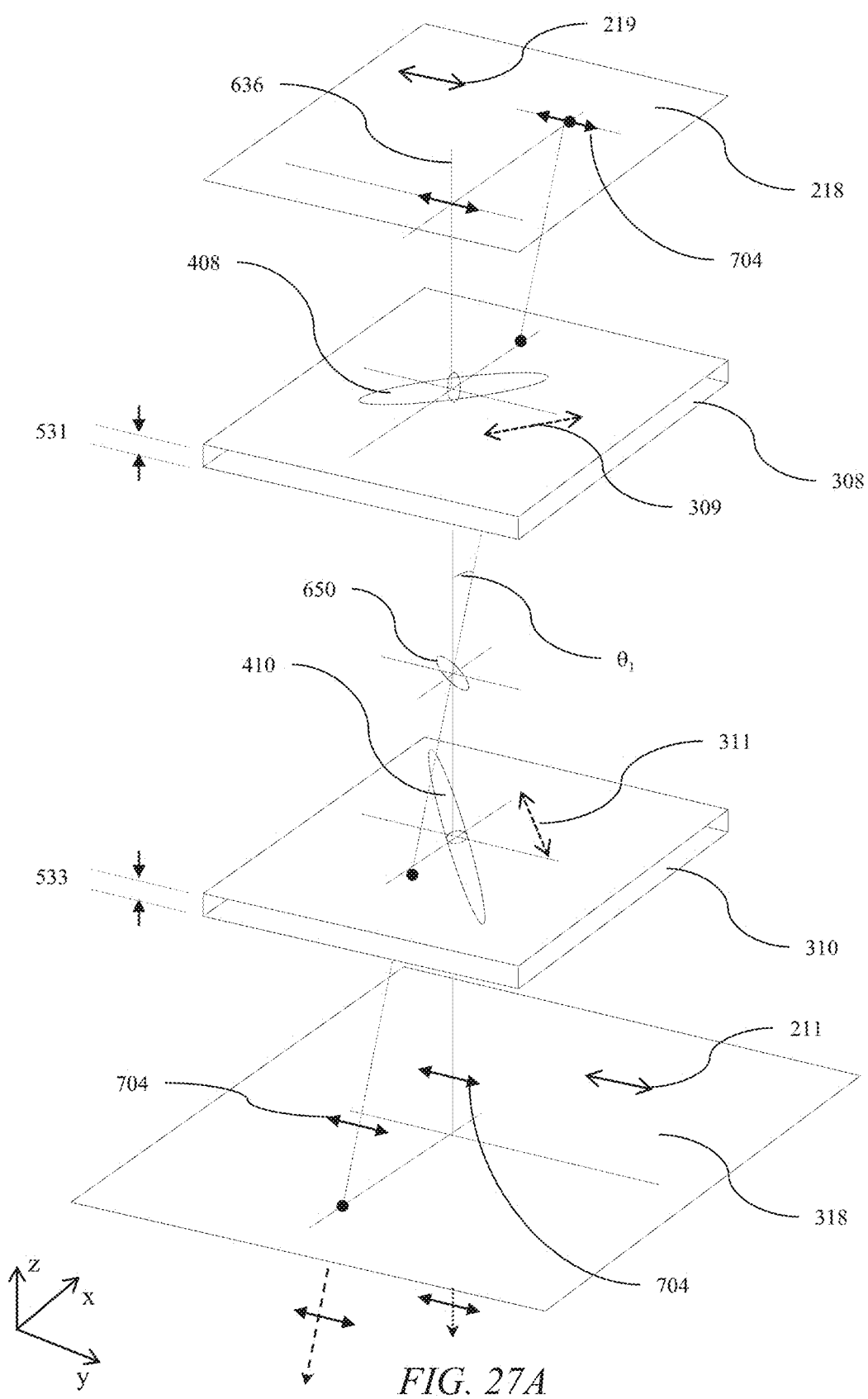
FIG. 27A is a schematic diagram illustrating in perspective view illumination of crossed A-plate retarder layers by off-axis polarised light with a positive elevation.

FIG. 27A is a schematic diagram illustrating in perspective view illumination of crossed A-plate retarder layers by off-axis polarised light with a positive elevation. Linear polariser 218 with electric vector transmission direction 219 is used to provide a linear polyarisation state 704 that is parallel to the lateral direction onto first A-plate 308 of the crossed A-plates 308, 310. The slow axis direction 309 is inclined at +45 degrees to the lateral direction. The retardance of the retarder 308 for the off-axis angle $\theta_1$ in the positive elevation direction provides a resultant polarisation component 650 that is generally elliptical on output. Polarisation component 650 is incident onto the second A-plate 310 of the crossed A-plates 308, 310 that has a slow axis direction 311 that is orthogonal to the slow axis direction 309 of the first A-plate 308. In the plane of incidence of FIG. 27A, the retardance of the second A-plate 310 for the off-axis angle $\theta_1$ is equal and opposite to the retardance of the first A-plate 308. Thus a net zero retardation is provided for the incident polarisation component 704 and the output polarisation component is the same as the input polarisation component 704.

The output polarisation component is aligned to the electric vector transmission direction of the additional absorptive polariser 618, and thus is transmitted efficiently. Advantageously, substantially no losses are provided for light rays that have zero lateral angle angular component so that full transmission efficiency is achieved.

Figure 27B:
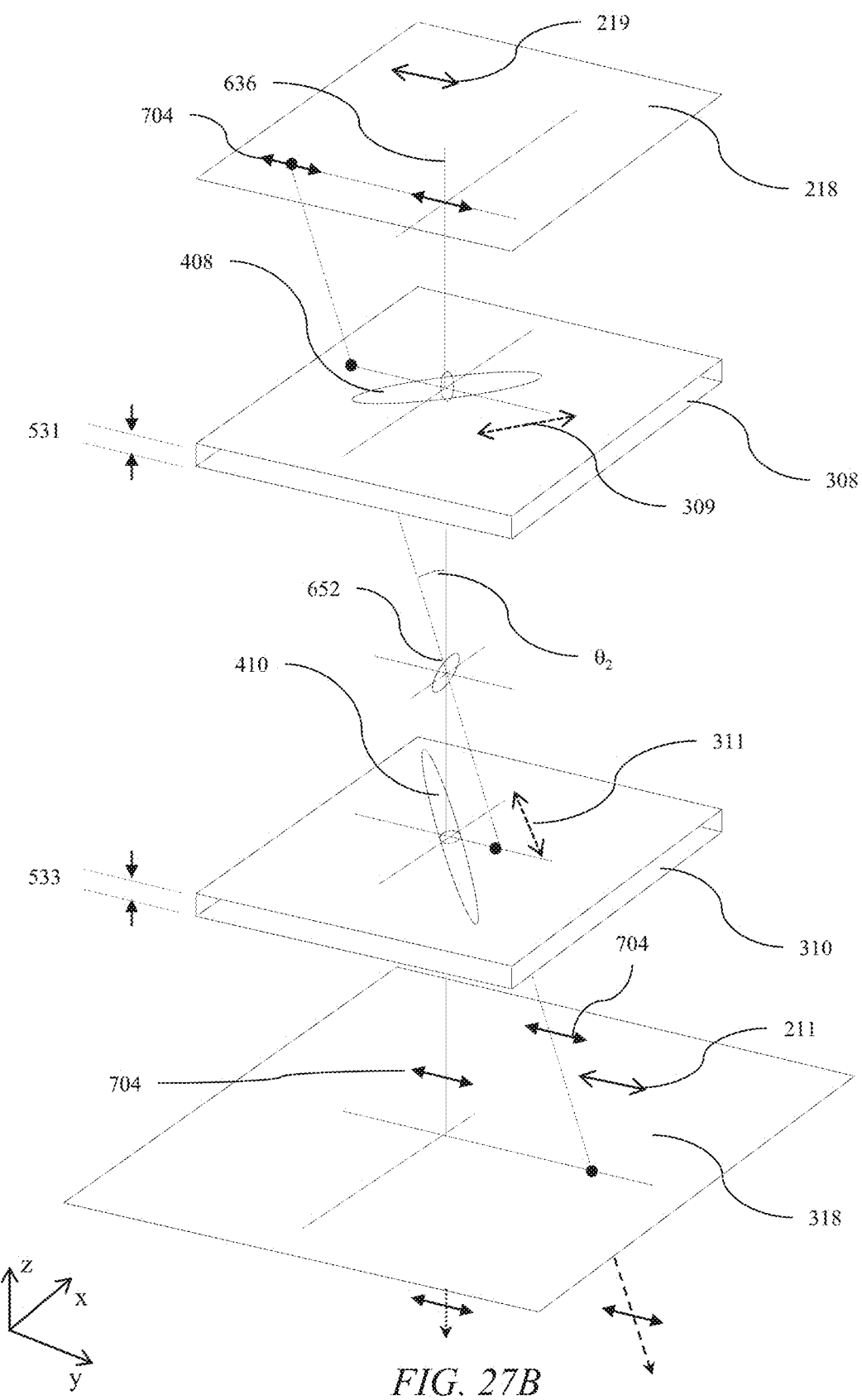
FIG. 27B is a schematic diagram illustrating in perspective view illumination of crossed A-plate retarder layers by off-axis polarised light with a negative lateral angle.

FIG. 27B is a schematic diagram illustrating in perspective view illumination of crossed A-plate retarder layers by off-axis polarised light with a negative lateral angle. Thus input polarisation component is converted by the first A-plate 308 to an intermediate polarisation component 652 that is generally an elliptical polarisation state. The second A-plate 310 again provides an equal and opposite retardation to the first A-plate so that the output polarisation component is the same as the input polarisation component 704 and light is efficiently transmitted through the polariser 618.

Thus the at least one retarder comprises a pair of retarders 308, 310 which have slow axes in the plane of the retarders 308, 310 that are crossed, that is the x-y plane in the present embodiments. The pair of retarders 308, 310 have slow axes 309, 311 that each extend at 45° with respect to an electric vector transmission direction that is parallel to the electric vector transmission of the polariser 618.

Advantageously, substantially no losses are provided for light rays that have zero elevation angular component so that full transmission efficiency is achieved.

Figure 27C:
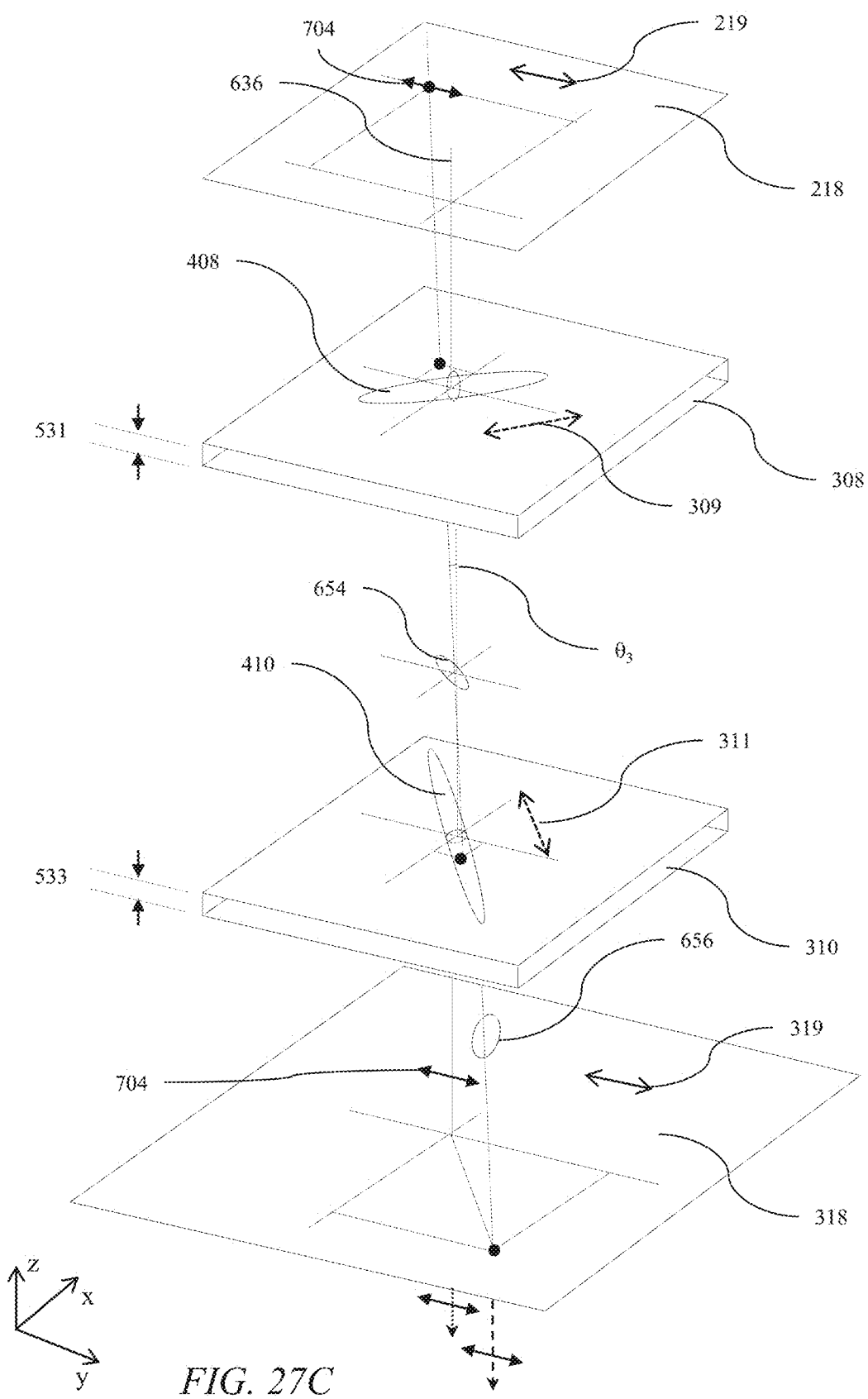
FIG. 27C is a schematic diagram illustrating in perspective view illumination of crossed A-plate retarder layers by off-axis polarised light with a positive elevation and negative lateral angle.

FIG. 27C is a schematic diagram illustrating in perspective view illumination of crossed A-plate retarder layers by off-axis polarised light with a positive elevation and negative lateral angle. Polarisation component 704 is converted to an elliptical polarisation component 654 by first A-plate 308. A resultant elliptical component 656 is output from the second A-plate 310. Elliptical component 656 is analysed by input polariser 618 with reduced luminance in comparison to the input luminance of the first polarisation component 704.

Figure 27D:
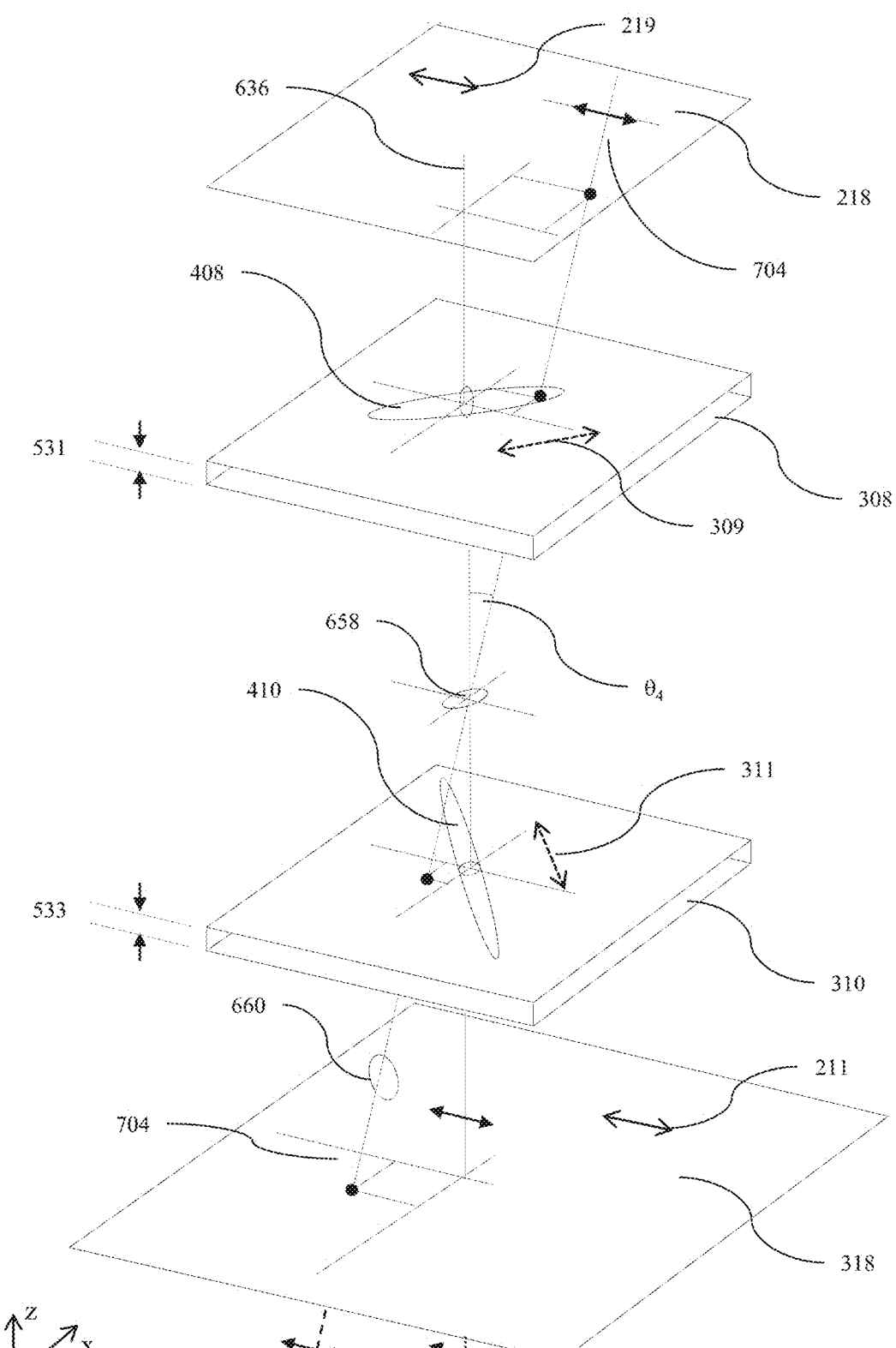
FIG. 27D is a schematic diagram illustrating in perspective view illumination of crossed A-plate retarder layers by off-axis polarised light with a positive elevation and positive lateral angle.

FIG. 27D is a schematic diagram illustrating in perspective view illumination of crossed A-plate retarder layers by off-axis polarised light with a positive elevation and positive lateral angle. Polarisation components 658 and 660 are provided by first and second A-plates 308, 310 as net retardance of first and second retarders does not provide compensation.

Thus luminance is reduced for light rays that have non-zero lateral angle and non-zero elevation components. Advantageously display privacy can be increased for snoopers that are arranged in viewing quadrants while luminous efficiency for primary display users is not substantially reduced.

Returning to the description of FIG. 22B which is a schematic graph illustrating the variation of output transmission with polar direction for transmitted light rays in the passive retarder of FIG. 22A and FIGS. 27A-D. In comparison to the arrangement of FIG. 23B, the area of luminance reduction is increased for off-axis viewing.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A display device comprising:
    a spatial light modulator;
    at least one display polariser arranged on a side of the spatial light modulator;
    an additional polariser arranged on the same side of the spatial light modulator as the display polariser;
    a first pair of passive retarders arranged between the additional polariser and the display polariser, wherein the first pair of passive retarders have slow axes in the plane of the passive retarders that are crossed; and
    an additional pair of passive retarders arranged between the first pair of passive retarders, wherein the additional pair of passive retarders have slow axes in the plane of the passive retarders that are crossed, there being no other retarders arranged between the additional polariser and the display polariser,
    wherein the retardance for light of a wavelength of 550 nm of each passive retarder is in a range from 600 nm to 850 nm.

2. A display device according to claim 1, wherein the spatial light modulator is a transmissive spatial light modulator and the display device further comprises a backlight arranged to output light.

3. A display device according to claim 2, wherein the backlight provides a luminance at polar angles to the normal to the spatial light modulator greater than 45 degrees that is at most 10 % of the luminance along the normal to the spatial light modulator.

4. A display device according to claim 2, wherein the backlight comprises:
    an array of light sources;
    a directional waveguide comprising:
    an input end extending in a lateral direction along a side of the directional waveguide, the light sources being disposed along the input end and arranged to input input light into the waveguide; and
    opposed first and second guide surfaces extending across the directional waveguide from the input end for guiding light input at the input end along the waveguide, the waveguide being arranged to deflect input light guided through the directional waveguide to exit through the first guide surface.

5. A display device according to claim 4, wherein the backlight further comprises a light turning film and the directional waveguide is a collimating waveguide.

6. A display device according to claim 5, wherein the collimating waveguide comprises
    (i) a plurality of elongate lenticular elements; and
    (ii) a plurality of inclined light extraction features,
    wherein the plurality of elongate lenticular elements and the plurality of inclined light extraction features are oriented to deflect input light guided through the directional waveguide to exit through the first guide surface.

7. A display device according to claim 4, wherein the directional waveguide is an imaging waveguide arranged to image the light sources in the lateral direction so that the output light from the light sources is directed into respective optical windows in output directions that are distributed in dependence on the input positions of the light sources.

8. A display device according to claim 7, wherein
    the imaging waveguide comprises a reflective end for reflecting the input light back along the imaging waveguide, wherein the second guide surface is arranged to deflect the reflected input light through the first guide surface as output light;
    further wherein the second guide surface comprises light extraction features and intermediate regions between the light extraction features, the light extraction features being oriented to deflect the reflected input light through the first guide surface as output light and the intermediate regions being arranged to direct light through the waveguide without extracting it; and
    the reflective end has positive optical power in the lateral direction extending between sides of the waveguide that extend between the first and second guide surfaces.

9. A display device according to claim 2, wherein the display polariser is an input polariser arranged on the input side of the spatial light modulator between the backlight and the spatial light modulator, and the additional polariser is arranged between the input polariser and the backlight.

10. A display device according to claim 9, wherein the additional polariser is a reflective polariser.

11. A display device according to claim 1, wherein the display device further comprises an output polariser arranged on the output side of the spatial light modulator.

12. A display device according to claim 1, wherein the display polariser is an output polariser arranged on the output side of the spatial light modulator.

13. A display device according to claim 12, wherein the display device further comprises an input polariser arranged on the input side of the spatial light modulator.

14. A display device according to claim 13, further comprising a further additional polariser arranged on the input side of the spatial light modulator and at least one further passive retarder arranged between the at least one further additional polariser and the input polariser.

15. A display device according to claim 1, wherein the spatial light modulator is an emissive spatial light modulator, and the display polariser is an output polariser arranged on the output side of the emissive spatial light modulator.

16. A display device according to claim 1, wherein the display device is arranged in a vehicle.

17. A display device according to claim 16, wherein the display device is arranged beneath a transparent window in the vehicle.

18. A display device according to claim 16, wherein the display device is arranged in front of a seat in the vehicle.

19. A display device according to claim 1, wherein the display polariser has an electric vector transmission direction that is parallel to an electric vector transmission direction of the additional polariser.

20. A display device according to claim 1, wherein the first pair of passive retarders have slow axes that extend at 45° and at 135°, respectively, with respect to an electric vector transmission direction that is parallel to the electric vector transmission of the display polariser.

21. A display device according to claim 20, wherein the additional pair of passive retarders have slow axes that each extend at 0° and at 90°, respectively, with respect to said electric vector transmission direction that is parallel to the electric vector transmission of the display polariser.

22. A display device according to claim 1, wherein the retardance for light of a wavelength of 550nm of each passive retarder is in a range from 650 nm to 730 nm.

23. A display device according to claim 1, wherein the retardance for light of a wavelength of 550nm of each passive retarder is in a range from 670 nm to 710 nm.

24. A view angle control optical element for application to a display device comprising a spatial light modulator and a display polariser, the view angle control optical element comprising:

a control polariser;

a first pair of passive retarders for arrangement between the control polariser and the display polariser on application of the view angle control optical element to the display device, wherein the first pair of passive retarders have slow axes in the plane of the passive retarders that are crossed; and an additional pair of passive retarders arranged between the first pair of passive retarders, wherein the additional pair of passive retarders have slow axes in the plane of the passive retarders that are crossed, the view angle control element having no other retarders, wherein the retardance for light of a wavelength of 550 nm of each passive retarder is in a range from 600 nm to 850 nm.

25. A view angle control optical element according to claim 24, wherein the display polariser has an electric vector transmission direction that is parallel to an electric vector transmission direction of the additional polariser.

26. A view angle control optical element according to claim 24, wherein the first pair of passive retarders have slow axes that extend at 45° and at 135°, respectively, with respect to an electric vector transmission direction that is parallel to the electric vector transmission of the display polariser.

27. A view angle control optical element according to claim 26, wherein the additional pair of passive retarders have slow axes that each extend at 0° and at 90°, respectively, with respect to said electric vector transmission direction that is parallel to the electric vector transmission of the display polariser.

28. A view angle control optical element according to claim 24, wherein the retardance for light of a wavelength of 550 nm of each passive retarder is in a range from 650 nm to 730 nm.

29. A view angle control optical element according to claim 24, wherein the retardance for light of a wavelength of 550nm of each passive retarder is in a range from 670 nm to 710 nm.

30. A view angle control optical element according to claim 24, wherein the additional polariser is a reflective polariser.

* * * * *